US005572644A

United States Patent [19]

Liaw et al.

[11] Patent Number: 5,572,644

[45] Date of Patent: Nov. 5, 1996

[54] SYSTEM AND METHODS FOR MULTI-DIMENSIONAL INFORMATION PROCESSING

[75] Inventors: Weikuo Liaw, Santa Cruz; Percy L. Spencer, II, Scotts Valley; David A. Orton, Santa Cruz, all of Calif.

[73] Assignee: Borland International, Inc., Scotts Valley, Calif.

[21] Appl. No.: 29,807

[22] Filed: Mar. 10, 1993

Related U.S. Application Data

[63] Continuation-in-part of Ser. No. 866,658, Apr. 8, 1992, Pat. No. 5,416,895.

[51] Int. Cl.[6] .................... G06F 17/30

[52] U.S. Cl. .................... 395/793; 395/497.02; 395/326; 395/616

[58] Field of Search .................... 395/148, 600, 395/155, 156–161, 497.01–497.04, 419

[56] References Cited

U.S. PATENT DOCUMENTS

| | | | |
|---|---|---|---|
| 4,739,477 | 4/1988 | Barker et al. | 364/300 |
| 5,317,686 | 5/1994 | Salas et al. | 395/157 |
| 5,319,777 | 7/1994 | Perez | 395/600 |
| 5,359,724 | 10/1994 | Earle | 395/495 |

FOREIGN PATENT DOCUMENTS

| | | |
|---|---|---|
| 90123564.8 | 6/1991 | European Pat. Off. . |
| 90125095.1 | 8/1991 | European Pat. Off. . |

OTHER PUBLICATIONS

*Quattro Pro User's Guide*; ver 2.0; 1990; pp. 15, 159–181, 497–504.

*Proceedings: Advanced Computer Technology, Reliable Systems and Applications*, 5th Annual European Computer Conf., CompEuro '91, May 13, 1991, Italy, pp. 282–286.

*The R–File: An Efficient Access Structure for Proximity Queries*, Feb. 1990, pp. 372–379.

*Quattro Pro File Format Specification*, Borland International, Inc., Apr. 1992.

*Microsoft Excel: Binary Intercharge File Format (BIFF3)*, Microsoft Corporation, actual publication date unknown (appears to be on or after Mar. 1991).

*Primary Examiner*—Heather R. Herndon
*Assistant Examiner*—Joseph H. Feild
*Attorney, Agent, or Firm*—John A. Smart; David N. Slone

[57] ABSTRACT

An electronic spreadsheet system of the present invention includes a notebook interface having a plurality of notebook pages, each of which may contain a spread of information cells, or other desired page type (e.g., Graphs page). Methods are provided for rapidly accessing and processing information on the different pages, including displaying a plurality of page identifiers for selecting individual pages, and further including a preferred syntax for referencing information. Additional methods are described for in-memory management and persistent storage of notebooks and their pages.

21 Claims, 44 Drawing Sheets

Microfiche Appendix Included
(2 Microfiche, 75 Pages)

800

1400

(1) OPEN SLOT IN NOTEBOOK TABLE:

(2) READ A RECORD: { TYPE
LEN
PTR ->RECORD BODY

```
switch (type)
{
   recalc_mode:
     pNB->calcMode = pRec->byte
          .
          .
          .
   PageBegin:
     pPage->pageIndex = pRec->byte
                 .
                 .
                 .
   PageEnd:
     pPage->pageIndex = pRec->byte
   ViewBegin:
     pView->ViewIndex = pRec->byte
                 .
                 .
                 .
   ViewEnd:
     pView->viewIndex = pRec->byte
}
```

BUILD NOTEBOOK

BUILD PAGE

BUILD VIEW (3) LOOP 2 UNTIL EOF

*FIG. 14A*

SHOW THE MINIMUM AREA OF
NON-EMPTY CELLS IN A PAGE

1450

| RECORD TYPE :<br>rec_type =<br>RT_Dimension = 6 | RECORD LENGTH:<br>rec_len = 8 | RECORD BODY:<br>bFirstColumn = 2;<br>bFirstPage = 1;<br>wFirstRow = 2;<br>bLastColumn = 4;<br>bLastPage = (N);<br>wLastRow = 4; |
|---|---|---|

SYSTEM AND METHODS FOR MULTI-DIMENSIONAL INFORMATION PROCESSING

The present application is a continuation-in-part of application Ser. No. 07/866,658, filed Apr. 8, 1992, now U.S. Pat. No. 5,416,895 issued May 16,1995, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDICES

A single-fiche microfiche Appendix A (55 pages) and a single-fiche microfiche Appendix B (20 pages) are included with the application.

BACKGROUND OF THE INVENTION

The present invention relates generally to the field of information processing by digital computers and, more particularly, to the processing and presentation of information by program applications, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-lefthand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-Osborne/McGraw-Hill, 1990; and LeBlond, G. and Cobb, D., *Using* 1-2-3, Que Corp., 1985. The disclosures of each of the foregoing references are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what if" scenarios. After a set of mathematical relationships has been entered into a worksheet, the spread of information can be recalculated using different sets of assumptions, with the results of each recalculation appearing almost instantaneously. Performing this operation manually, with paper and pencil, would require recalculating every relationship in the model with each change made.

While electronic spreadsheets offer significant productivity gains in the task of complex data modeling, none has been as intuitive to use as ordinary paper and pencil—objects already familiar to the user. Instead, the user must master many complex and arbitrary operations. To find the proper command for a task at hand, for example, the user must hunt through a complex menuing system, with the desired choice often buried under several menus. Even simple tasks can pose a significant challenge to the user. To change the punctuation format of a number in one prior art spreadsheet, for example, the user must traverse several nodes of a menu tree, carefully selecting among cryptic menu choices along the way. A mistake at any one of the nodes can lead to harsh consequences, including the loss of valuable data.

Finding this approach to be unworkable, many users memorize frequently-needed commands instead. To accomplish the foregoing task, for example, the user would memorize the command: /Worksheet Global Default Other International. As one can only memorize just so many arbitrary commands, however, the user typically masters only a very small subset of available commands and features. And without constant practice, these commands tend to be quickly forgotten. Moreover, many useful and needed commands are sufficiently hidden in layers of menus that they are never discovered by the user. All told, the non-intuitive interfaces of prior art spreadsheets have led to steep learning curves for users. Even after mastering a particular spreadsheet interface, the user typically only knows a fraction of available commands and features, most of which are easily forgotten.

Even with advances in computer and software technology, electronic spreadsheets have not necessarily become easier to use. Instead, technological advances have been largely employed to build more complex functions and modeling features into spreadsheets, often with more complicated menu trees; or worse yet, a staggering array of icons which leave the user even more bewildered. Thus, while prior art spreadsheets have continued to increase in functionality, they have also greatly increased in complexity for the user.

Three dimensionality is one such example. Three-dimensional spreadsheets allow the user to create a worksheet having cells arranged in a 3-D grid. In this manner, the user can manipulate multi-dimensional ranges, i.e., solid blocks of cells. This feature has distinct advantages. For example, the user can build a worksheet consisting of multiple two-dimensional spreads, define 3-D ranges that span these spreads, and copy a range of rows and columns into each of many 2-D spreads at once. This feature eases difficult choirs, such as consolidation of multiple spreads.

Despite its advantages, three-dimensionality, as presently implemented, is an advanced feature beyond the grasp of many spreadsheet users. This is not a necessary result of a three-dimensional model per se but, instead, has resulted from poor implementations of the model in prior art spreadsheet programs. One popular implementation of the model in the prior art, for example, requires the user to manipulate each additional spread of a three-dimensional spreadsheet as a separate window in a graphical windowing environment. This approach is far from intuitive, however. In particular, this approach requires the user to master actions which have no counterpart in everyday activities. While three-dimensional spreadsheets provide additional functionality, they serve to illustrate how non-intuitive implementations of new technology greatly add to the complexity of the user interface.

What is needed is application software which maintains a highly intuitive interface. Moreover, the application should implement advanced features, such as three dimensionality, by employing interface objects which are familiar to the user. In this manner, the user will not have to master an elaborate and/or awkward environment but, instead, may rely upon his or her own common fund of knowledge. The present invention fulfills this and other needs.

SUMMARY OF THE INVENTION

Application software, such as electronic spreadsheets, have found wide application in the processing and presentation of information. Despite their computational power, however, these programs require users to master complex interfaces, adopting abstract representation models which are beyond the grasp of ordinary users. As a result, much of the computational power of these applications goes unutilized by end users.

The present invention, in contrast, provides system and methods having a highly intuitive interface for users. More particularly, the present invention provides interface objects which are familiar to the user. In an exemplary embodiment of the present invention, an electronic spreadsheet system includes a notebook interface having a plurality of notebook pages, each of which contains a spread of information cells, or other desired page type (e.g., Graphs page).

Methods are provided for rapidly accessing and processing information on the different pages, including, for example, displaying a plurality of page identifiers for selecting individual pages. Additional methods are provided for editing cells and blocks of cells. In this fashion, the spreadsheet notebook of the present invention provides a convenient means for organizing and presenting information. Moreover, the spreadsheet notebook of the present invention readily accommodates complex data (e.g., consolidation across multiple spreads); yet, at the same time provides the user with a highly intuitive interface, one which employs interface objects which are familiar to the user.

The present invention also includes system and methods for conveniently inspecting and setting the properties of object's. A method for accessing an objects property, in accordance with the present invention, includes receiving a request from the user for inspection of an object; accessing properties for the object; and displaying the properties to the user. From the displayed properties, the user may alter the characteristics of the object, as desired.

The present invention also includes preferred methods for maintaining in-memory information structures which describe a spreadsheet notebook. Additional methods are described for supporting the information structures with data records stored on a persistent storage device (e.g., mass storage device). The methods include a technique for compressing information in instances where a reference set (e.g., default values) is known, or may be readily derived.

BRIEF DESCRIPTION OF THE DRAWINGS

FIGS. 111A–D are bitmap images of an exemplary interface for storing and retrieving notebooks.

FIG. 14A is a pseudocode diagram illustrating the general method for processing data records to build notebook, page, and view information structures in memory.

DETAILED DESCRIPTION OF A PREFERRED EMBODIMENT

System Hardware

Figure 1A:
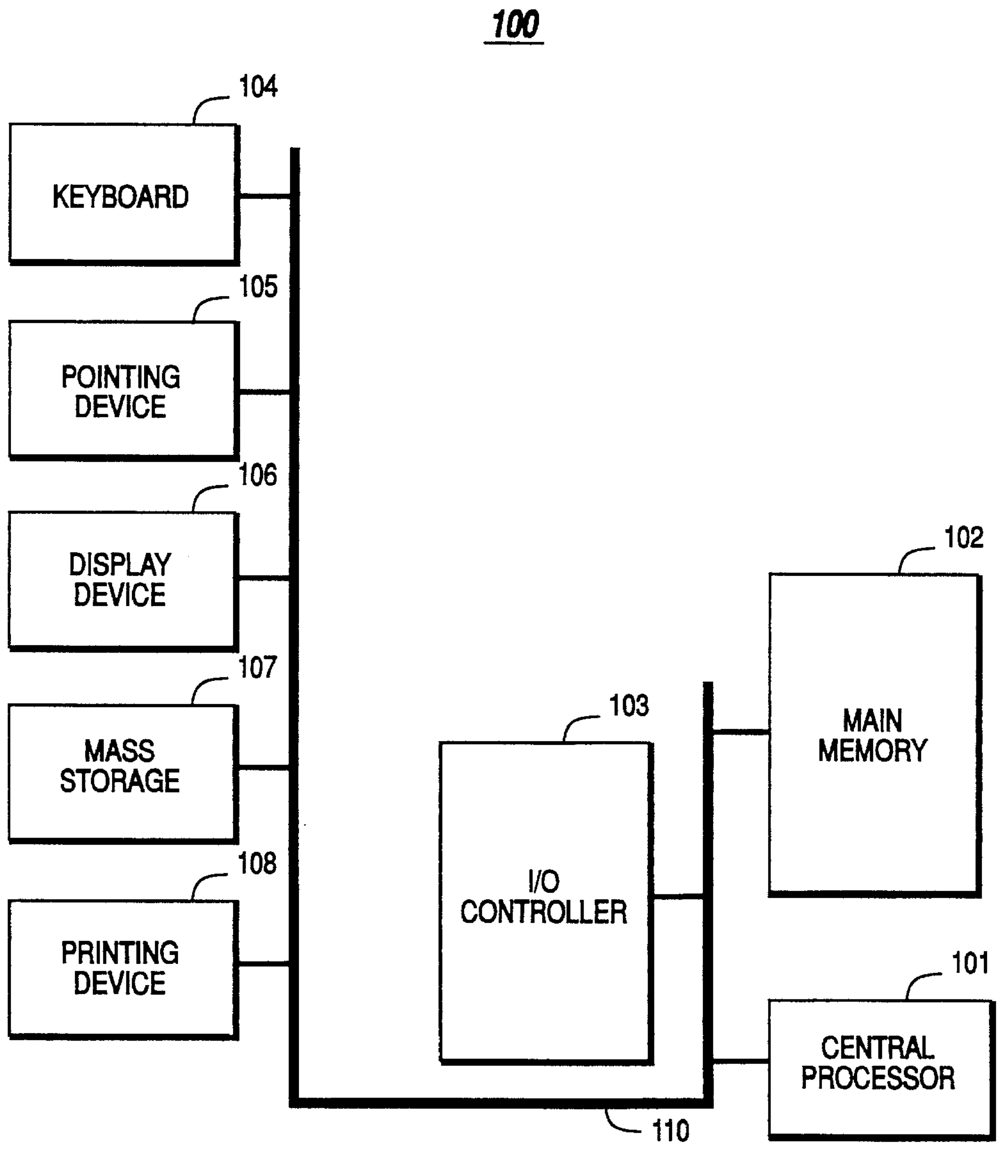
FIG. 1A is a block diagram of a computer system in which the present invention may be embodied.

As shown in FIG. 1A, the present invention may be embodied on a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

Figure 1B:
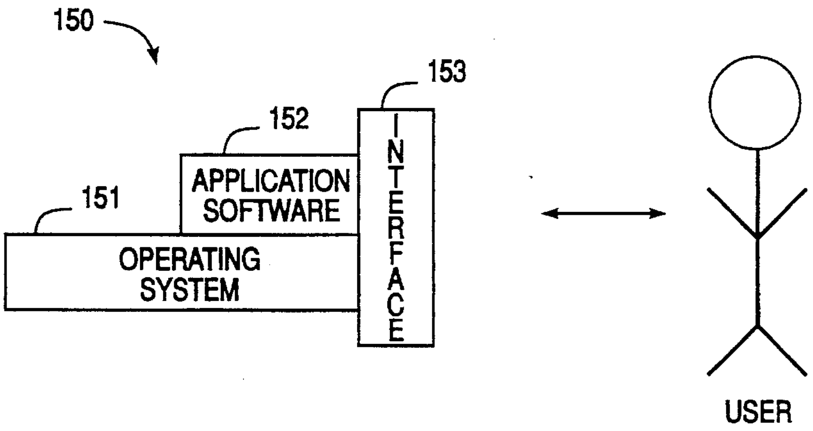
FIG. 1B is a block diagram of a software system of the present invention, which includes operating system, application software, and user interface components.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as spreadsheet module 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 is MS-DOS, and interface 153 is Microsoft® Windows; both are available from Microsoft Corporation of Redmond, Wash. Spreadsheet module 152, on the other hand, includes Quattro® Pro for Windows, available from Borland International of Scotts Valley, Calif.

Interface: User-familiar Objects

A. Introduction

The following description will focus on the presently preferred embodiments of the present invention, which are embodied in spreadsheet applications operative in the Microsoft Windows environment. The present invention, however, is not limited to any particular application or any particular environment. Instead, those skilled in the art will find that the system and methods of the present invention may be advantageously applied to a variety of system and application software, including database management systems, wordprocessors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
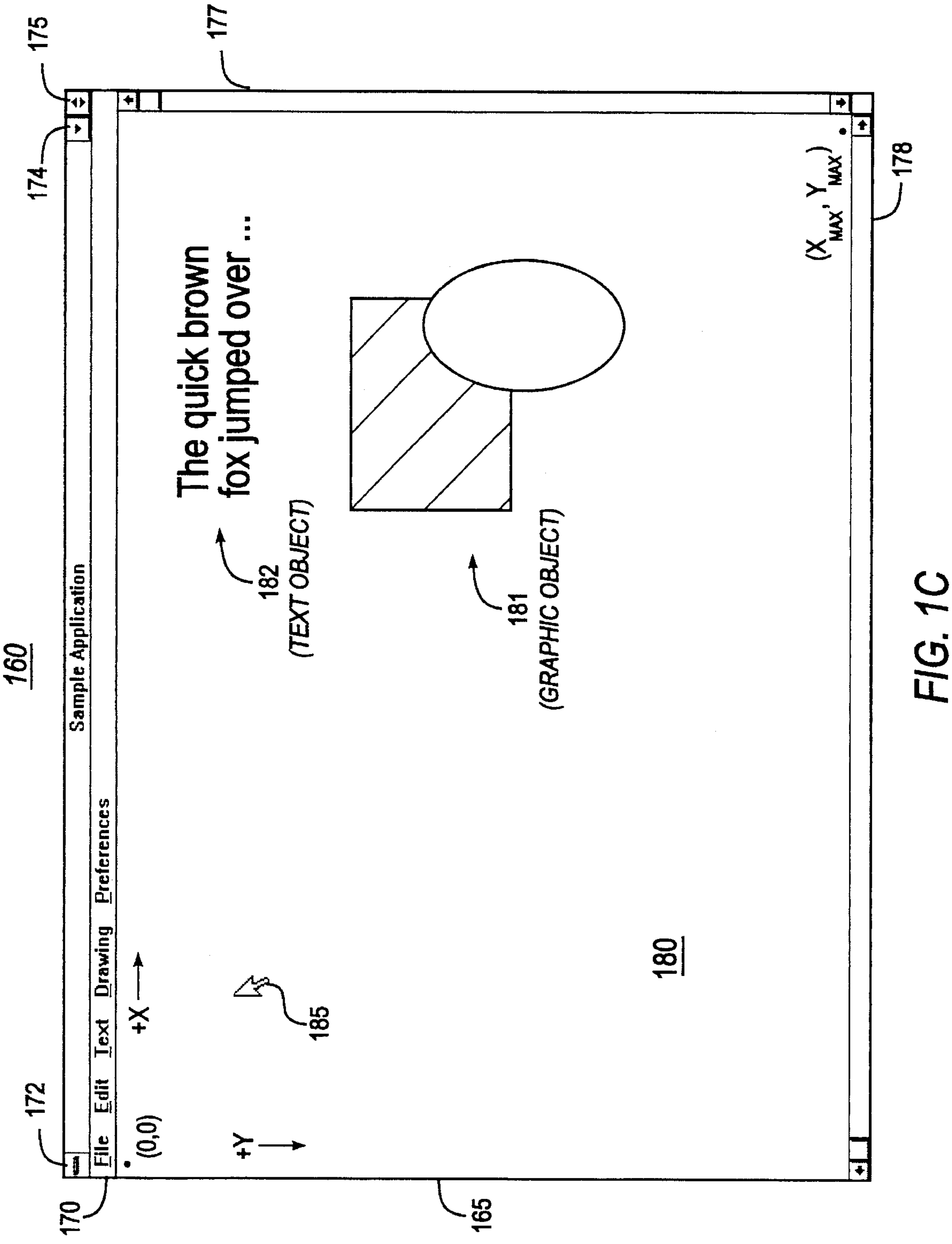
FIG. 1C is bitmap screen shots illustrating the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons." Programming techniques and operations for mouse devices are well documented in the programming and hardware literature; see e.g., *Microsoft Mouse Programmer's Reference*, Microsoft Press, 1989, the disclosure of which is hereby incorporated by reference.

B. Spreadsheet Notebooks

In contrast to conventional applications, even those operative in a windowing environment, the present invention includes user-familiar objects, i.e., paradigms of real-world objects which the user already knows how to use. In an exemplary embodiment, system 100 includes a spreadsheet notebook interface, with such user-familiar objects as pages and tabs. In this manner, complexities of the system are hidden under ordinary, everyday object metaphors. By drawing upon skills which the user has already mastered, the present invention provides a highly intuitive interface—one in which advanced features (e.g., three-dimensionality) are easily learned.

1. General interface

Figure 2A:
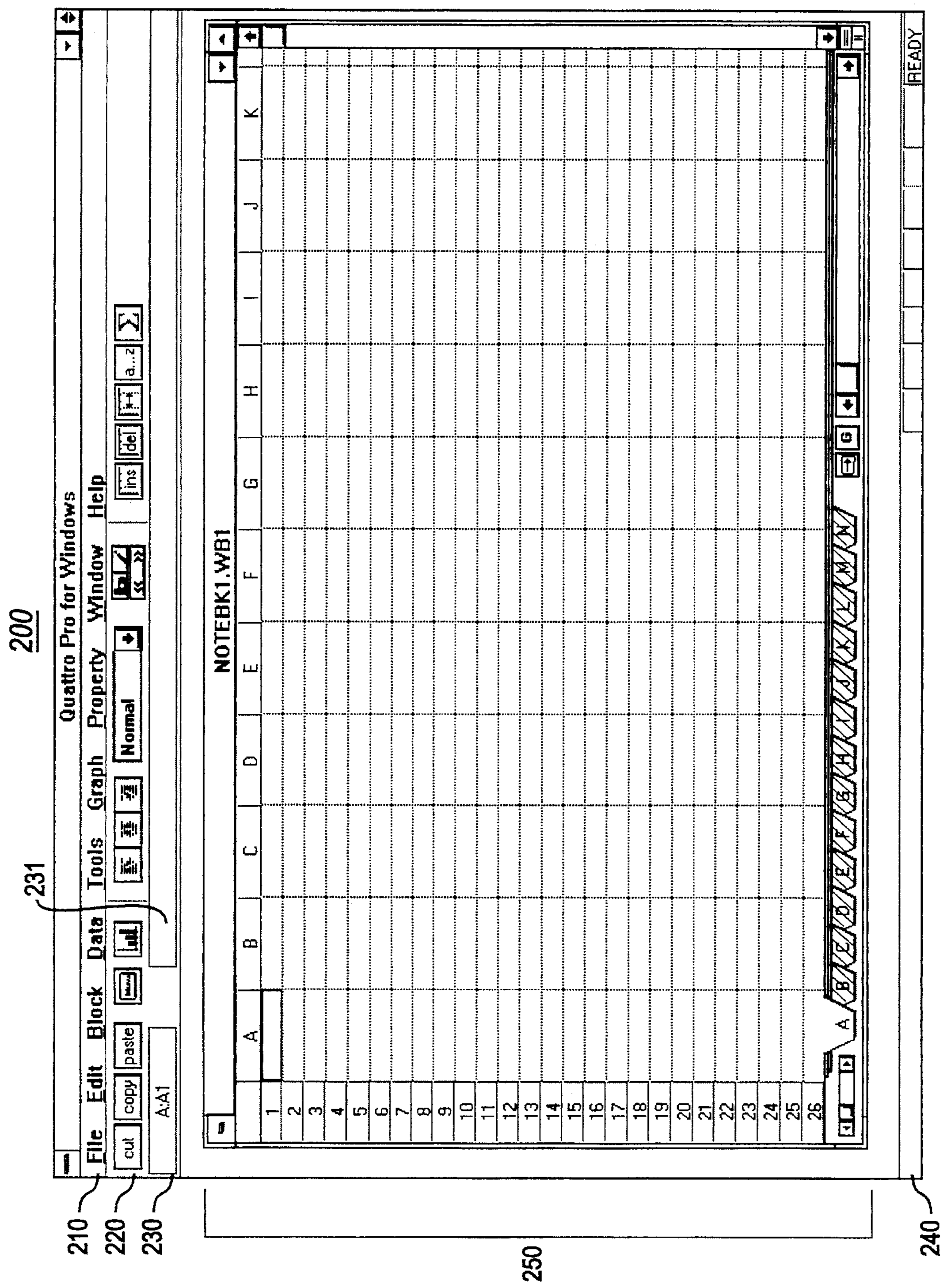
FIG. 2A is a screen bitmap illustrating a spreadsheet notebook of the present invention.

Shown in FIG. 2A, spreadsheet module 152 includes a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a tool bar 220, a current cell indicator 230, an input line 231, a status line 240, and a notebook window 250. The menu bar 210 displays and invokes, in response to user inputs, a main level of user commands. Menu 210 also invokes additional pulldown menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
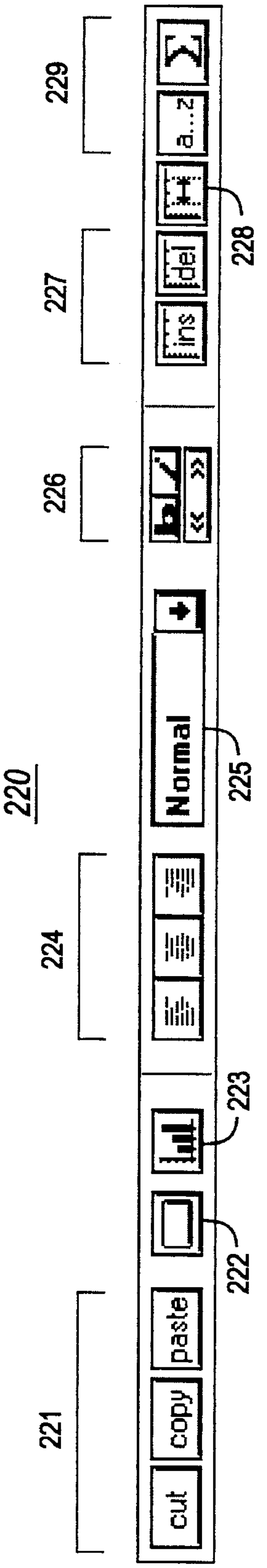
FIG. 2B is a bitmap of a tool bar component of the spreadsheet of the present invention.

The tool bar 220, shown in further detail in FIG. 2B, comprises a row or palette of tools which provide a quick way for the user to choose commonly-used menu commands or properties. In an exemplary embodiment, tool bar 220 includes cut, copy, and paste buttons 221, a power button tool 222, a graph tool 223, alignment buttons 224, a style list 225, font buttons 226, insert/delete buttons 227, a fit button 228, and action buttons 229. Buttons 221 cut, copy and paste data and objects to and from Windows clipboard. The same actions are also available as corresponding commands in the Edit menu (available from menu bar 210). Tool 220 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells.

Other tools are available for formatting cells. Alignment buttons 224 place cell entries flush left, centered, or flush right, as desired. The style list 225 specifies the style for the active block and may be selected from a plurality of predefined styles (e.g., normal, currency, fixed, percent, and the like). The font buttons 226 effect font changes, including toggling bold and italic fonts, as well as increasing and decreasing font (point) size. The insert and delete buttons 227 permit the user to insert or delete blocks, rows, columns, and pages (described in further detail hereinbelow), as desired. The fit button 228 allows the user to quickly tailor a column's width to match its widest cell entry. Action buttons 229 provide automated spreadsheet operations, including sorting and summing operations. For example, a Sort button, when invoked, performs a sort on data in a currently active block. A sum button, on the other hand, totals the values in any block of cells by generating an @SUM function, just outside a selected range of blocks.

2. Notebook and pages

Figure 2D:
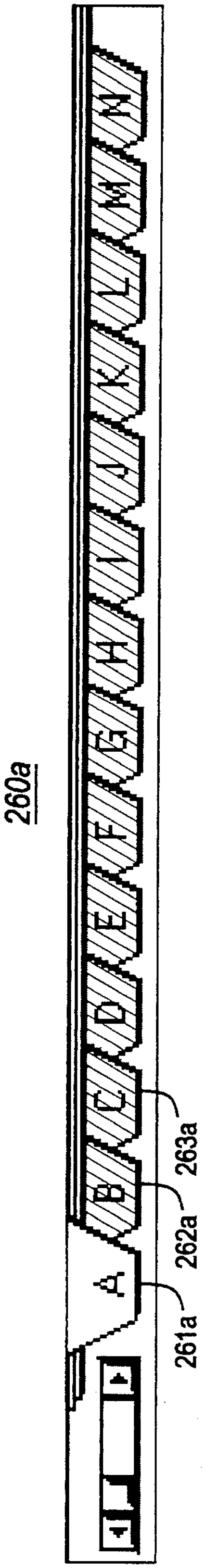
FIGS. 2D–E are bitmaps illustrating page identifiers for rapidly accessing and manipulating individual pages of the notebook of the present invention.
Figure 2E:
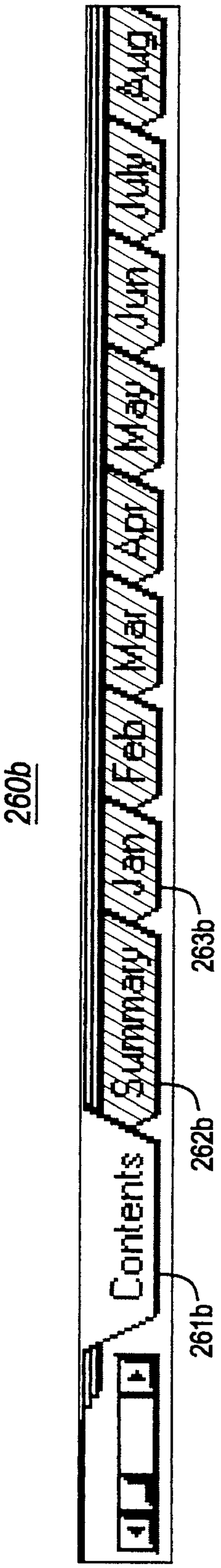
Figure 2C:
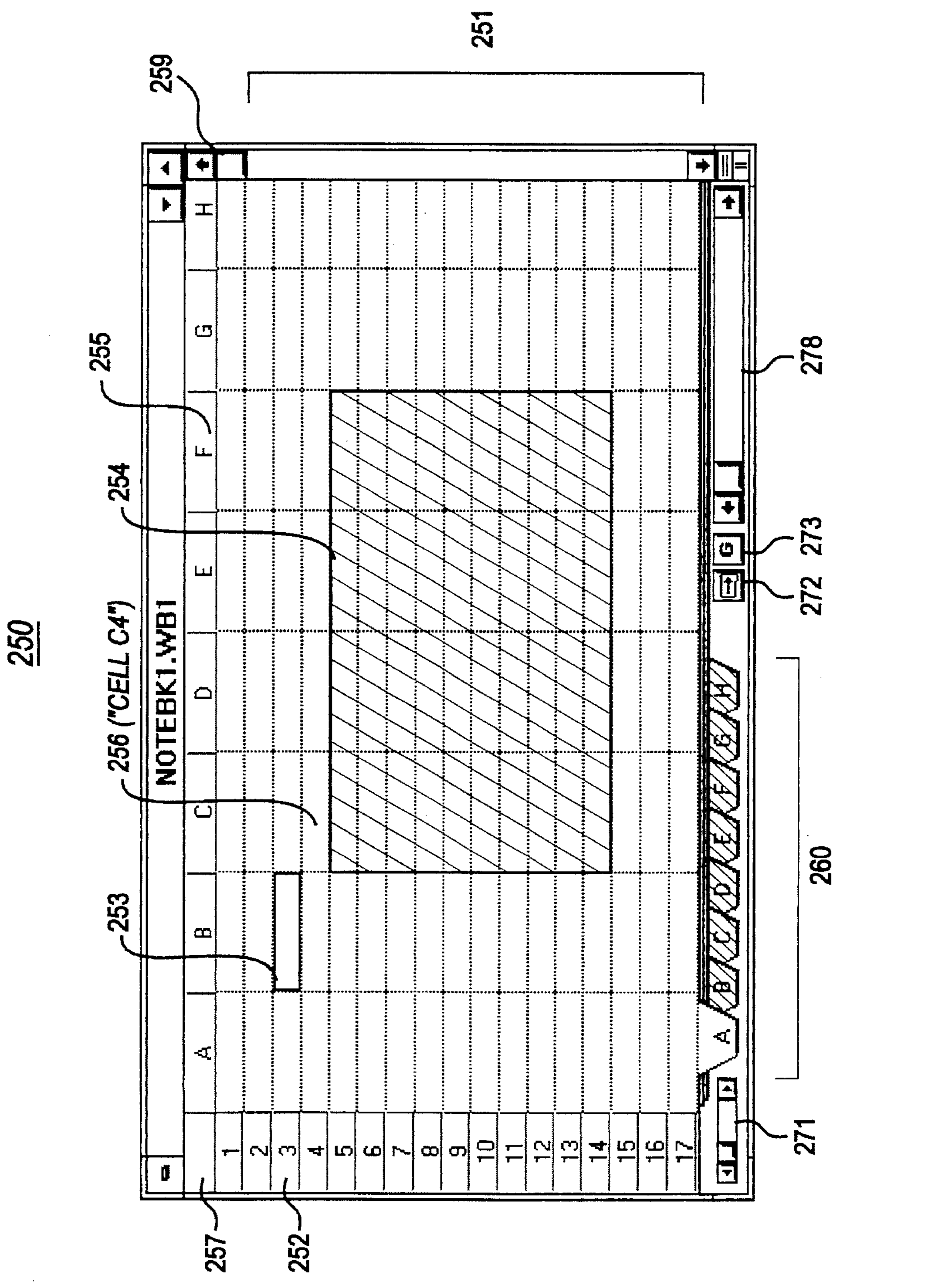
FIG. 2C is a screen bitmap illustrating a notebook window from the spreadsheet notebook of the present invention.

Notebook 250, shown in further detail in FIG. 2C, provides an interface for entering and displaying information of interest. The notebook 250 includes a plurality of spreadsheet pages, such as page 251 (Page n). Notebook 250 also includes a "Graphs page" for readily accessing all the graphs created for the notebook. Each page may include conventional windowing features and operations, such as moving, resizing, and deleting. In a preferred embodiment, the notebook 250 includes 256 spreadsheet pages and one Graphs page, all of which are saved as a single disk file on the mass storage 107. In accordance with the present invention, workspace 200 may display one or more notebooks, each sized and positioned (e.g., tiled, overlapping, and the like) according to user-specified constraints. When a single notebook is used, notebook 250 will typically occupy a majority of workspace 200.

Each spreadsheet page of a notebook includes a 2-D spread. For example, spreadsheet page 251 includes a grid in row and column format, such as row 252 (row 3) and column 255 (col. F). At each row/column intersection, a box or cell (e.g., cell C4) is provided for entering, processing, and displaying information in a conventional manner. Each cell is addressable, with a selector 253 being provided for indicating a currently active one (i.e., the cell that is currently selected).

As shown in FIGS. 2C–E, individual notebook pages are identified by page identifiers 260, preferably located along one edge of the notebook 250. In a preferred embodiment, each page identifier is in the form of a tab member (e.g., members 261*a*, 262*a*, 263*a*) situated along a bottom edge of the notebook. Each tab member may include representative indicia, such as textual or graphic labels, including user-selected titles representing the contents of a corresponding page. In FIG. 2D, the tab members 260 are set to their respective default names. For example, the first three tab members (members 261*a*, 262*a*, 263*a*) are respectively set to A, B, and C. In a preferred embodiment, however, tab members are typically given descriptive names provided by the user. As shown in FIG. 2E, for example, the first three tab members have now been set to "Contents" (tab member 261*b*), "Summary" (tab member 262*b*), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet formulas. For example, when entering a formula referring to cells on another page, the user may simply use the descriptive page name in the formula itself (as described hereinbelow), thus making it easier for the user to understand the relationship of the cell(s) or information being referenced.

3. Navigation in a notebook

Figure 3A:
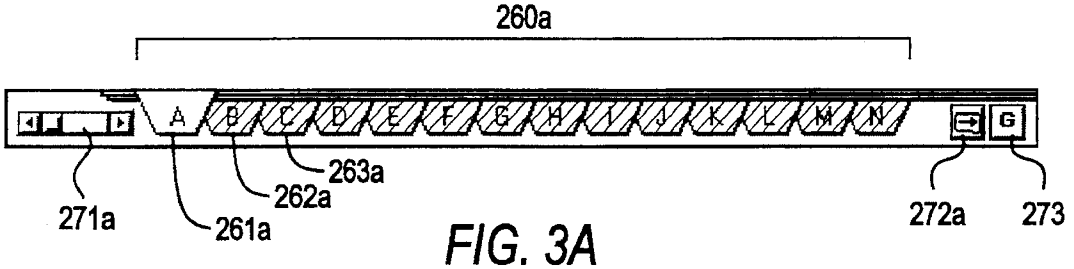
FIGS. 3A–C illustrate navigation (i.e., access of desired information) in the spreadsheet notebook of the present invention.
Figure 3B:
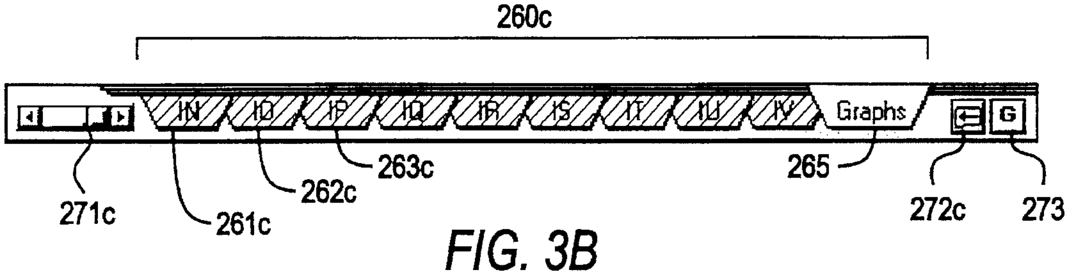
Figure 3C:
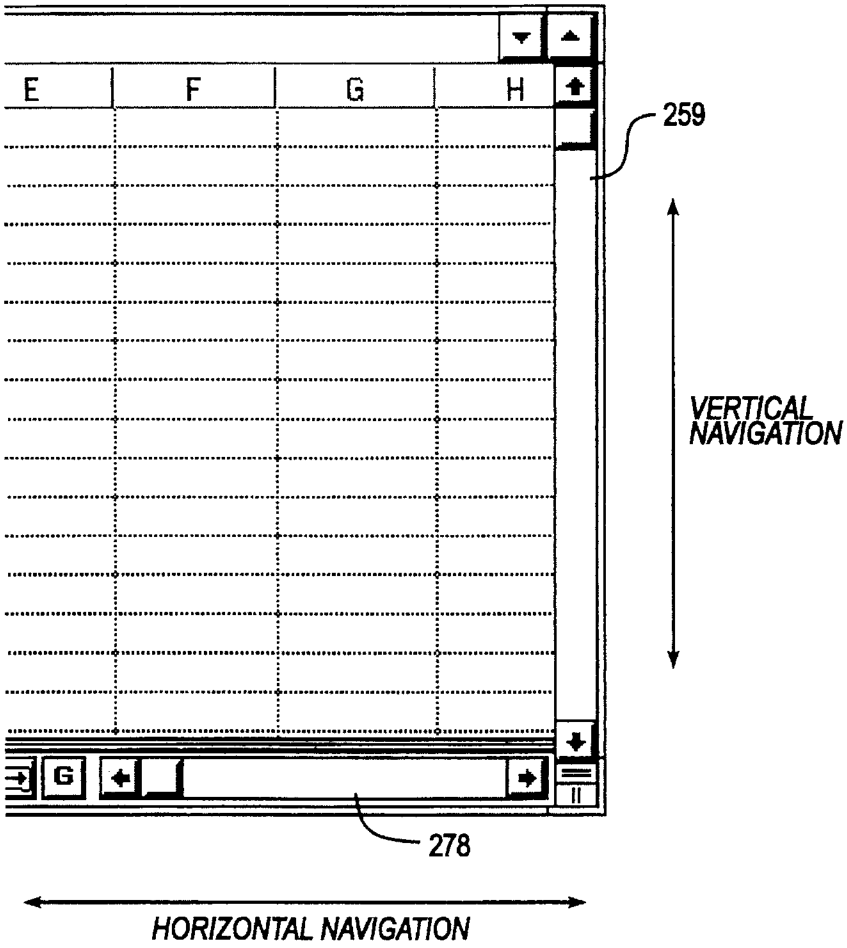

Referring now to FIGS. 3A–C, movement (i.e., location of desired information cells) within a spreadsheet notebook of the present invention is illustrated. To move to different pages in the notebook, the user simply selects the corresponding tab from tabs 260. To move to Page B, for example, the user selects (e.g., with keyboard 104 or pointing device 105) tab 262*a;* similarly, Page C is reached by selecting tab 263*a*. Continuing the example, the user may return to Page A by selecting tab 261*a*. Thus instead of finding information by scrolling different parts of a large spreadsheet, or by invoking multiple windows of a conventional three-dimensional spreadsheet, the present invention allows the user to simply and conveniently "flip through" several pages of the notebook to rapidly locate information of interest.

Notebook 250 also includes supplemental tools for navigation between pages, including a tab scroller 271 and a fast-forward button 272. The tab scroller (shown in two different states: 271*a* and 271*b*) permits access to identifiers for pages which are not currently visible on the screen device 106. If a desired identifier or tab is not currently in view, the user simply activates the tab scroller 271 to reveal additional tabs. The fast-forward button 272, on the other hand, provides immediate access to the last pages of the notebook, including the Graphs page. As shown in FIGS. 3A and B, after invoking the fast-forward button 272*a*, the page identifiers for the last pages (e.g., tabs 261*c*, 262*c*, 263*c*, 265) are accessible. To switch back to the previously active spreadsheet page, the user may select or click the fast-forward button 272*c* again. For navigation within a spreadsheet page, horizontal and vertical scrollbars 278, 259 are provided; general features and operations of basic scroller or sliders are described in Windows user and programming literature, including *Microsoft's Windows Software Development Kit.*

4. Selections and aggregate operations within a notebook

The selection of desired information cells in the notebook of the present invention is now described. For selecting a plurality of information cells, both 2-D blocks (e.g., block 254 of FIG. 2C) and 3-D blocks of cells may be defined. A 2-B block is a rectangular group of one or more cells and is identified by block coordinates, such as the cell addresses of its upper-left and bottom-right corners. Similarly, a 3-D block represents a solid block (e.g., cube) of cells.

A 2-D block is specified by selecting, with mouse 105 or keyboard 104, opposing corners. In FIG. 2C, for example, the block 254 is defined by corner cells C5 and F14. Additional selection examples are illustrated in FIGS. 4A–E. For example, column B (col. 411) is selected by clicking column heading 410; similarly, row 3 (row 421) is chosen by clicking row heading 420. Selection may be additive (i.e., additional selections are appended to the current ones), as shown by selection of a row 420 and a column 410 in FIG. 4C. To facilitate the selection of all cell members (e.g., block 431), a select-all button 430 is also provided. In addition to these "contiguous" blocks, non-contiguous block selection (e.g., selection of blocks 441, 442) is provided by use of a status key (e.g., CTRL-, ALT-, or SHIFT-) plus a mouse event (e.g., click and drag operations).

Selection of 3-D cell blocks, i.e., cell ranges spanning more than one page, occurs in a similar fashion. To extend the block 254 (of FIG. 2C) into a 3-D block, the user specifies an additional or third dimension by selecting an appropriate page identifier. If the user selects the D tab while the block 254 is selected (e.g., with a SHIFT or other status key), the 2-D block is extended into a 3-D block spanning from Pages A to D. Additional 3-D operations may be performed by utilizing a method of the present invention for grouping pages, which will now be described.

Figure 4A:
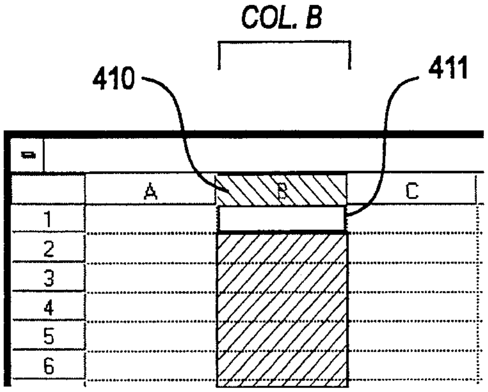
FIGS. 4A–E are screen bitmaps illustrating the selection of information cells in the spreadsheet notebook of the present invention.
Figure 4B:
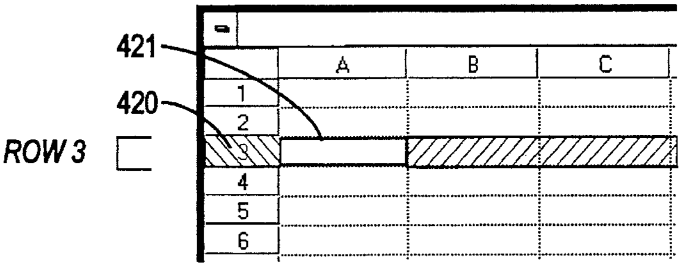
Figure 4C:
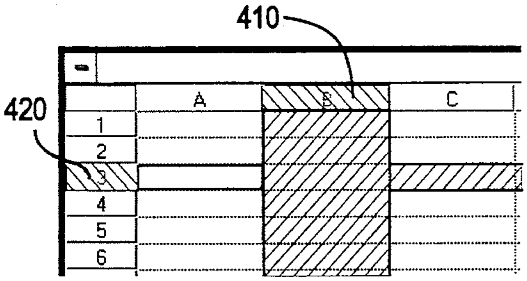
Figure 4D:
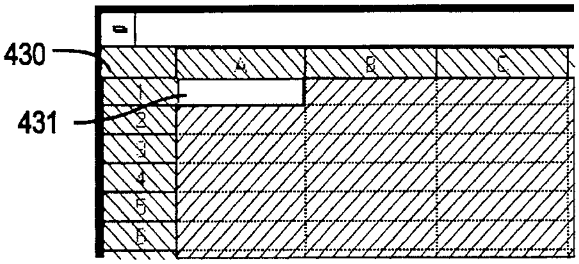
Figure 4E:
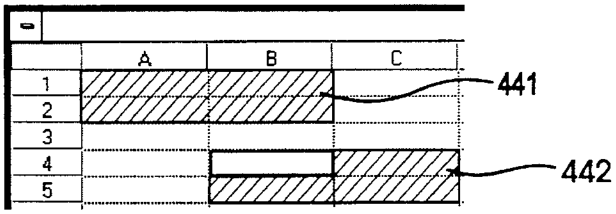
Figure 4F:
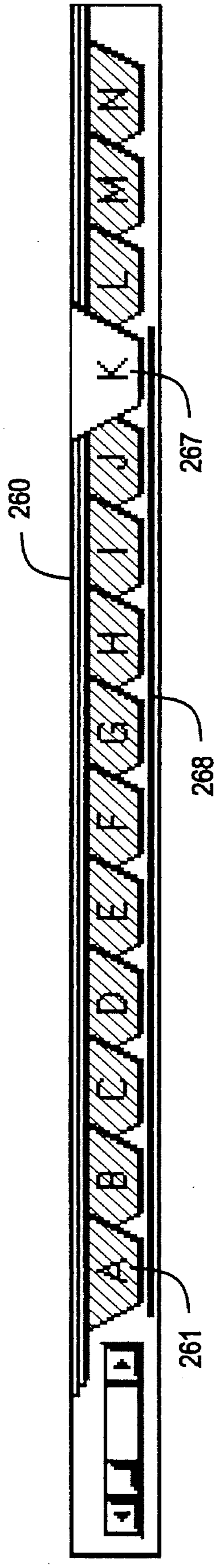
FIG. 4F is a screen bitmap illustrating the operation of grouping one or more desired pages in the spreadsheet notebook of the present invention.

Pages may be selected or grouped together, thereby providing a means for changing multiple pages simultaneously. In much the same manner as cells from a spread are grouped into 2-D blocks, a range of pages are grouped by specifying beginning and ending members. As shown in FIG. 4F, a range from Page A to Page K may be achieved by selecting tabs A (261) and K (267) from identifiers 260, for example, while depressing a key (e.g., status key). A grouping indicator 268 is displayed for indicating members of a group; groupings may also be annotated with user-specified labels. Once grouped, a page of the group may have its operations (e.g., selection, data entry, and the like) percolates to the other members of the group, as desired. A non-contiguous selection of pages may also be selected (even across different pages); for example, a selection of Pages A and D, but not B and C, may be achieved by selecting tabs A and D while depressing a second key (e.g., CTRL- key). Furthermore, groups may overlap (i.e., a page can be in more than one group), as desired. By selectively activating a group mode (e.g., by toggling group button 273), groupings may be temporarily turned off, in which case events are not percolated to other members of the group.

With group mode active, an activity in a page which is a member of a group can also affect similarly situated cells of the other pages of the group. For example, information entered in a cell on one page of the group can also propagate to the same (relative) cell in other pages of the group; data entry may be "drilled" (propagated) to other group pages by concluding data entry, for example, with a "Ctrl-Enter" keystroke (instead of a "Enter" command). For instance, an entry into cell C4 of Page A may also conveniently and automatically appear in cell C4 of pages B, C, D, E, F, G, H, I, J, and K, for an A–K grouping. Similarly, block or aggregate operations may propagate across member pages. For example, a block operation (e.g., Block Fill) for cells A1 to C4 in Page n in an A–D grouping would also operate (in this case, fill information) in the same cells (i.e., from A1 to C4) for Page B to Page D.

Employing the user-specified page identifiers of the present invention, a simple nomenclature is available for specifying these solid blocks of information. In a preferred embodiment, a solid block is specified by:

<<First Page>>..<<Last Page>>:<<First Cell>>..<<Last Cell>>

For example, a solid block may be defined as A..D:A1..C4, in which case the block spans from cells A1 to C4, and spans across Pages A-D. By permitting alias names (i.e., user-supplied alternative labels), the present invention allows the block to be specified as 1989 Sales..1992 Sales: A1..C4; or even 1989 Sales..1992 Sales: First Quarter..Third Quarter. Additionally, the present invention readily accommodates notebook information as well, for example, [TAX]1989 Sales..1992 Sales: First Quarter..Third Quarter, thus permitting information to be linked across various notebooks. Wildcard characters (e.g., * and ?) may also be employed for cell, page, and notebook identifiers, as desired. Thus, the spreadsheet notebook of the present invention provides a 3-D interface which readily accommodates real-world information in a format the user understands (instead of forcing the user to adapt his or her information to fit an arbitrary spreadsheet model).

5. Advanced Editing

Figure 4G:
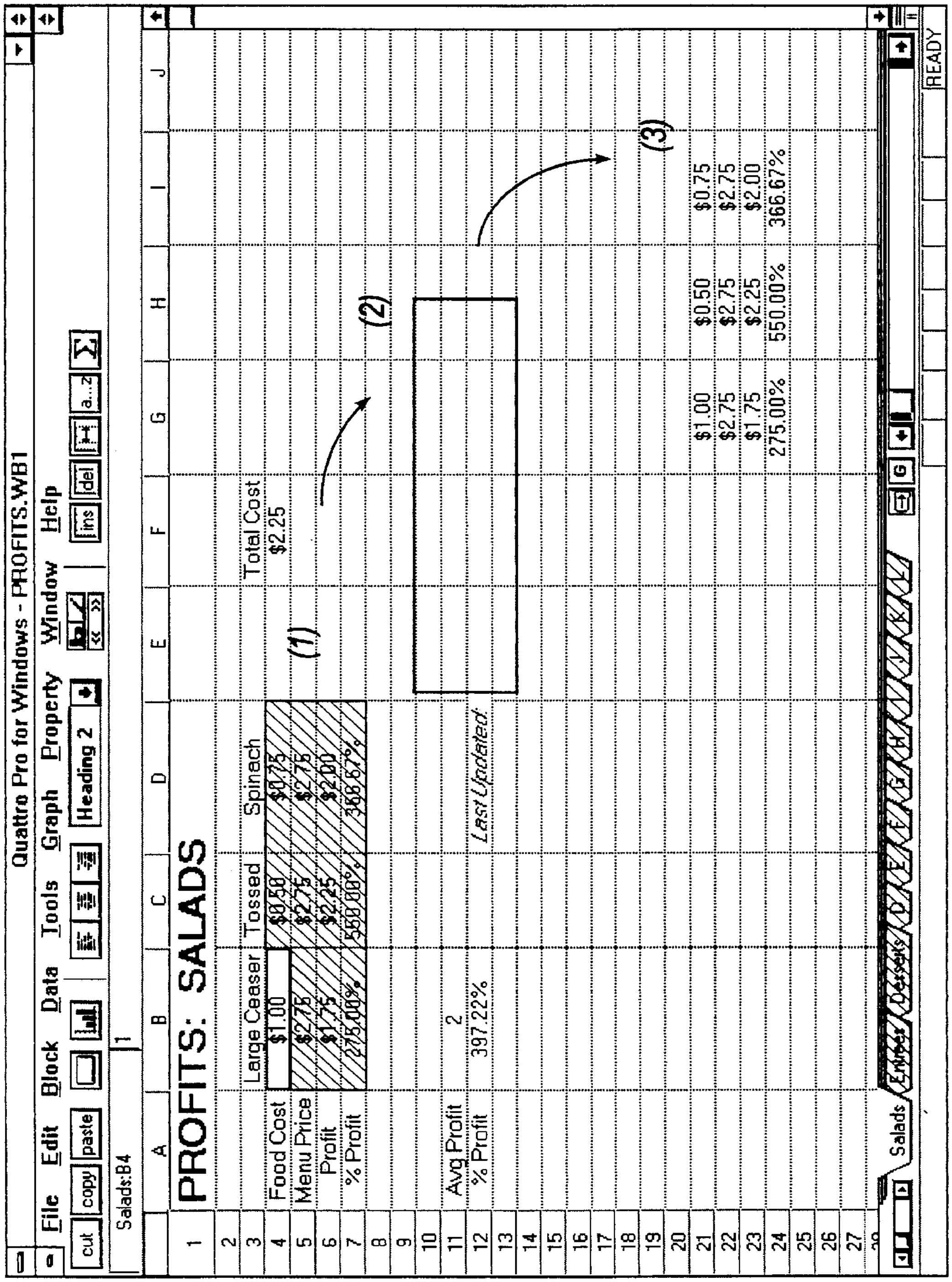
FIG. 4G is a screen bitmap illustrating drag-and-drop editing in the spreadsheet notebook of the present invention.

Whether 2-D or 3-D in nature, blocks of cells may be easily copied and cut (i.e., moved) using drag-and-drop editing techniques of the present invention. As shown in FIG. 4G for a 2-D block, for example, a method for copying a block of cells includes (1) selecting a source block by dragging a range of cells (e.g., mouse button-down events coupled with mouse movement across the range; close selection with a button-up event), (2) dragging the block (e.g., click within block, followed by repeated mouse button-down events), and (3) dropping the block (e.g., mouse button-up event at desired target location). In a similar fashion, 3-D blocks may be dragged and dropped.

Figure 4H:
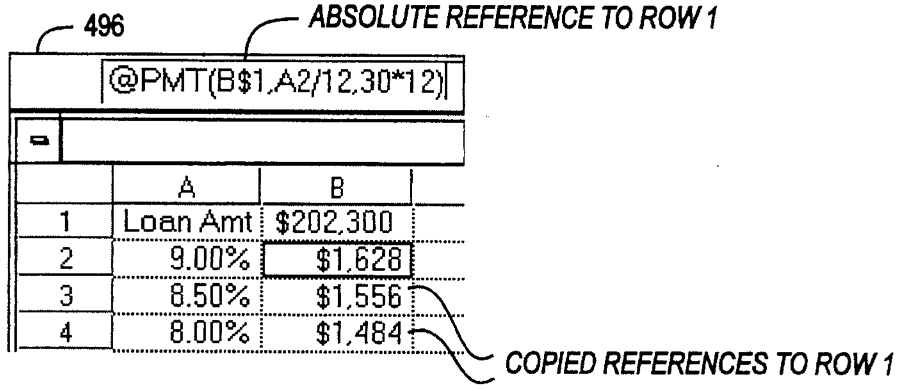
FIGS. 4H–J are a series of screen bitmaps illustrating the model copy method of the present invention.
Figure 4I:
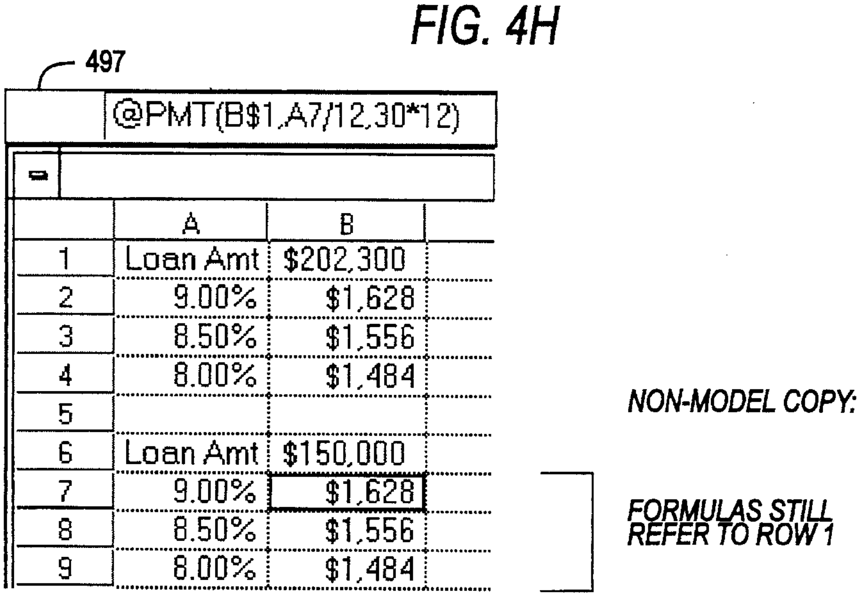
Figure 4J:
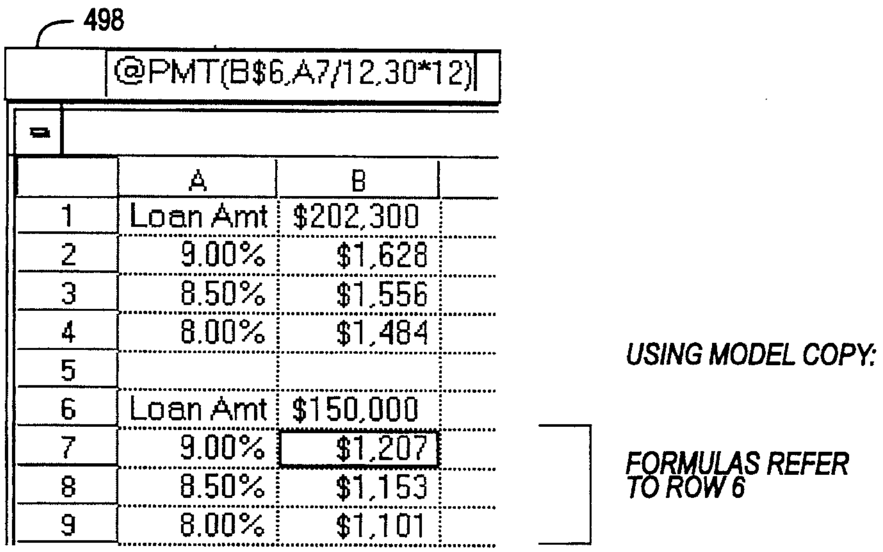

In typical cut and copy operations, relative and absolute cell addressing is employed, as is known in the art (see e.g., Using 1-2-3). According to the present invention, however, a "model copy" technique for copying blocks is also provided. Model copying, illustrated in FIGS. 4H–J, is useful when the user is copying a block that contains absolute references to cells within the copied block. In FIG. 4H, a small spread model 496 is shown which contains a formula to figure the monthly payment for a 30-year loan at different interest rates; a reference to the loan amount was entered as absolute so that when the formula is copied, it continues to refer to cell B1. The user may want to calculate (at the same time) monthly payments for different loan amounts and, thus, might copy the model, with the loan amount changed (shown in FIG. 4I as spread 497). However, in this approach the absolute reference still refers to row 1; to correct this, the user would typically manually edit each formula to refer to B6 instead of B1.

With model copying of the present invention enabled (e.g., by default or through a user dialog), however, the problem is solved. In particular, absolute references adjust to the new location of the referenced cell, as shown by spread 498 in FIG. 4J; however, absolute references remain absolute to make future copies absolute. For instance, should the user make more copies of the formula, the reference to cell B6 is still absolute. In this manner, model copying of the present invention saves the user time-consuming and error-prone editing of formulas.

Figure 4K:
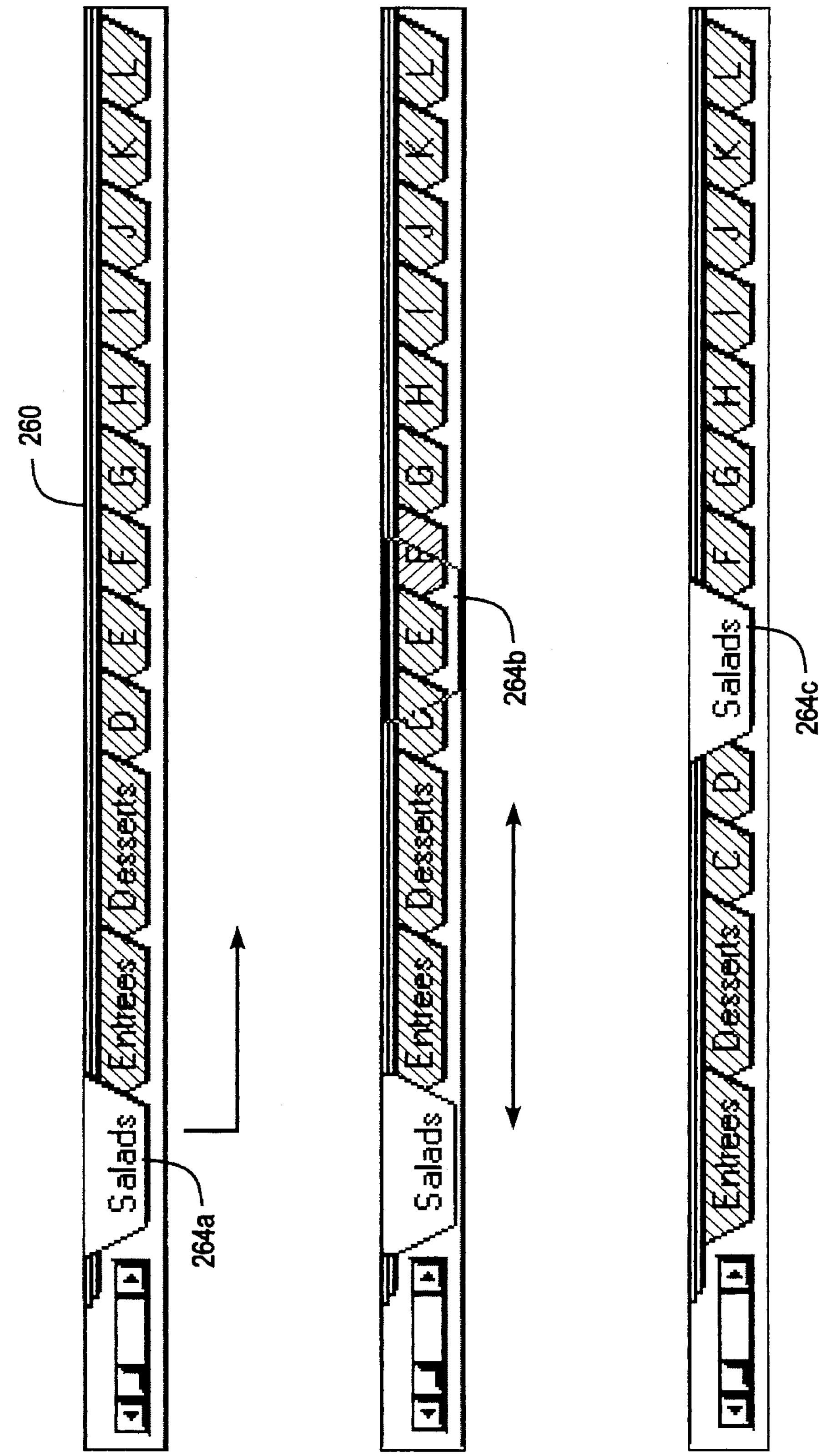
FIG. 4K is a set of bitmaps illustrating the operation of moving and copying a notebook page.

As shown in FIG. 4K, notebook pages may be copied or moved using the drag-and-drop editing techniques of the present invention (a dialog box is also provided as an alternative). As shown, for example, the "Salads" page is moved by selecting its tab identifier 264*a* from the identifiers 260; in a preferred method, the identifier is selected by dragging it downward (mouse button-down plus downward movement) with the mouse cursor. Next, the identifier is dragged to a desired new position (mouse button-down plus left and right movement). Once positioned at a desired location (as indicated by in-transit tab identifier 264*b*), the page is then "dropped" (mouse button-up) into position. Similarly, a "copy" operation may be effected by coupling the above operation with a status key (e.g., CTRL-); in a preferred method of copying, only the page information (not its tab identifier) is copied to a target location.

Additional editing operations may be easily accomplish using the page identifiers of the present invention. For example, an additional page may be inserted by selecting a desired tab and entering "INS" (keyboard or mouse). Similarly, a notebook page may be deleted by coupling the selection of a corresponding page tab to a delete command.

6. Advantages

Figure 4L:
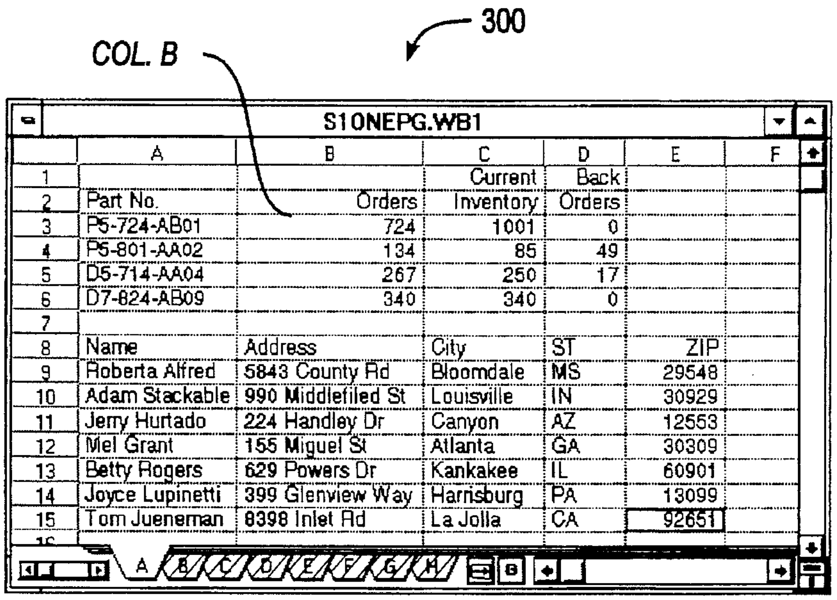
FIG. 4L–M are screen bitmaps illustrating the presentation of information in a notebook of the present invention.
Figure 4M:
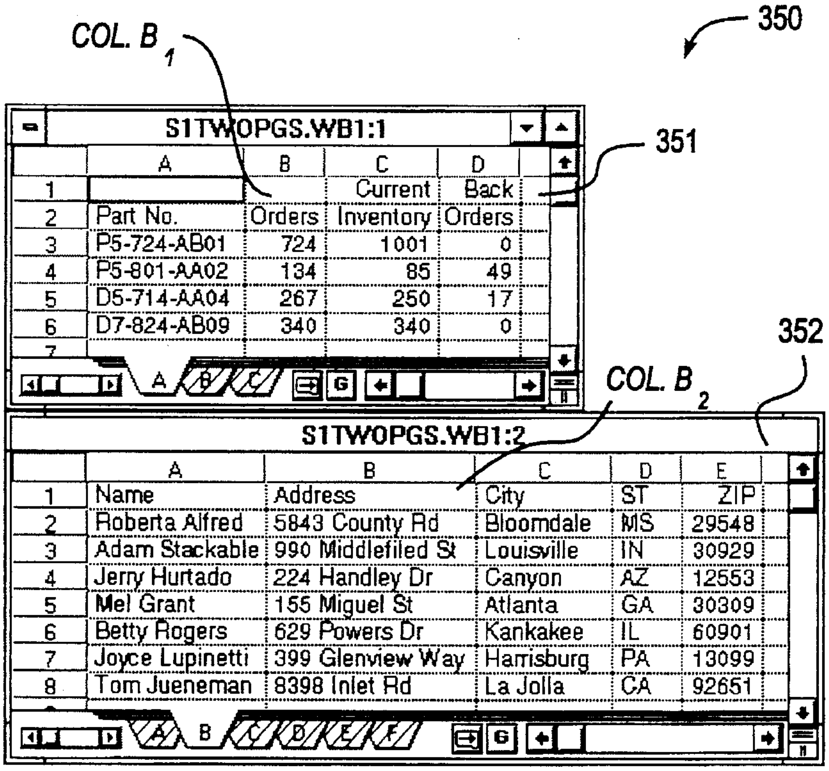

In contrast to prior art spreadsheet implementations, use of the spreadsheet notebook of the present invention is easily ascertained by the user. The notebook interface of the present invention provides a convenient means for organizing many spreadsheets together into one file. This permits the user to load (into memory 102) all related information with a single command, without having to remember a variety of different file names. Moreover, the notebook interface 250 encourages a user to spread data out among multiple pages, thus better organizing one's data. In FIG. 4L, for example, spreadsheet page 300 illustrates the conventional method for grouping unrelated information onto a single spreadsheet. As shown in column B, the incorporation of unrelated information into a single spread leads to unnecessary whitespace padding of information. In FIG. 4M, in contrast, related information is grouped on separate pages 351, 352 (e.g., with their own columns, Col. $B_1$ and Col. $B_2$) of notebook 350. Not only does this eliminate grouping of disparate information, with its disadvantages (e.g., padding data entries), but it also encourages better organization of information.

Inspecting and Setting the Properties of Objects

A. Disadvantages of Prior Techniques

Standard windowing interfaces depend heavily on a clunky system of pull-down menus. While pull-down menus are an improvement over command-line (e.g., MS-DOS) interfaces, they are non-metaphoric or non-analogous to ordinary objects, i.e., ones familiar to the user. Thus, prior art windowing GUIs are no more intuitive or useful to the user than other menuing systems.

Perhaps the biggest weakness of pull-down menus is the requirement that the user must know beforehand which menu contains the item or function of interest. If the user does not know which pull-down menu, submenu, or dialog box contains the item he or she is seeking, the user will spend an inordinate amount of time checking the contents of each in an effort to hunt down the needed item. And often the search is in vain. Moreover, since functions for a given object (e.g., text object) are often scattered over several disparate menus, the user is discouraged from interacting and experimenting with the object.

One approach to overcoming this problem has been the implementation of "smart icons." This interface technique employs screen buttons painted with icons which are supposed to tell the user what the buttons do. This approach, however, often makes the interface problem even worse because the meaning of the icons are not easily grasped. Thus, the approach is often no more helpful than hiding the desired function deep inside a menuing system. Worse, some button images are so small or so numerous that it is hard to see the icons well enough to discern what they mean.

B. Property Inspectors

1. Introduction

Overcoming this problem, the present invention provides "property inspectors" for inspecting and setting the properties of objects. Property inspectors of the present invention examine an object of interest to the user and tell the user what can be done to it. In this manner, the present invention requires the system and its interface components (e.g., menus or dialog boxes), not the user, to know what functions are being sought or may be of immediate interest to the user. Moreover, property inspectors of the present invention require the program to present functions to the user when and where he or she requests them, rather than making the user hunt for them when they are needed. Thus, the user need only know which data item or object he or she wants to inspect or manipulate.

In the spreadsheet notebook, for example, there are many kinds of objects which one can use. Examples include cells, blocks of cells, pages, notebooks, graphs and their elements (including bars or axes), dialog boxes, and even the application program itself. Each of these objects has properties, which are characteristics of that particular object. For example, blocks of cells have a font property that can be set to bold, so that the text of entries in the block appear in boldface type. A property of a workbook page, on the other hand, is the name that appears on its tab. Each notebook has its own palette property for controlling available colors. Application properties, for instance, include system defaults, such as a default storage directory or file extension. Thus in any system, the user has a variety of objects available, each of which has its own set of properties.

Property inspection of the present invention provides the user with immediate access to an object's properties. If the object of interest is a spreadsheet cell, for example, the property inspector of the present invention produces a menu that includes font, color, border, size, and other display properties, along with formula properties which may be modified. If, on the other hand, the object is a graph, the property inspector will display a menu to change its color, shape, borders, and other features of a spreadsheet graph. Moreover, inspection menus are state or context-sensitive, i.e., constructed on-the-fly to reflect the current state of the object. If an object's properties change so that what a user can do to it also changes, the property inspector of the present invention will create a new and appropriate menu reflecting those changes.

A variety of user events, including keyboard and mouse events, may be employed to invoke property inspection and setting. In a preferred method of the present invention, however, an object is inspected by selecting the object with a screen cursor, i.e., clicking (generating a mouse event) on the object. Since, according to the present invention, property inspection may be available across different modes of operation (i.e., generally available at all times), the generated mouse event or signal is preferably one which does not launch or otherwise invoke routine object actions. Instead, the mouse signal should be one which the user will easily associate with inspection of an object. In a two or three mouse button embodiment of the present invention, therefore, the generated mouse signal is most preferably from the lesser-used or right mouse button (e.g., Windows' WM_RBUTTONDOWN). In this manner, the user associates object actions with left button signals and object inspection with right button signals.

2. Exemplary Embodiments

Figure 5A:
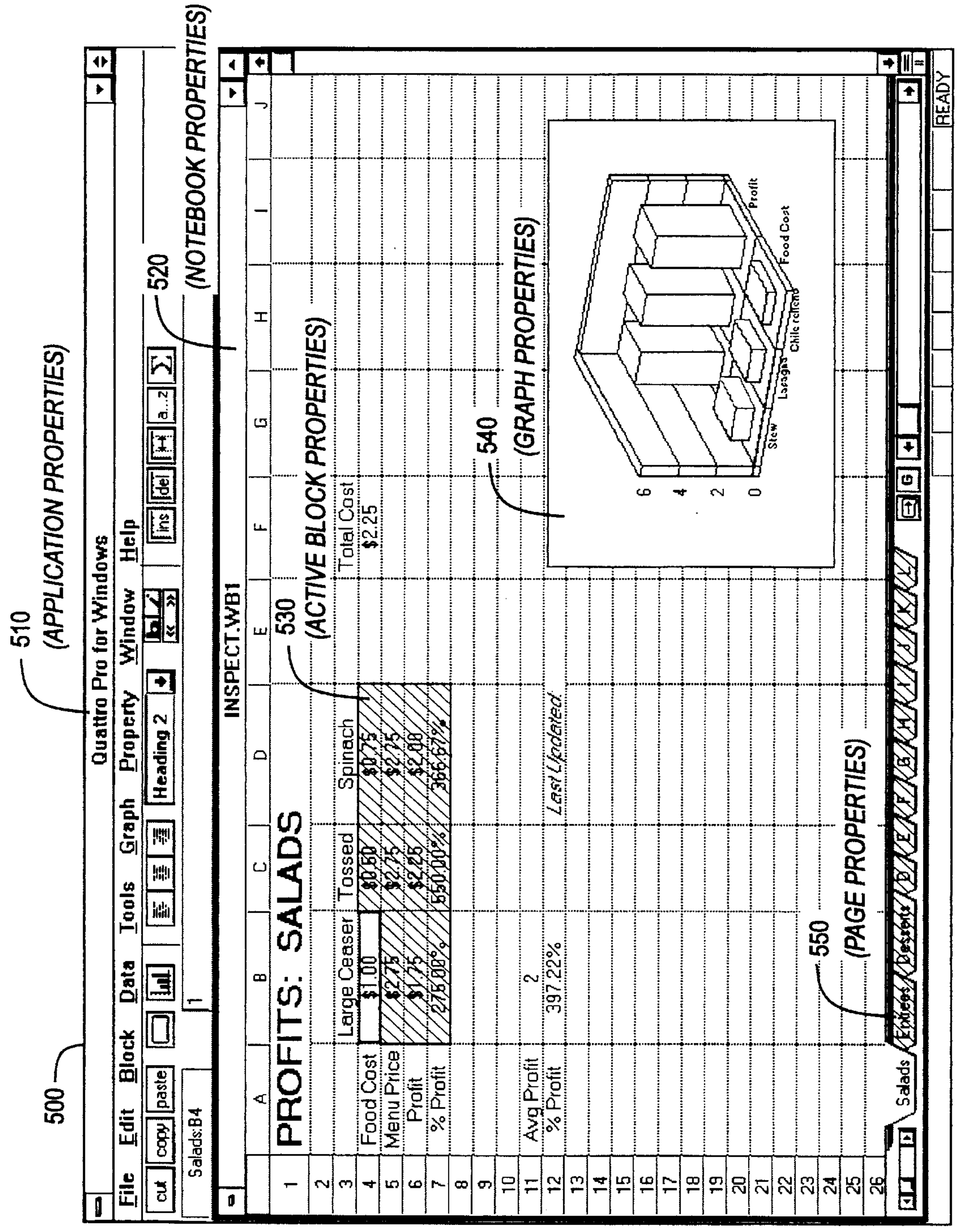
FIG. 5A is a screen bitmap illustrating exemplary objects of the spreadsheet notebook of the present invention.
Figure 5B:
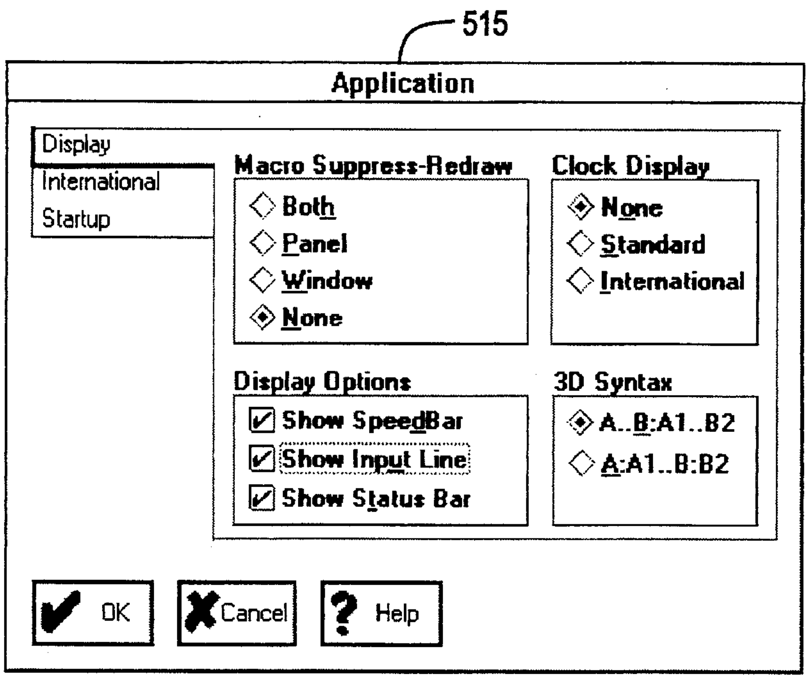
FIGS. 5B–E are bitmaps illustrating property inspectors of the present invention, for the objects of FIG. 5A.
Figure 5C:
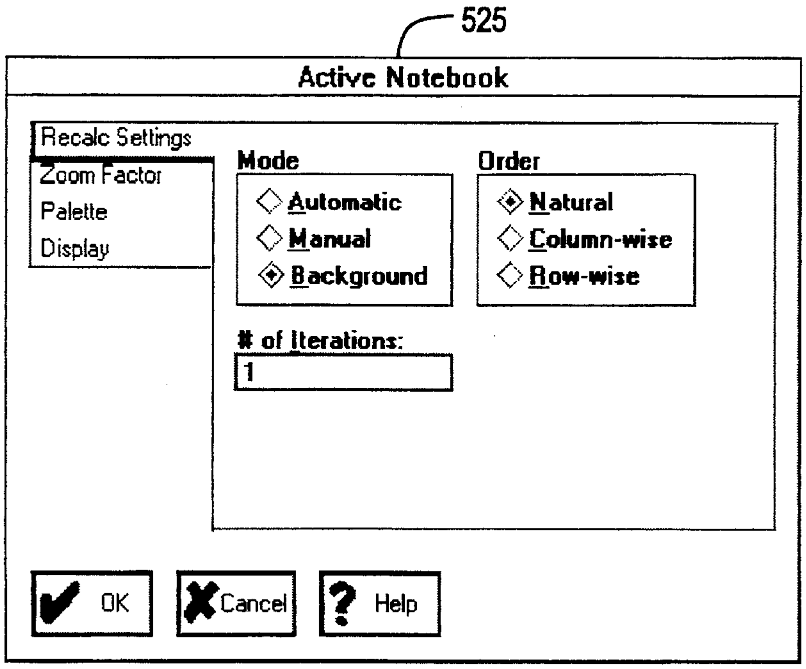

Referring now to FIGS. 5A–E, the inspecting and setting of object properties, in accordance with the present invention, is illustrated. In FIG. 5A, a notebook application window 500 is shown. Window 500 includes a variety of objects which may be inspected by the property inspector of the present invention. The top-most object is the application itself: application object 510. By selecting the application object (e.g., by right mouse clicking on the application title bar), various properties for the application may be inspected and set. As shown in FIG. 5B, inspection of the application object 510 invokes application inspector 515, which lists the various properties of the application object; the user may now inspect and set the properties of the object, as desired.

Referring back to FIG. 5A, the next level which may be inspected is the notebook object 520. User inspection of this object, e.g., by right mouse clicking on the notebook title bar, invokes the active notebook property inspector 525 of FIG. 5C. In a manner similar to the application property inspector, the notebook property inspector 525 includes all the properties and corresponding options which may be set for the notebook 520.

Figure 5D:
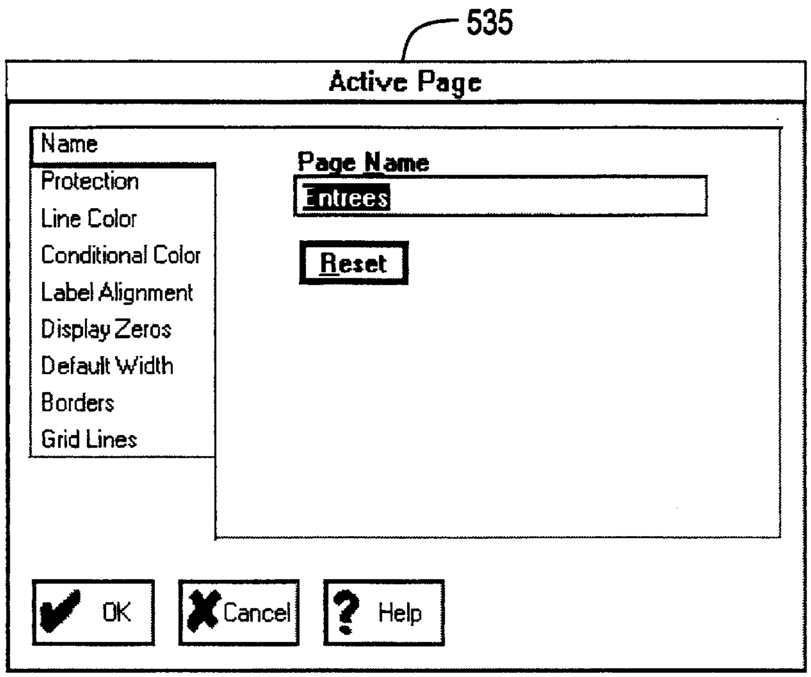

Notebook object 520 includes a plurality of page objects, which may themselves be inspected. To inspect the page object 550, for example, the user brings the page tab into view (if it is not already displayed), then right clicks the tab page. This action invokes the active page property inspector 535, as shown in FIG. 5D. With access to page properties, the user can control the page name, overall page protection, line color, colors in cells that meet certain conditions, default label alignment, whether zeroes are displayed, default column width, row and column borders, gridline display, and the like. To assign a more descriptive name to a page, for example, its tab is inspected and the option "NAME" is selected from the page property inspector (or, as shown, it is selected by default). After the user enters a new name, the new name appears on the page tab. Other page properties, most of which affect the appearance of data or screen elements, may be set in a similar manner.

Figure 5E:
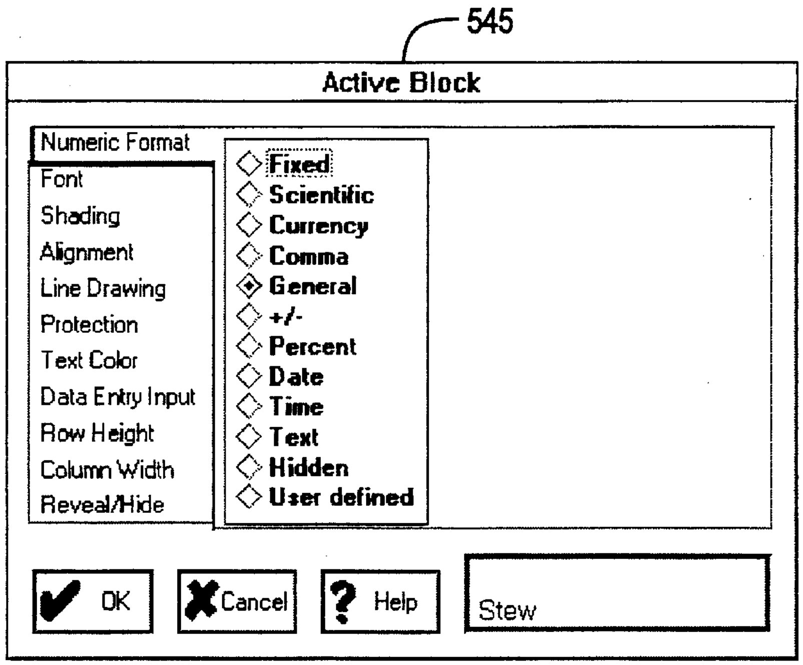
Figure 6A:
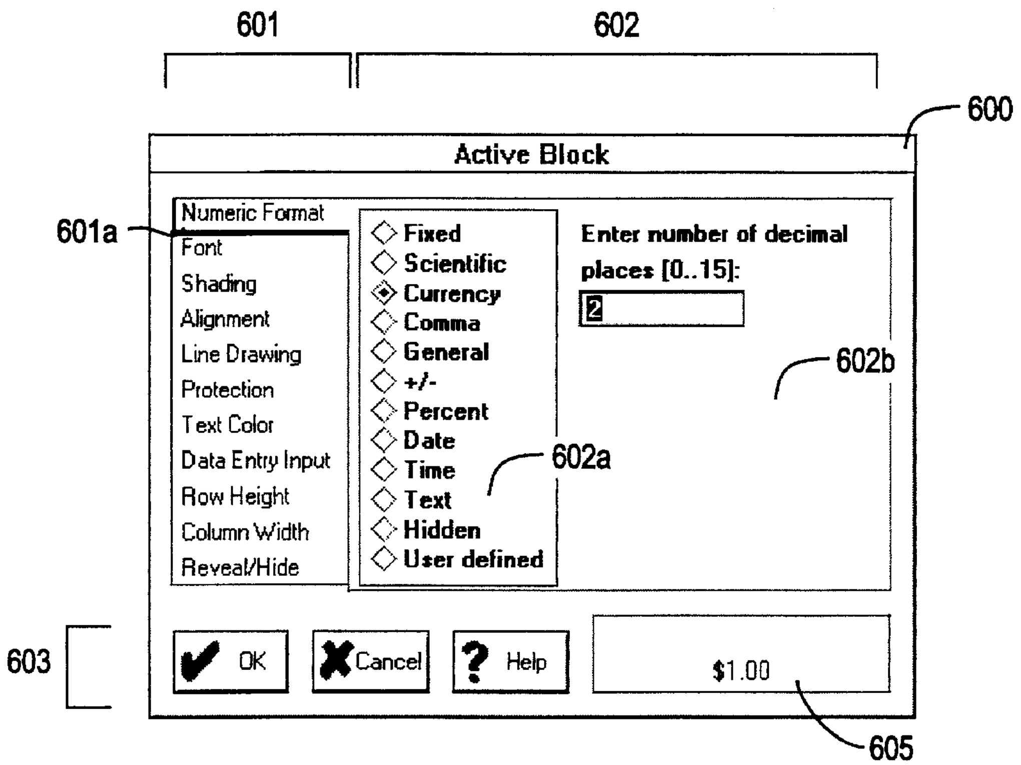
FIGS. 6A–K are bitmaps illustrating different states (and accompanying panes) for the property inspector of FIG. 5E, each state depending on a particular property of the object being inspected.
Figure 6B:
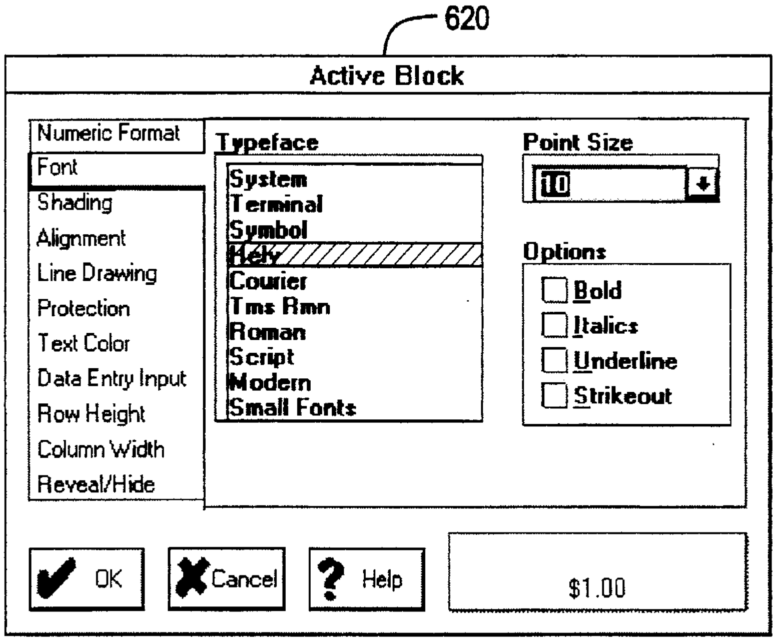
Figure 6C:
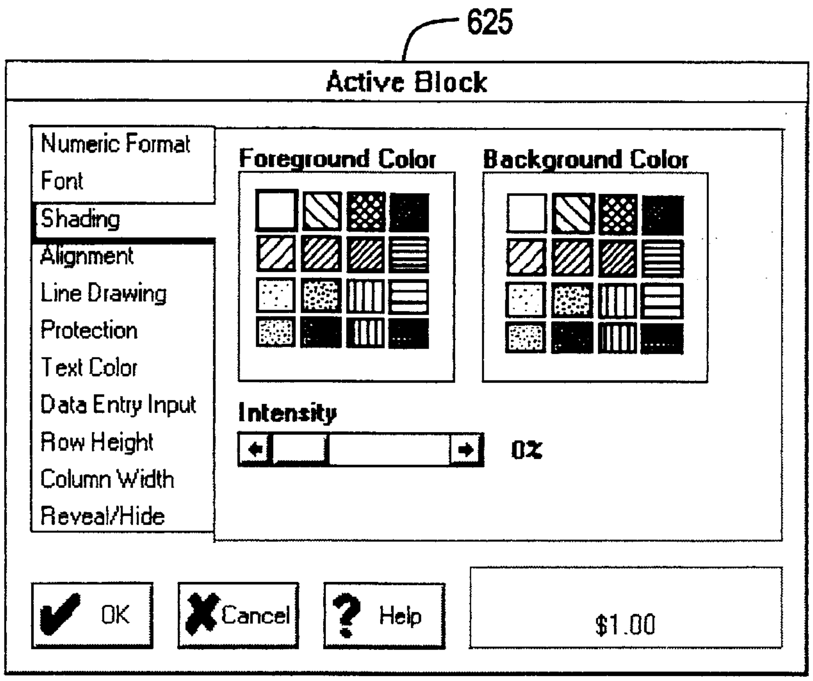
Figure 6D:
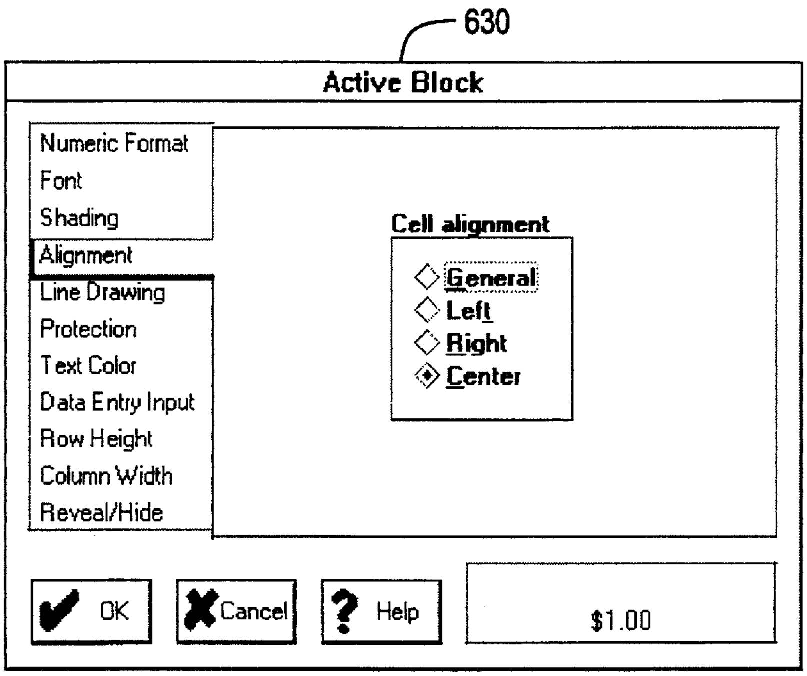
Figure 6E:
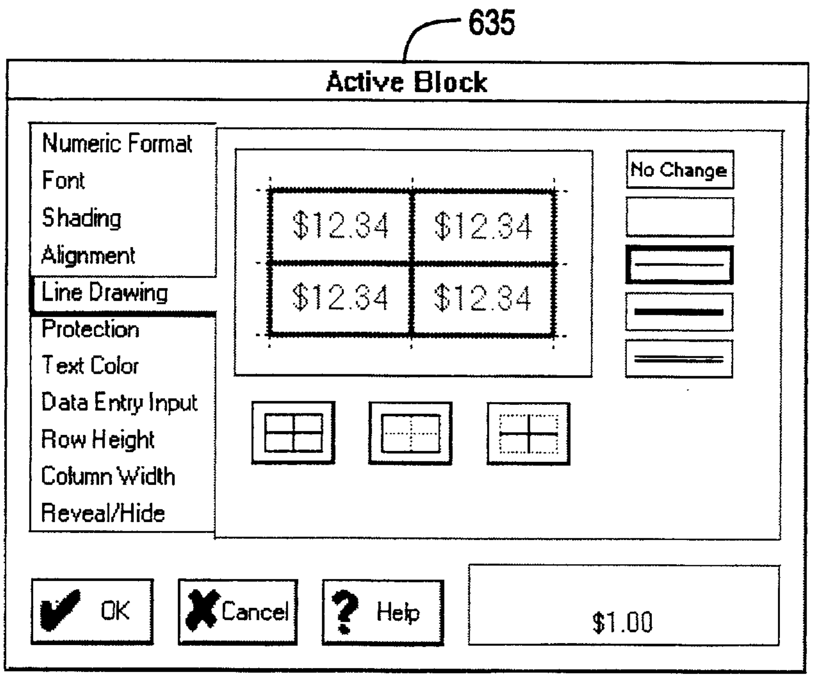
Figure 6F:
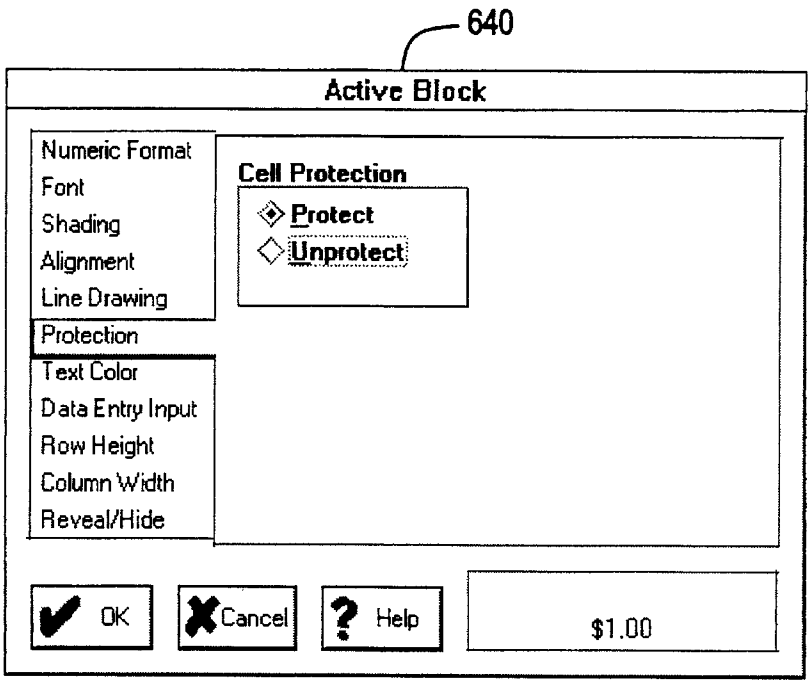
Figure 6G:
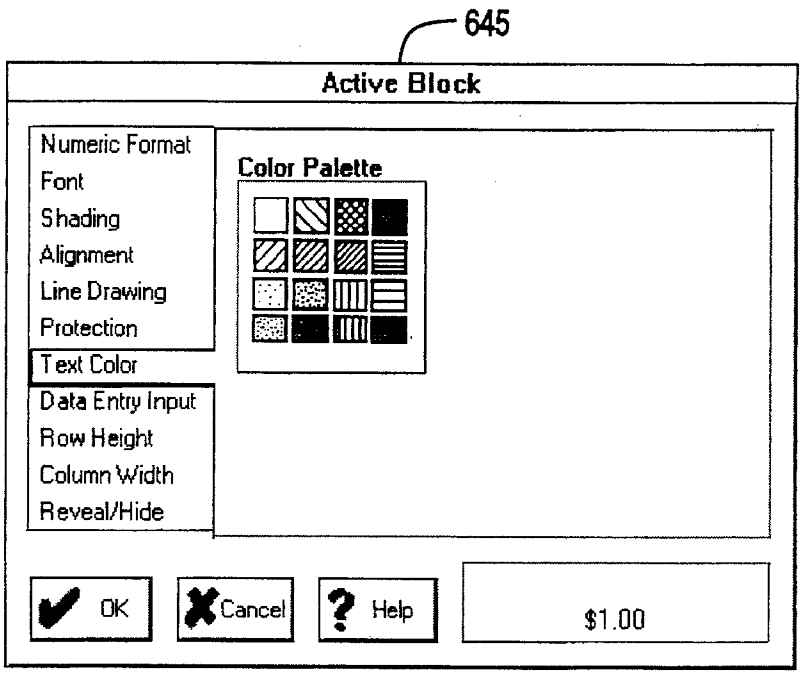
Figure 6H:
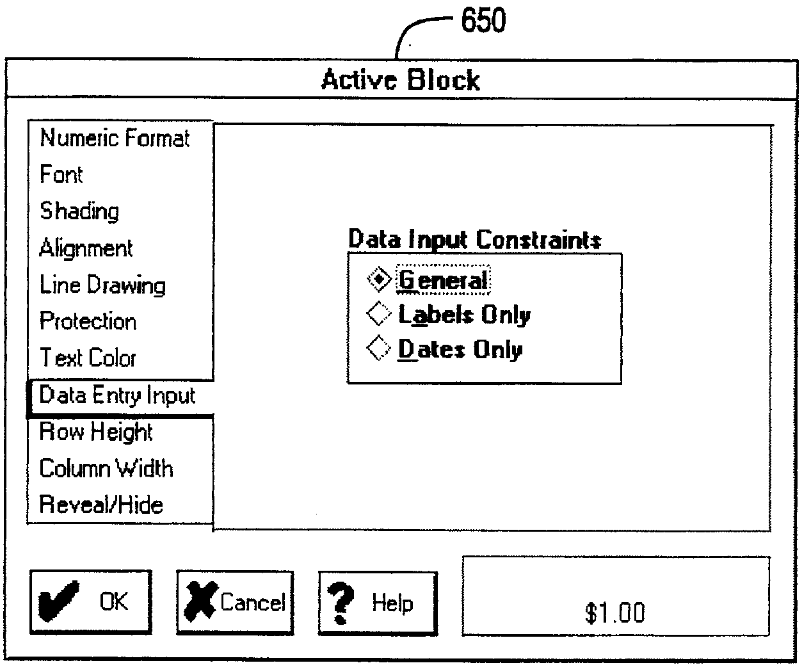
Figure 6I:
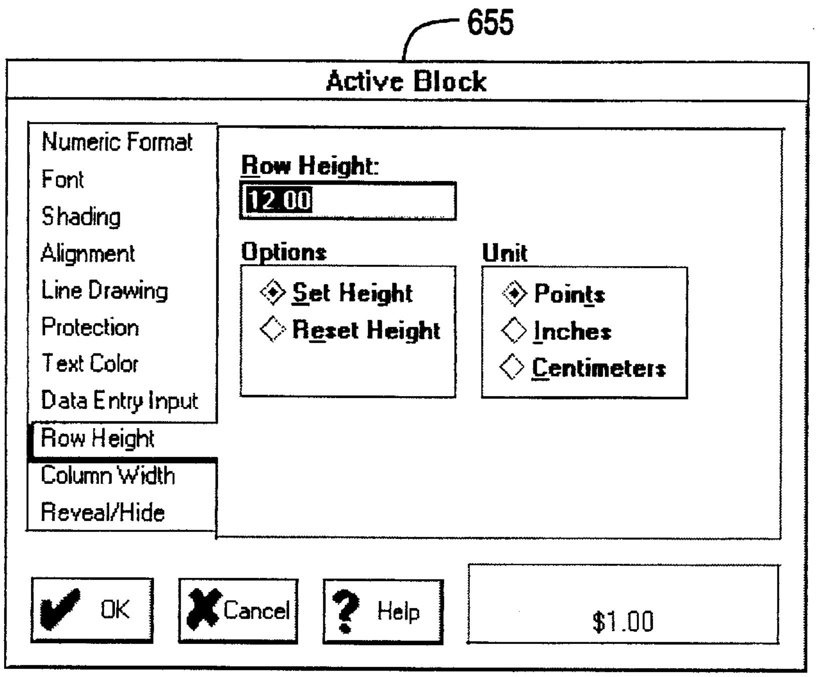
Figure 6J:
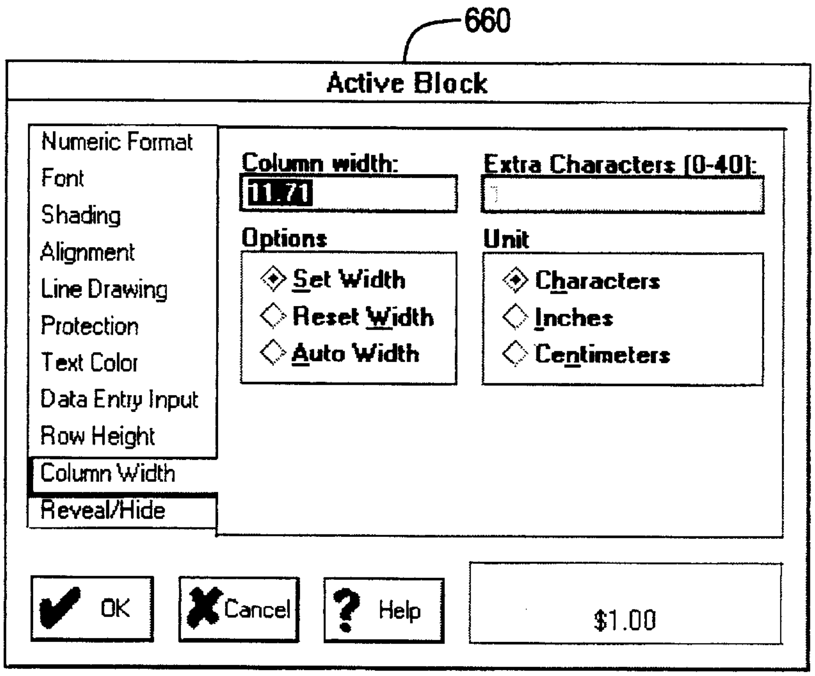
Figure 6K:
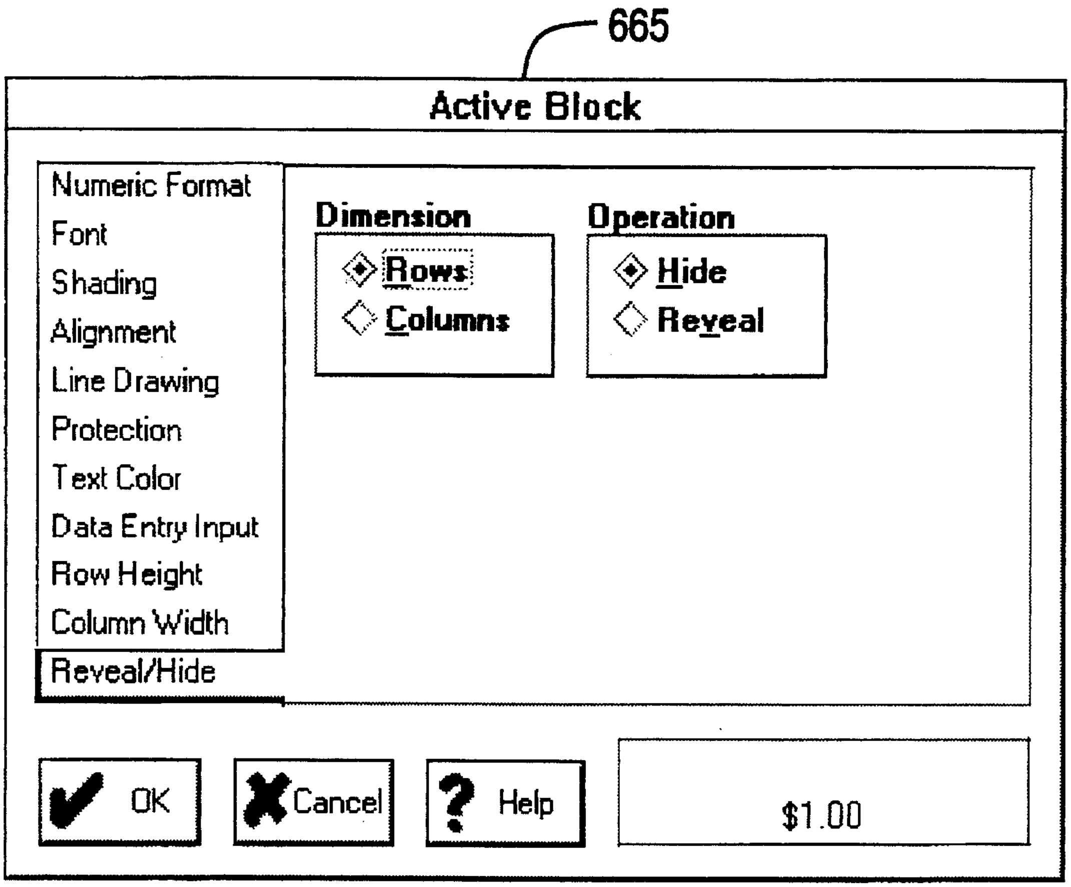
Figure 7A:
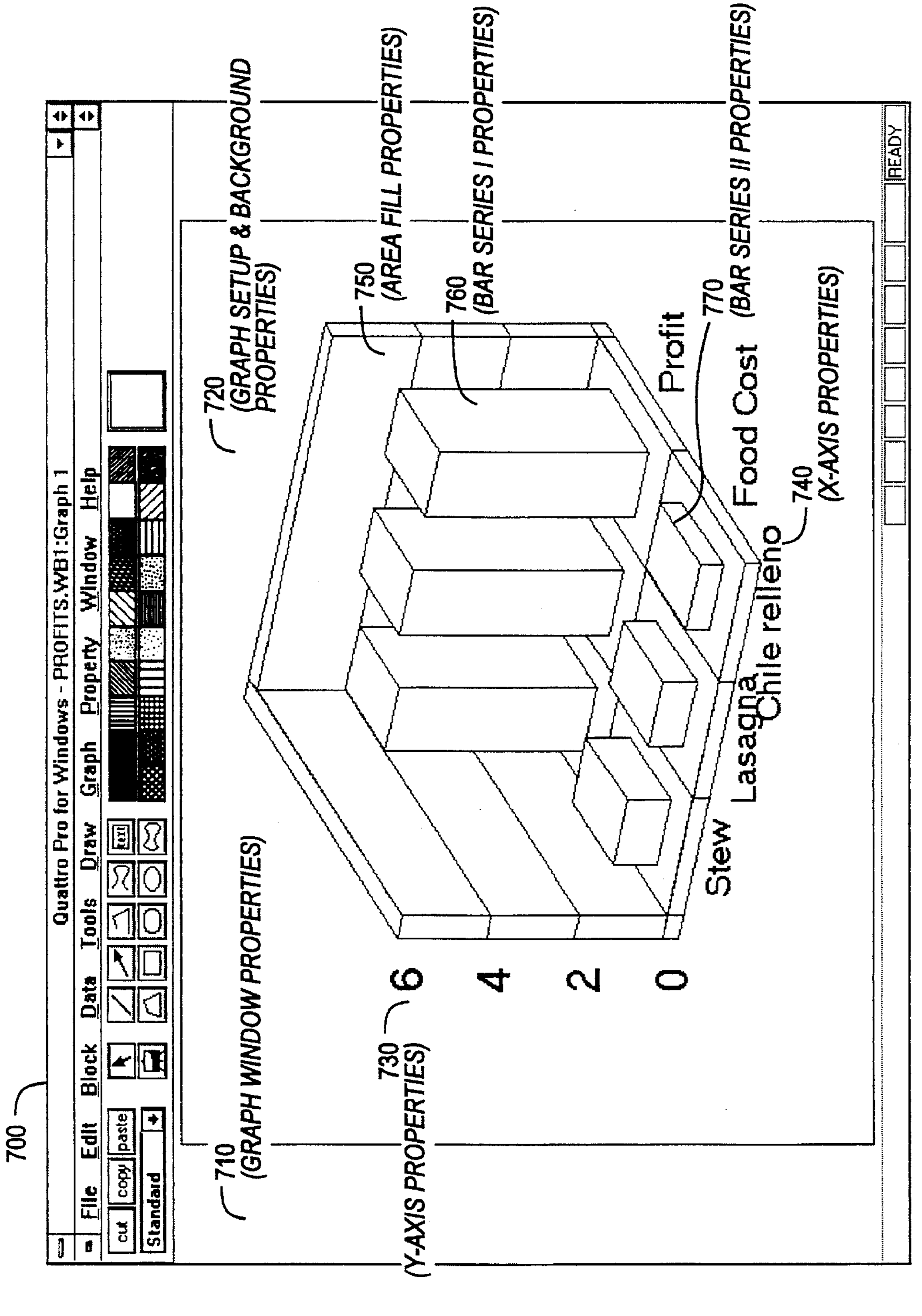
FIG. 7A is a screen bitmap illustrating a graph window of the present invention, with different graph objects available for property inspection.
Figure 7B:
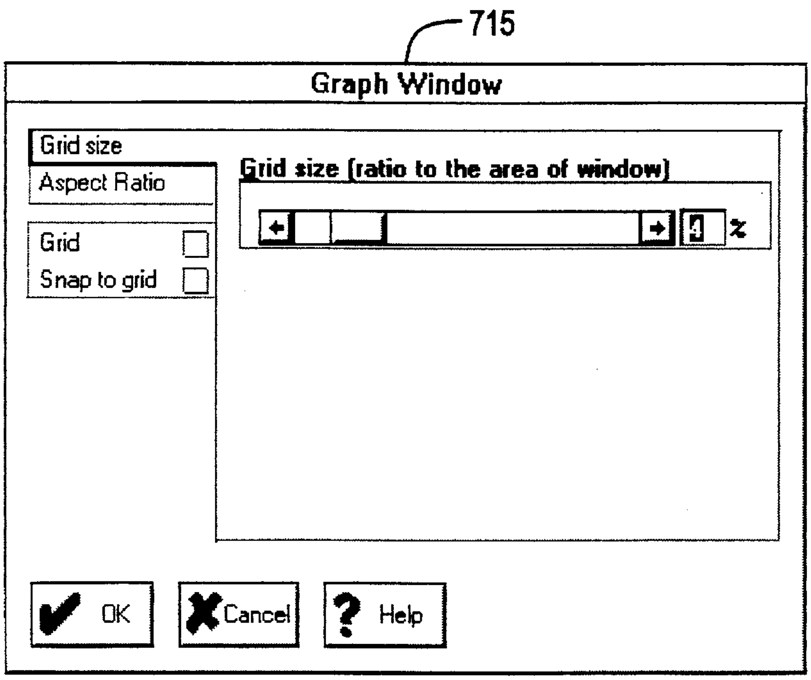
FIGS. 7B–H are bitmaps illustrating exemplary property inspectors of the present invention for the graph objects of FIG. 7A.
Figure 7C:
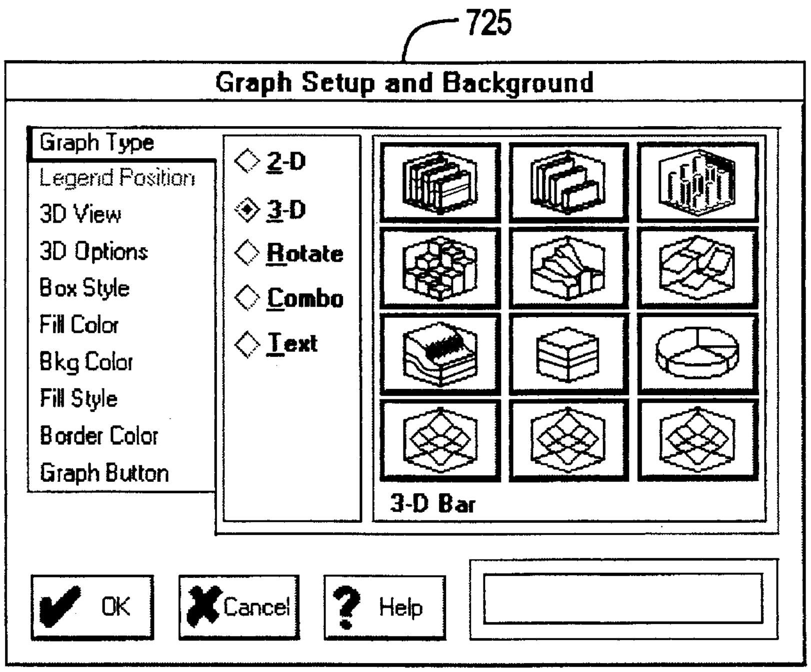
Figure 7D:
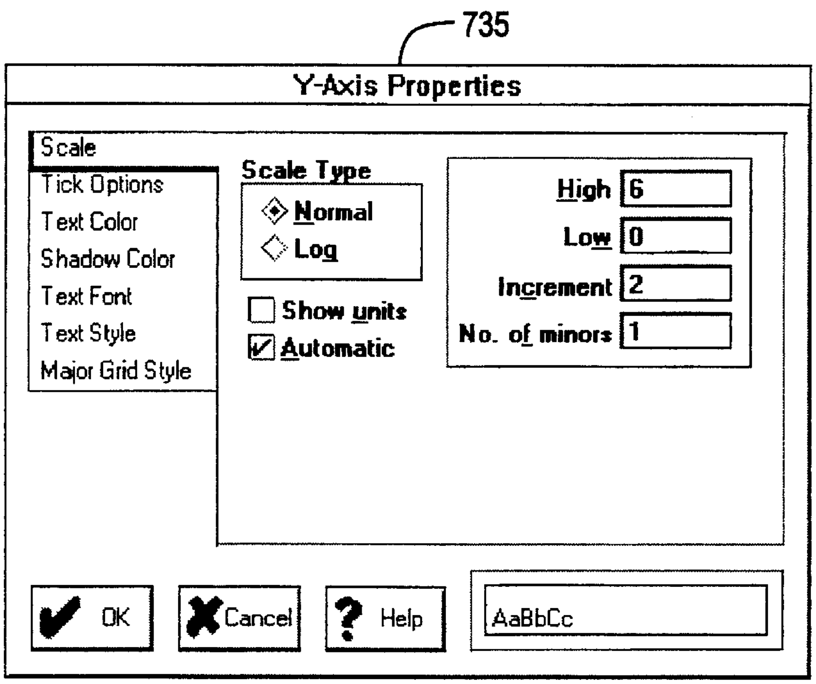
Figure 7E:
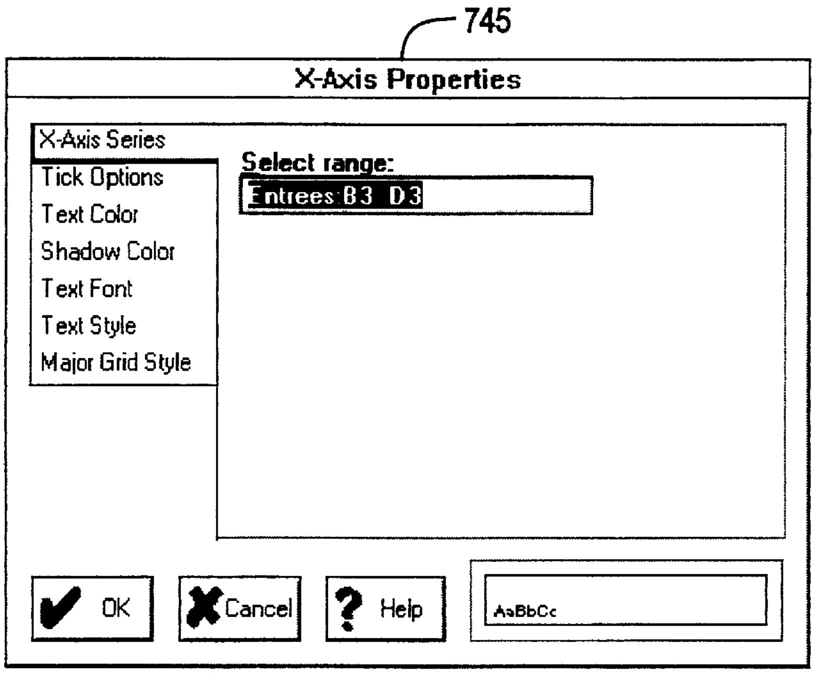
Figure 7F:
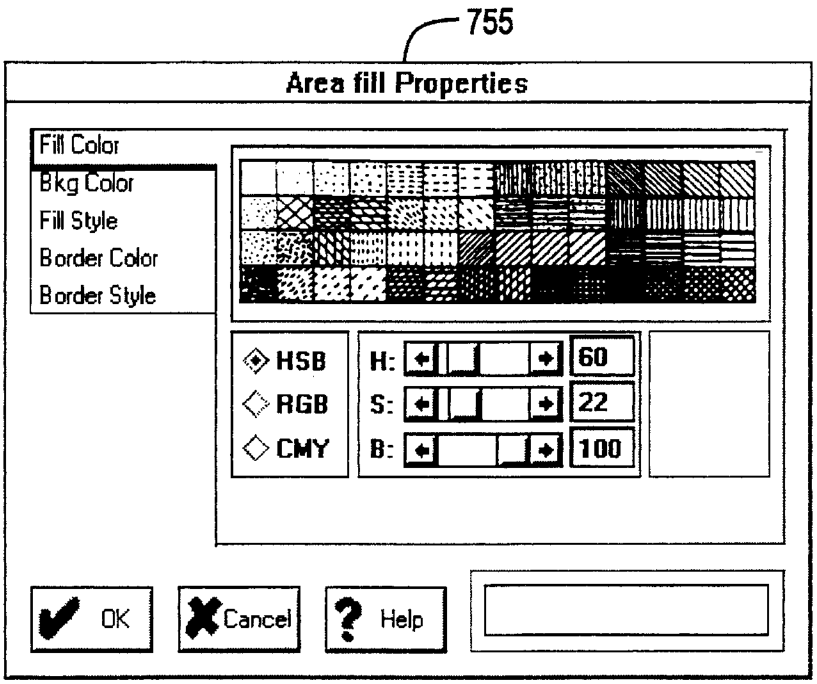
Figure 7G:
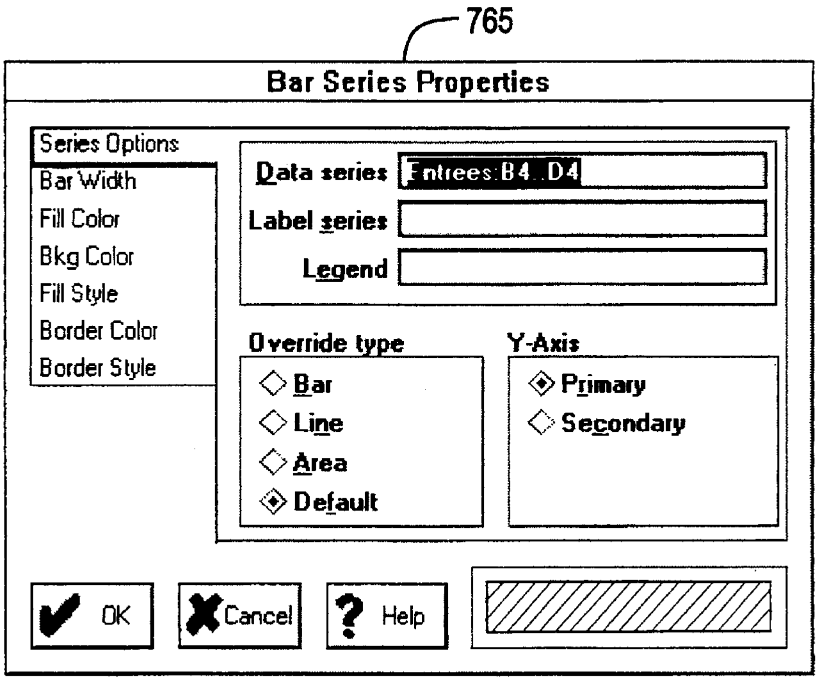
Figure 7H:
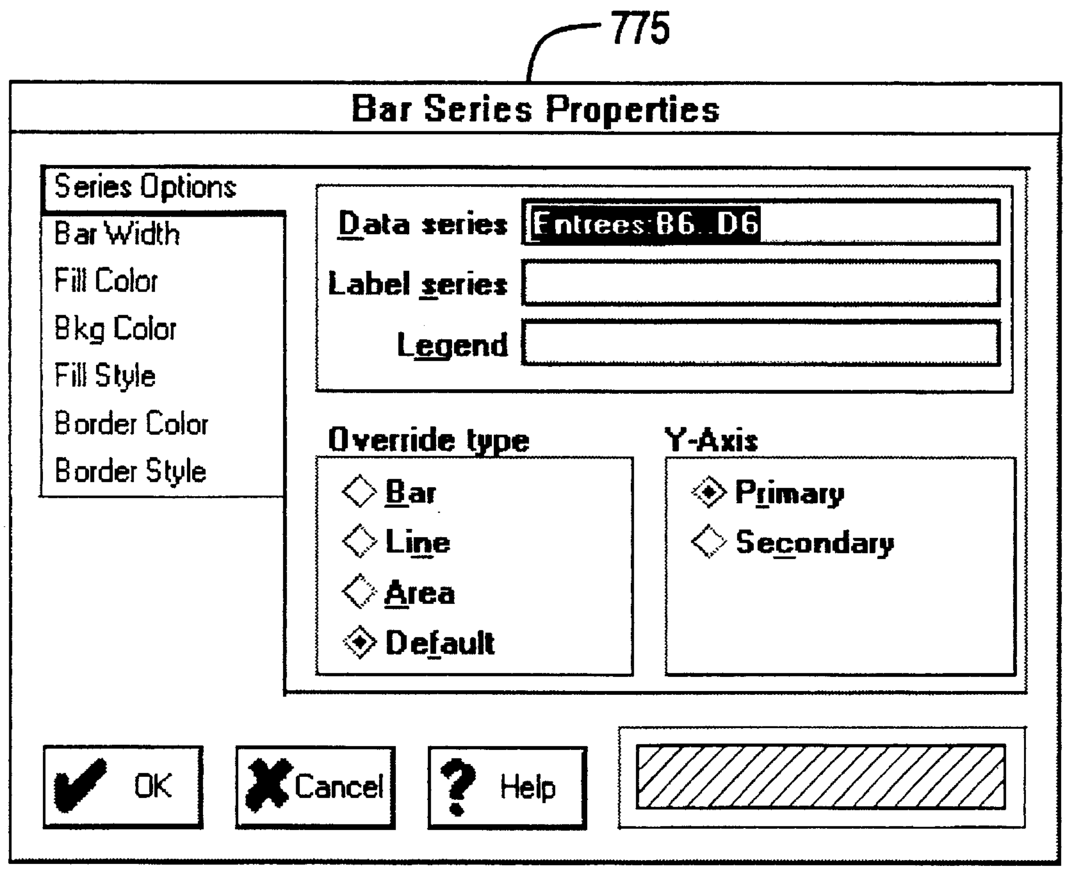

Each page object may also contain other objects, including cell, blocks of cells, graph objects, and the like, each of which may be inspected. By right clicking the active block 530, the active block property inspector 545 is opened as shown in FIG. 5E. With block properties, the user can change alignment of entries, numeric format of values, block protection, line drawing, shading, font, text color, types of data allowed in a cell, row height, column width, and whether columns or rows are revealed or hidden; inspection of a single cell occurs in a similar manner (i.e., active block is one cell). In this manner, the user may select block properties which affect the appearance of cell entries or of rows or columns; additionally, properties which affect the way data can be entered into blocks, such as protection and data entry input, may be made.

Upon invocation of property inspection, a dialog box or property inspector is displayed, preferably at or near the object of interest. A different property inspector appears depending on the type of object which is inspected. At this point, the user may then select the property that he or she wishes to change from a list of object properties. The contents of the right side of the inspector (i.e., a "pane" within the inspector) change to correspond to the property one chooses, as shown. Then, the user chooses settings for the current property. If desired, the user can then choose and set other properties for the current object. In a preferred embodiment, the property inspector includes an example box, which shows the display result of the property the user has just set, before they are applied to the actual object.

Referring now to FIGS. 6A–K, the construction and operation of a property inspector dialog box, in accordance with the present invention, is described. For purposes of illustration, the following description will present active block property inspector 600; other inspector dialogs may be implemented in a similar fashion. Shown in FIG. 6A, the active block property inspector 600 includes an object property list 601 and property settings pane 602. For an active block, for example, relevant properties include Numeric Format, Font, Shading, Alignment, Line Drawing, Protection, Text Color, Data Entry Input, Row Height, Column Width, and Reveal/Hide. Property settings pane 602 include the valid options or settings which a property may take. For the property of numeric format, for example, valid settings include fixed, scientific, currency, and the like. Property setting pane 602 may further include subproperties. For example, the currency setting 602*a* shown may also include a decimal place setting 602*b*. In this manner, property inspector dialog 600 presents a notebook dialog: property list 601 serves as notebook tabs (e.g., dialog tab 601*a*) and property settings panes 602 serves as different pages of the notebook dialog. Thus, the user may access numerous dialog options with the efficiency of a notebook.

Also shown, property inspector dialog 600 also includes an example window 605 and dialog controls 603. As new properties are selected and set, their net effect is shown. The example element in example window 605, for example, shows the effect of selecting a numeric format of currency with two decimal places. Thus, the user may experiment with changes before they are applied to the data object. After desired property changes are entered, control components 603 are invoked to either accept ("OK button") or reject ("CANCEL button") the new property settings; if desired, help may be requested.

As shown in FIGS. 6B–K, other properties of a cell block are accessed by selecting the desired property from the property list 601. Thus the active blocks property inspector 600 changes to inspector 620 for font properties, inspector 625 for shading properties, inspector 630 for alignment properties, inspector 635 for line drawing properties, inspector 640 for cell protection properties, inspector 645 for text color properties, inspector 650 for data entry input properties, inspector 655 for row height properties, inspector 660 for column width properties, and inspector 665 for reveal/hide properties. In each instance, a new pane (i.e., one having the attributes of interest) is displayed in the inspector window.

Referring now to FIGS. 7A–H, the inspection (and setting) of properties for graphs is illustrated. Graph window 700 includes a plurality of graph objects, each of which may be customized through use of a corresponding property inspector of the present invention. To display a corresponding property inspector, the user invokes the inspector (e.g., right-clicks) for the part (object) of the graph he or she wishes to change. A right-click on the graph window object 710, for example, will invoke the graph window inspector 715; at this point, the user may inspect and set various properties of the graph window object. In a similar manner, other objects of the graph window may be inspected. For example, inspection of graph background 720 invokes inspector 725, Y-axis object 730 invokes inspector 735, X-axis 740 invokes inspector 745, area fill object 750 invokes inspector 755, bar series object 760 invokes inspector 765, and bar series object 770 invokes inspector 775.

Internal Operations

A. Introduction

Internal operations of the system 100 will now be described in detail. In general, operation is driven by methods of the present invention, which are invoked by Windows' message dispatcher in response to system or user events. The general mechanism for dispatching messages in an event-based system, such as Windows, is known in the art; see, e.g., Petzold, C., *Programming Windows,* Second Edition, Microsoft Press, 1990. Additional information can be found in Microsoft's Window Software Development Kit, including: 1) *Guide to Programming,* 2) *Reference,* Vols. 1 and 2, and 3) Tools, all available from Microsoft Corp. of Redmond, Wash. Of particular interest to the present invention are class hierarchies and methods of the present invention, which are implemented in the C++ programming language; see e.g., Ellis, M. and Stroustrup, B., *The Annotated C++ Reference Manual,* Addison-Wesley, 1990. Additional information about object-oriented programming and C++ in particular can be found in Borland's C++ 3.0: 1) *User's Guide,* 2) *Programmer's Guide,* and 3) *Library Reference,* all available from Borland International of Scotts Valley, Calif. The disclosures of each of the foregoing are hereby incorporated by reference.

B. Notebooks

Figure 8A:
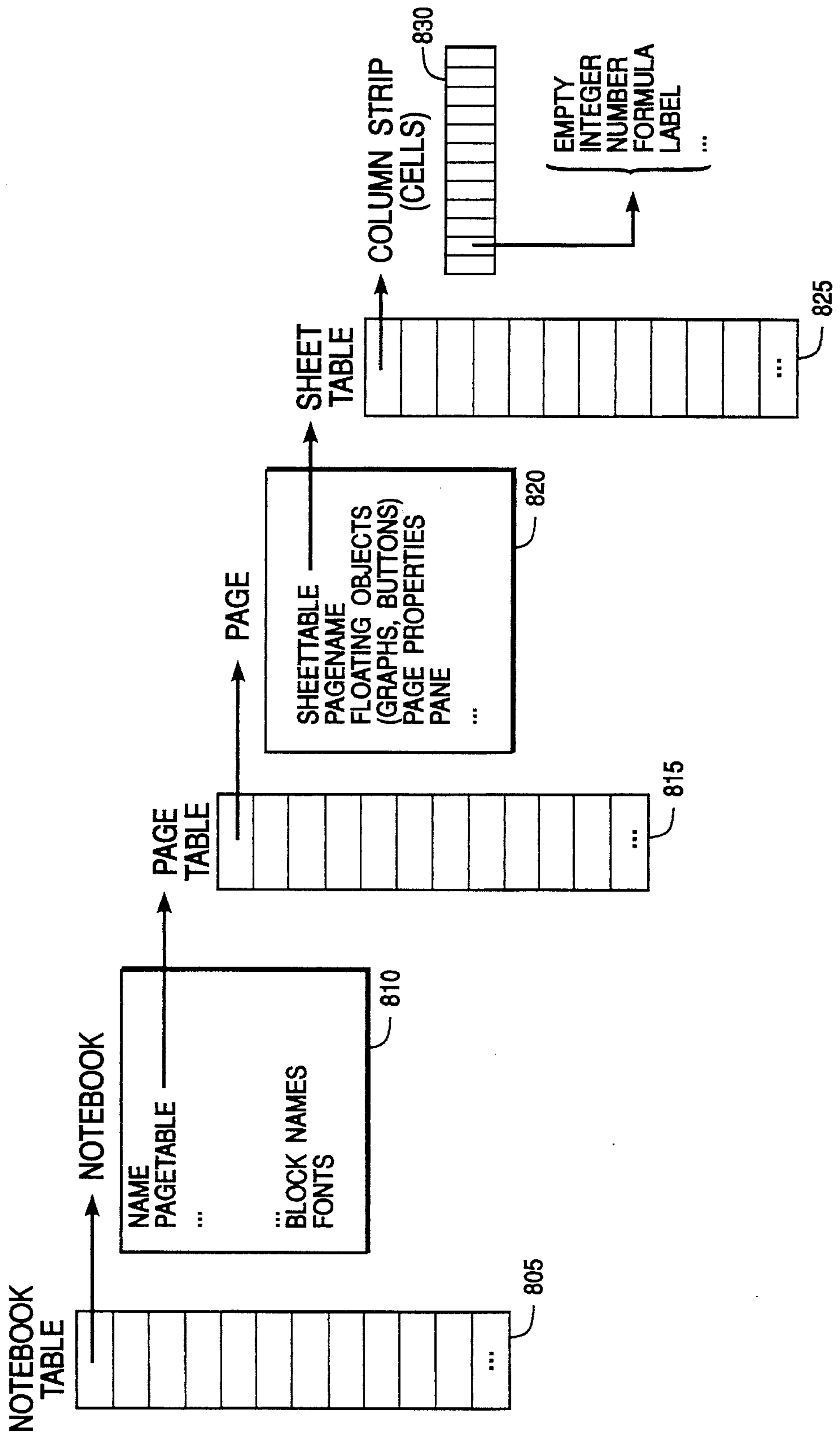
FIG. 8A is a block diagram illustrating the structure and operation of a spreadsheet notebook of the present invention.

Referring now to FIG. 8A, the internal structure and operation of spreadsheet notebooks of the present invention will be described. The spreadsheet notebook system of the present invention includes a system hierarchy 800, at the top level, having a notebook table 805 with entries or slots for accessing a plurality of notebooks. For example, the first slot addresses or points to notebook 810. In this manner, the system may track multiple notebooks.

Notebook structure 810, in turn, includes or accesses various data members for a particular notebook. For example, a "Name" field, stores the name assigned for the notebook. This name is displayed in the titlebar for the notebook and is used as the name for the corresponding disk file; the notebook name is also used to reference the notebook in formulas (e.g., contained in other notebooks). Notebook 810 also includes other data members, such as block names and fonts. Block names are text strings or labels which the user has defined for particular blocks of interest. Fonts, on the other hand, include font information (e.g., type and size) for the notebook. Other desired properties, specific to a notebook, may be included as desired. As exemplary construction of a notebook structure (class), in accordance with the present invention, is set forth hereinbelow in an Appendix A.

Of particular interest in the notebook structure 810 is the Pagetable field, which includes a pointer to a page table for the notebook. Pagetable 815 includes a plurality of slots or entries for accessing individual page structures of the notebook. Each page structure, in turn, contains or accesses information of interest to an individual page. As shown, for example, page 820 (pointed to by the first slot of the pagetable) includes or accesses: a sheet table (or Graphs page), a pagename, floating objects (e.g., graphs and buttons), page properties, pane, and the like.

The Sheettable field of the page 820 points to a sheet table 825. It, in turn, includes a plurality of the slots for accessing different column strips. As shown, for example, the first entry in the sheet table 825 accesses a column strip of cells 830. In turn, column strip 830 addresses individual information cells, each of which may have one of a variety of information types, including empty, integer, number (real), formula, label, and the like. In a preferred embodiment, column strip 830 may address up to 8,000 cells; those skilled in the art, however, will appreciate that column strip 830 may be set to any desired range (depending on the limits of one's target hardware).

Figure 8B:
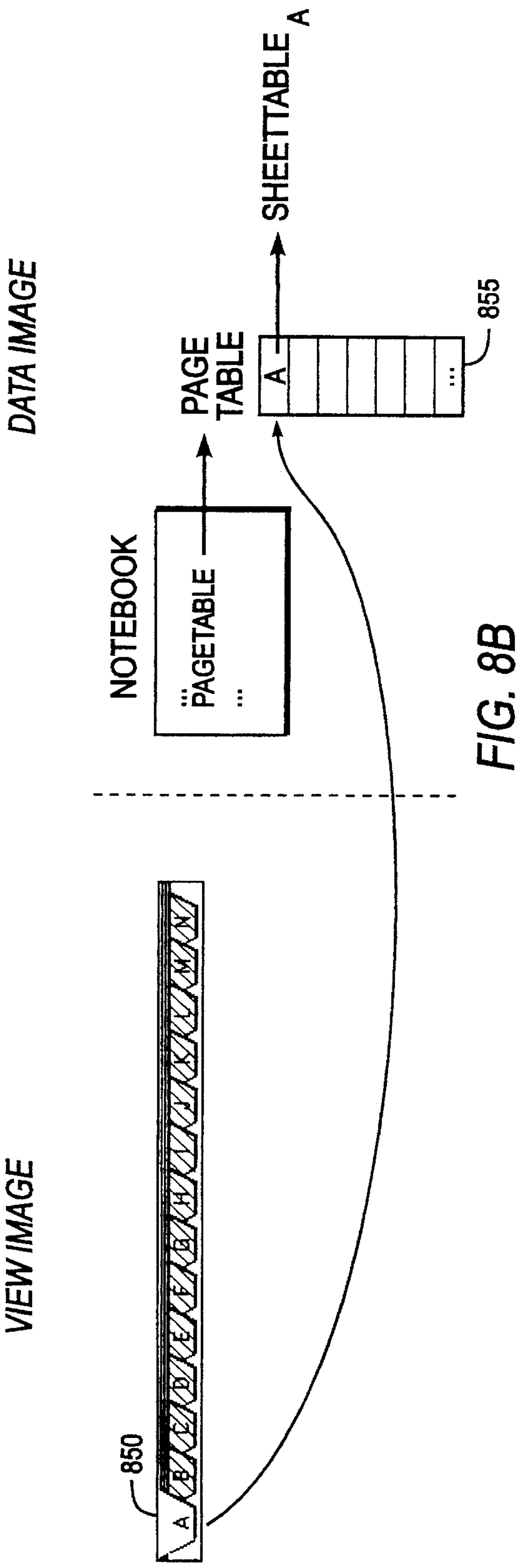
FIGS. 8B–C illustrate the correspondence between a page table data structure and pages which are displayed on the screen to the user.
Figure 8C:
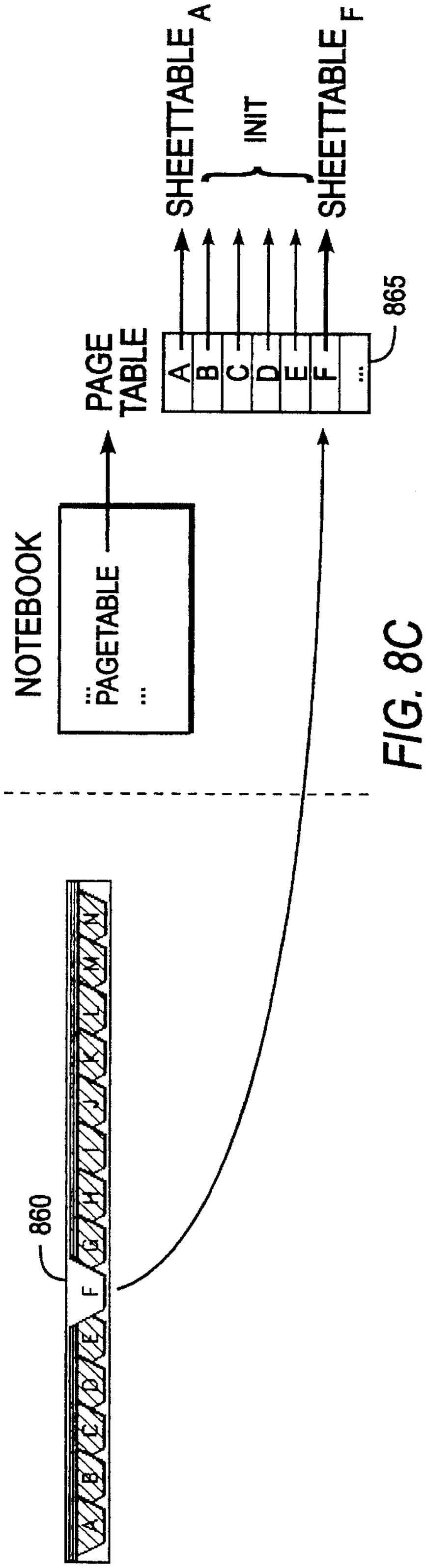

Referring now to FIGS. 8B–C, the function of the page table of the present invention is illustrated. In FIG. 8B, two images are presented: a view image and a data image. The view image illustrates what the user sees on the screen 106; at startup, for example, only a single Page A (page 850) is active. As shown by the corresponding data image supporting this view image, pagetable 855 includes only a single reference, page A. In turn, page A references sheettable$_A$, which supports the information cells required (e.g., they are currently needed for display) for the page. Thus, at startup, only a single page entry exists in the pagetable 855, even though the screen displays multiple page tabs.

Upon selection of Page F (e.g., by clicking tab F 860), the data image changes, however. As shown in FIG. 8C, remaining Pages B–F are initialized into the page table 865. In this example, Page F must now exist as a view object. Thus, Page F references supporting data structures (e.g., sheettable$_F$). The intervening Pages (B–E), on the other hand, are initialized, but only to the extent that they can serve as place holders in the pagetable 865. In this manner, the underlying page table for a notebook instantiates underlying page data structures only as needed (e.g., for viewing or referencing by other pages), but, at the same time, provides on-demand access to pages.

A particular advantage of this design is the ease in which information may be referenced and presented. Even complex data models, such as those spanning multiple dimensions, may be represented in a clear fashion. Moreover, a syntax is provided by the present invention for intuitively referencing information.

Figure 8D:
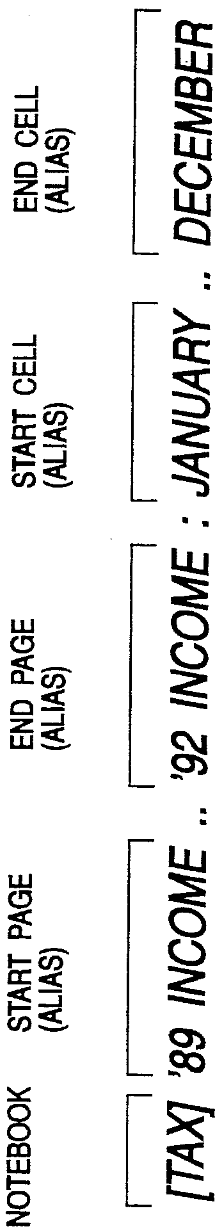
FIGS. 8D–F illustrate the referencing of information in the spreadsheet notebook of the present invention.
Figure 8E:
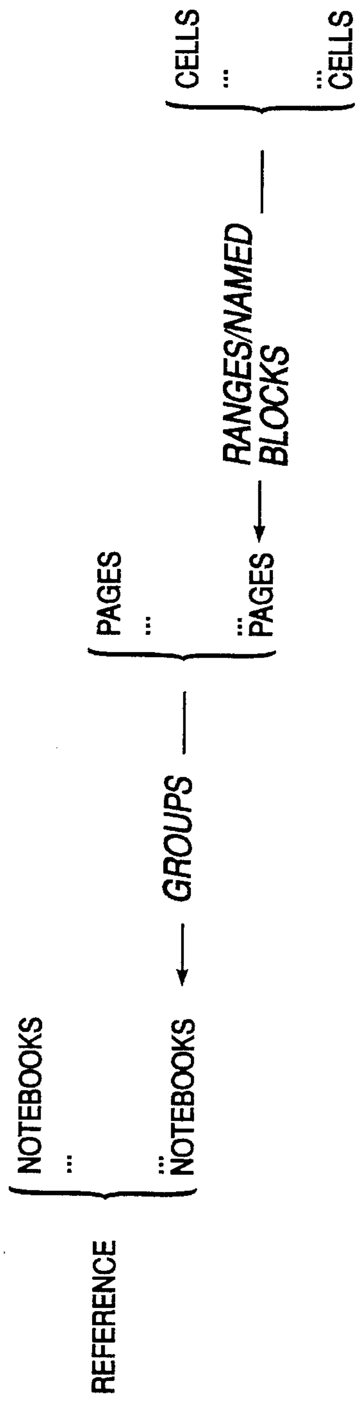
Figure 8F:
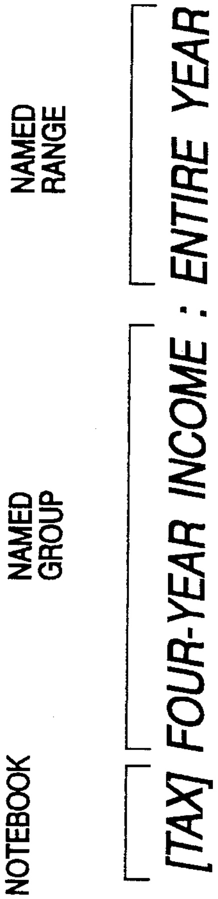

Referring now to FIGS. 8D–F, the referencing of information in a spreadsheet notebook of the present invention is now described. Shown in FIG. 8D, a three-dimensional reference (i.e., identifier for a solid block of information cells) includes a notebook, starting page, ending page, starting cell and ending cell. As shown, the notebook (which is the same as the file name) is identified preferably by delimiters, such as brackets ([]). This is followed by page name(s), which may in fact be grouped. As shown, a range of pages has been defined from '89 Income to '92 Income; these are alias names which may correspond to pages A–D, for example.

Next, one or more cells of interest are identified. For example, a range from January to (..) December is shown, which serve as aliases for blocks A1 to A12, for example. The block or cell information is separated from group or page information, for example, by a colon (:) identifier.

The hierarchy of this nomenclature is shown in FIG. 8E. Specifically, a notebook references pages, which may be members of one or more user-defined groups. In turn, a page references cells, which may alternatively be referenced by alias identifiers. As shown in FIG. 8F, page and cell identifiers may be grouped to form even more succinct references. For example, Pages '89 Income to '92 Income may be renamed as Four-Year Income. Similarly, the cell range from January to December may be renamed Entire Year. In this manner, information ranges in the spreadsheet notebook of the present invention are easily named and easily visualized by the user.

Depending on the context of the system, certain identifiers may be assumed and, thus, eliminated from a reference. Unless otherwise specified, for example, the notebook identifier is assumed to be the currently active notebook. Similarly, the page identifier may be assumed to be the currently active page, unless the user specifies otherwise. Thus, a valid reference need only include as much information (identifiers) as is necessary to access the desired information.

Figure 9A:
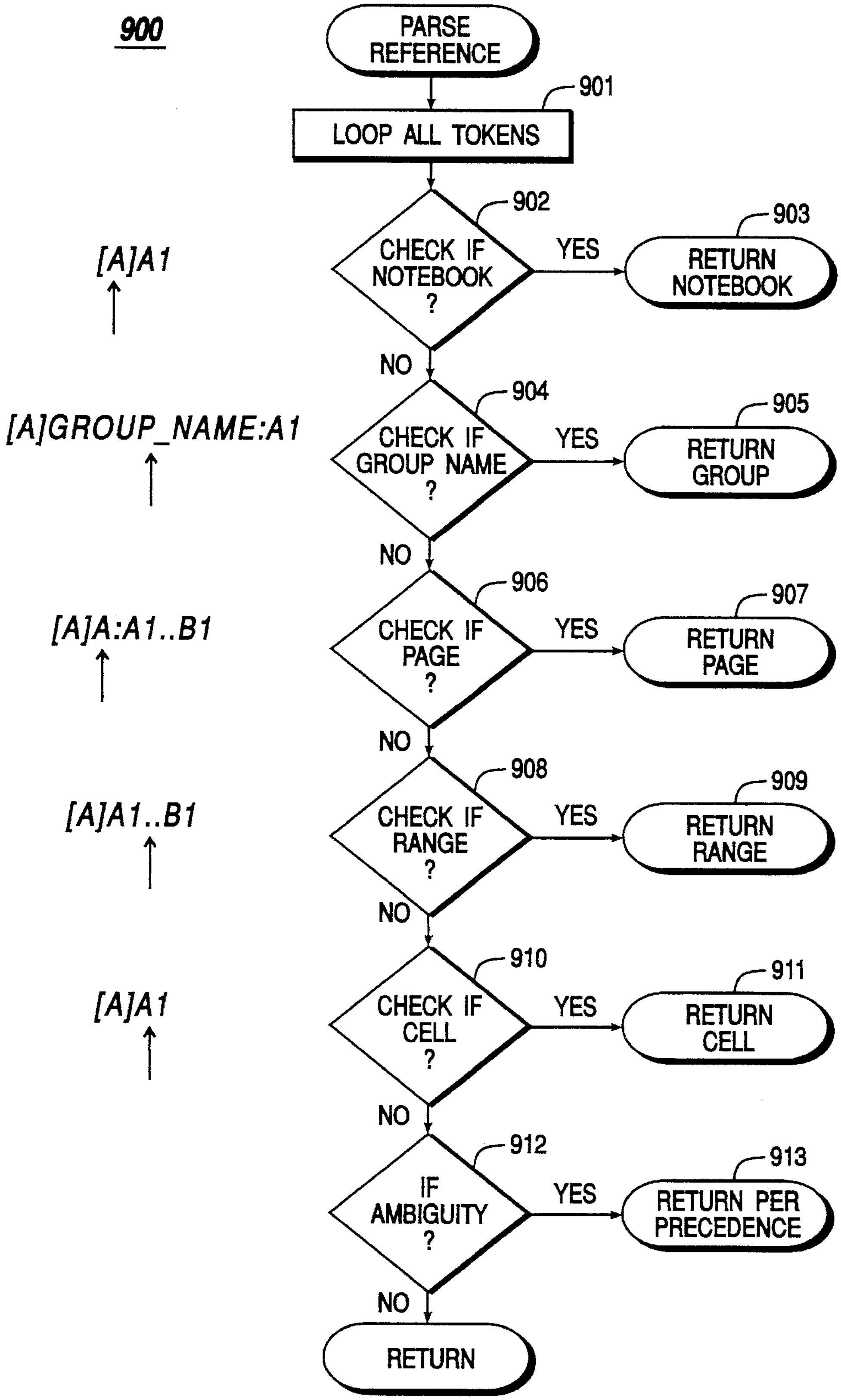
FIG. 9A is a flowchart illustrating a method of the present invention for interpreting information references.

Referring now to FIG. 9A, a method for interpreting or parsing an information reference, in accordance with the present invention, is shown. Upon receiving a reference (e.g., text string) to information in a spreadsheet notebook, the method proceeds as follows. In step 901, a loop is established to tokenize (i.e., parse) the string into individual identifiers, which may then be processed. Each token is examined as follows. In step 902, the token is checked to determine whether it is a notebook identifier. In a preferred method, a notebook identifier is delimited, for example, by bracket symbols; alternatively, a notebook identifier may be realized simply by the position of the identifier relative to other tokens in the string, or by its relationship to disk (notebook) files on mass storage 107. If the notebook is successfully identified, the notebook identifier is returned at step 903, and the method loops back to step 901 for any additional tokens.

If it is not a notebook (no at step 902), however, then in step 904 the token is examined to determine whether it is a group name. Group names may be determined by accessing group names listed for the notebook (e.g., by accessing a group name string pointer from notebook structure 810), and/or by the token's context (e.g., preceding a ":" delimiter). If a group name is identified, it is returned at step 905, and the method loops for any remaining tokens. Otherwise (no at step 904), the token is examined to determine whether it is a page. In a manner similar to that for checking group names, a page may be identified by examining a notebook's page table, with corresponding page name accessed (dereferenced). The page is returned at step 907, with the method looping back to step 901 for remaining tokens.

If a page is not found (no at step 906), however, then at step 908 the token is examined to determine whether it defines a range. A range may include a named block of cells (e.g., "entire year") or, simply, two cell addresses separated by an appropriate identifier (e.g., A1..B1). If a range is found, then it is returned in step 909, with the method looping for any remaining tokens. Otherwise (no at step 908), the identifier is examined to determine whether it is a cell. A token may be identified as a cell if it is of the appropriate column/row format (e.g., A1). If a cell is found, it is returned at step 911, with the method looping for any remaining tokens.

As shown (conceptually) at step 912, if any ambiguities remain, they may be resolved according to an order of precedence; for example, notebook> groupname>page and the like. At the conclusion of the method, a reference, if it is in proper form, will be successfully identified and may now be processed according to three-dimensional techniques.

Figure 9B:
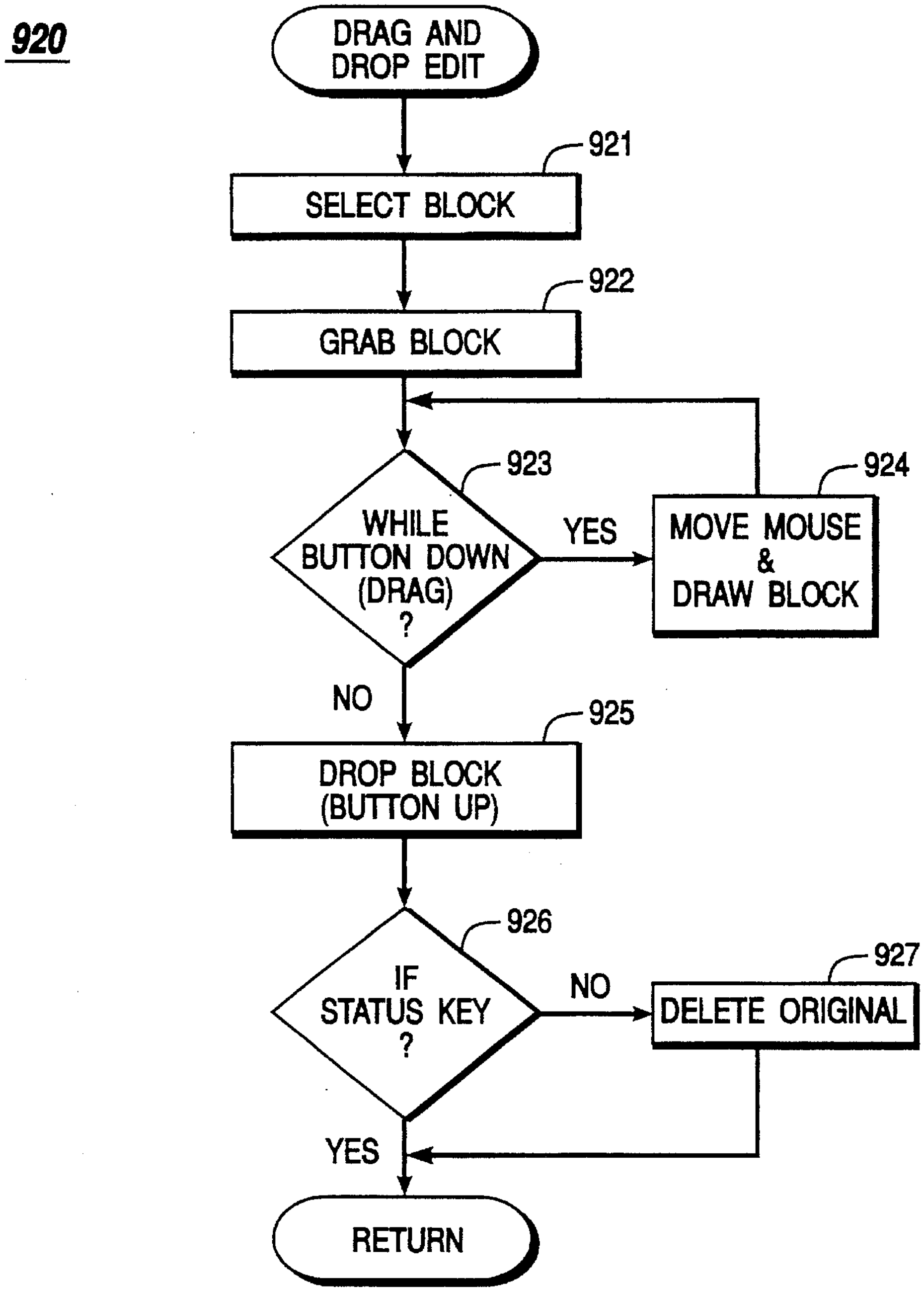
FIG. 9B is a flowchart illustrating a method of the present invention for drag and drop editing.
Figure 9C:
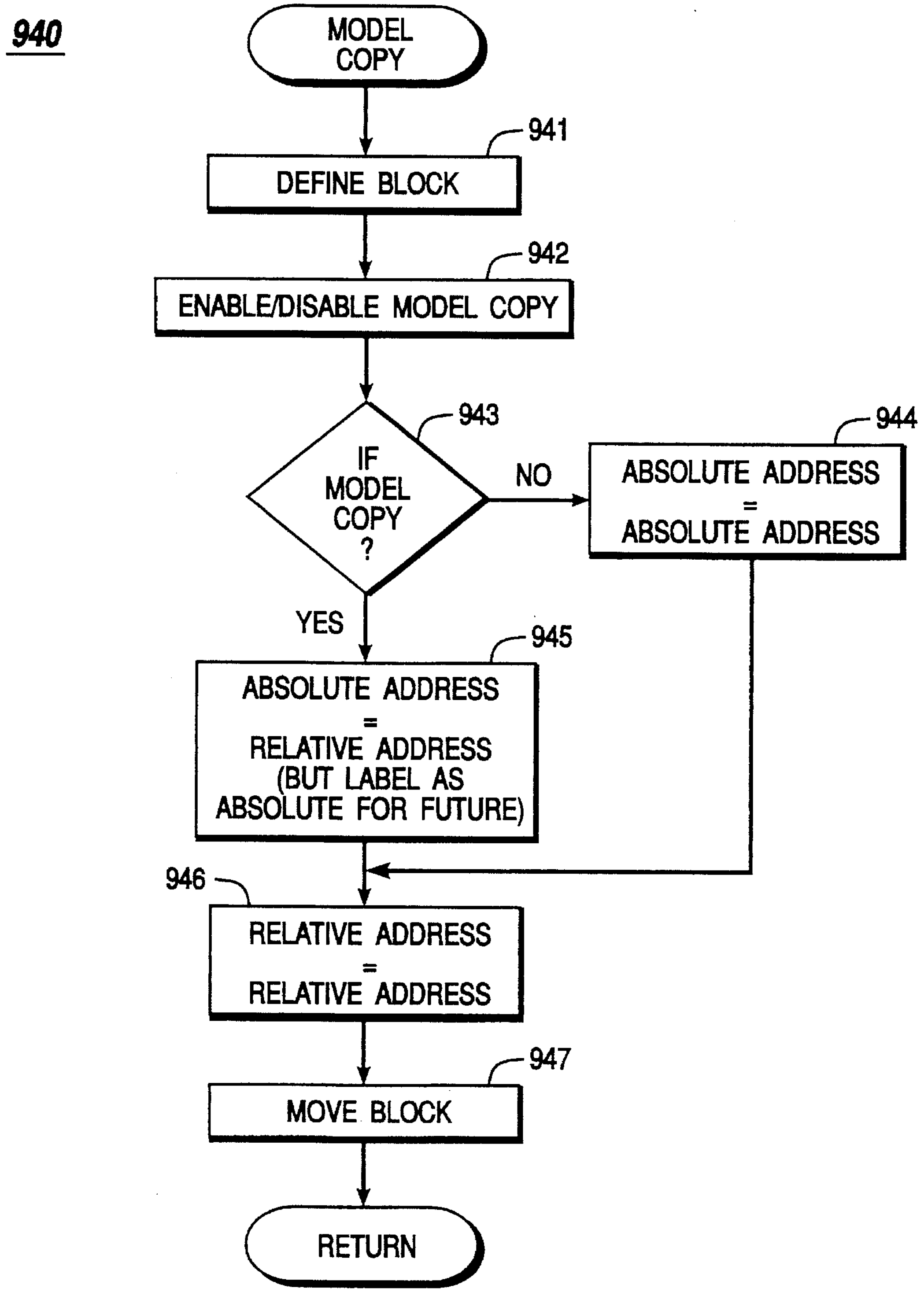
FIG. 9C is a flowchart illustrating a method of the present invention for model copying.

Referring now to FIGS. 9B–C, other methods of the present invention are illustrated. In FIG. 9B, for example, a drag-and-drop edit method 920 of the present invention is shown. Its steps are as follows. In step 901, a block of cells is defined (e.g., by dragging a mouse cursor from one corner of the block to another). After a block has been selected, it is next grabbed with the mouse cursor (i.e., position the mouse cursor within the block and depress a mouse button). In steps 923 and 924, a loop is established to "drag" the block to a new location. In particular, while the mouse button is depressed, any movement of the mouse will cause the block to follow (animated on screen, e.g., by XOR technique). At step 925, the block is "dropped" into place by releasing the mouse button (button up signal). Dropping the block causes information from the source location to be copied into the target location. By coupling the method with a status key (e.g., SHIFT- or CTRL-), the technique supports either "cut" (erase original) or "copy" (leave original) modes of operation. Thus, for example, if a status key is not active as step 926, then in step 927 the original (at the source location) is deleted. Otherwise (yes at step 926), the original remains at the source location as well.

Referring now to FIG. 9C, a model copy method 940 of the present invention is illustrated. In step 941, a block is defined or selected (e.g., dragging a selection). In step 942, model copy is enabled or disabled (as desired); alternatively, model copy may be enabled by default. In step 943 if model copy has been enabled, then in step 945 absolute address references are copied as if they were relative address references, as previously described (with reference to FIGS. 4H–J). However, the address labels will remain absolute, so that they will be treated as absolute for future copying operations. Otherwise (no at step 943), absolute addresses are treated conventionally (i.e., referencing absolute addresses) in step 944. As shown in step 946, relative addresses are not affected, i.e., they continue to be treated relatively. In step 947, the copy operation is performed, employing the addresses as just determined, after which the method concludes.

C. Property Inspection

Figure 10A:
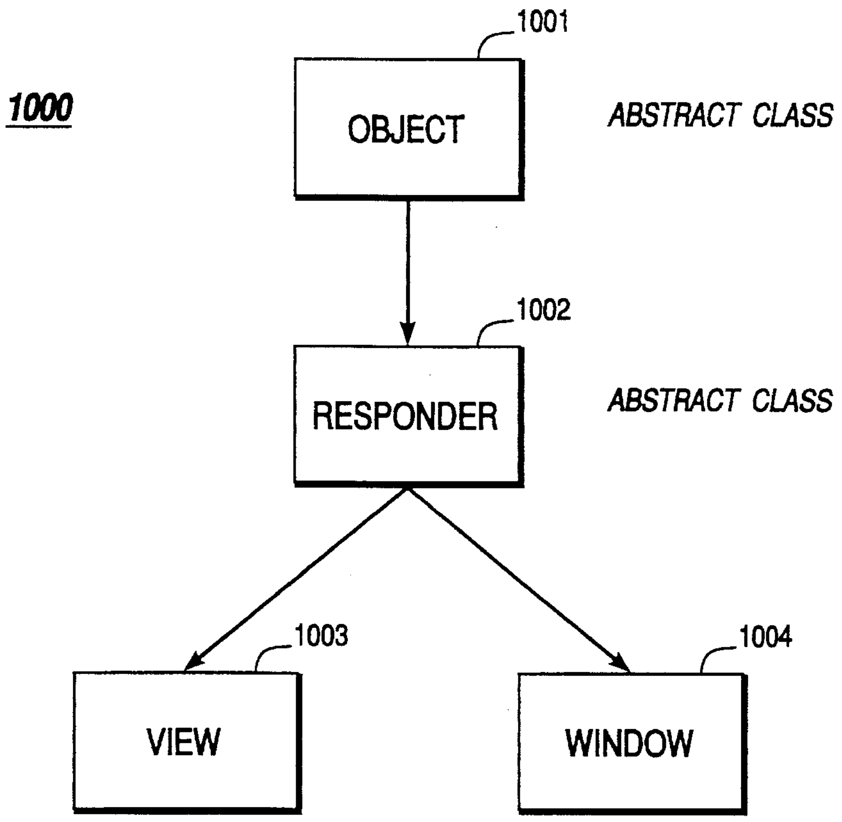
FIG. 10A is a block diagram illustrating a system class hierarchy of the present invention, which is employed for property inspection.
Figure 10B:
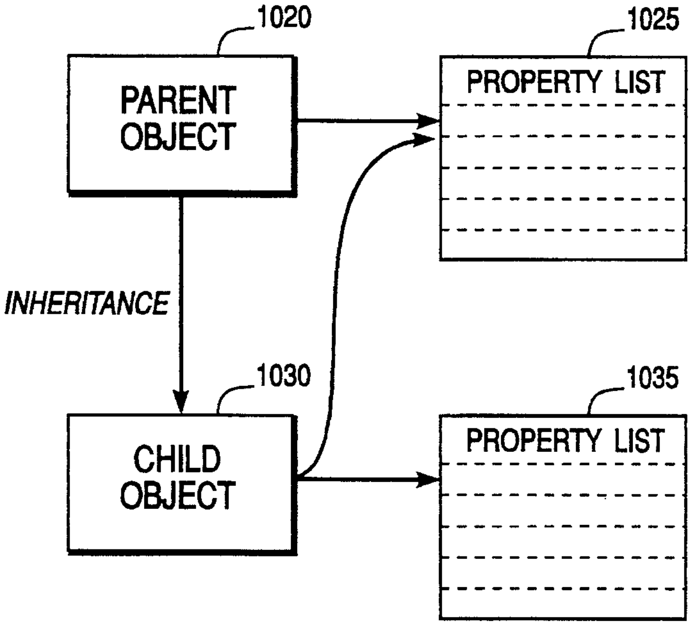
FIG. 10B is a block diagram illustrating the correspondence between a parent object and a child object, and their respective property lists.
Figure 10C:
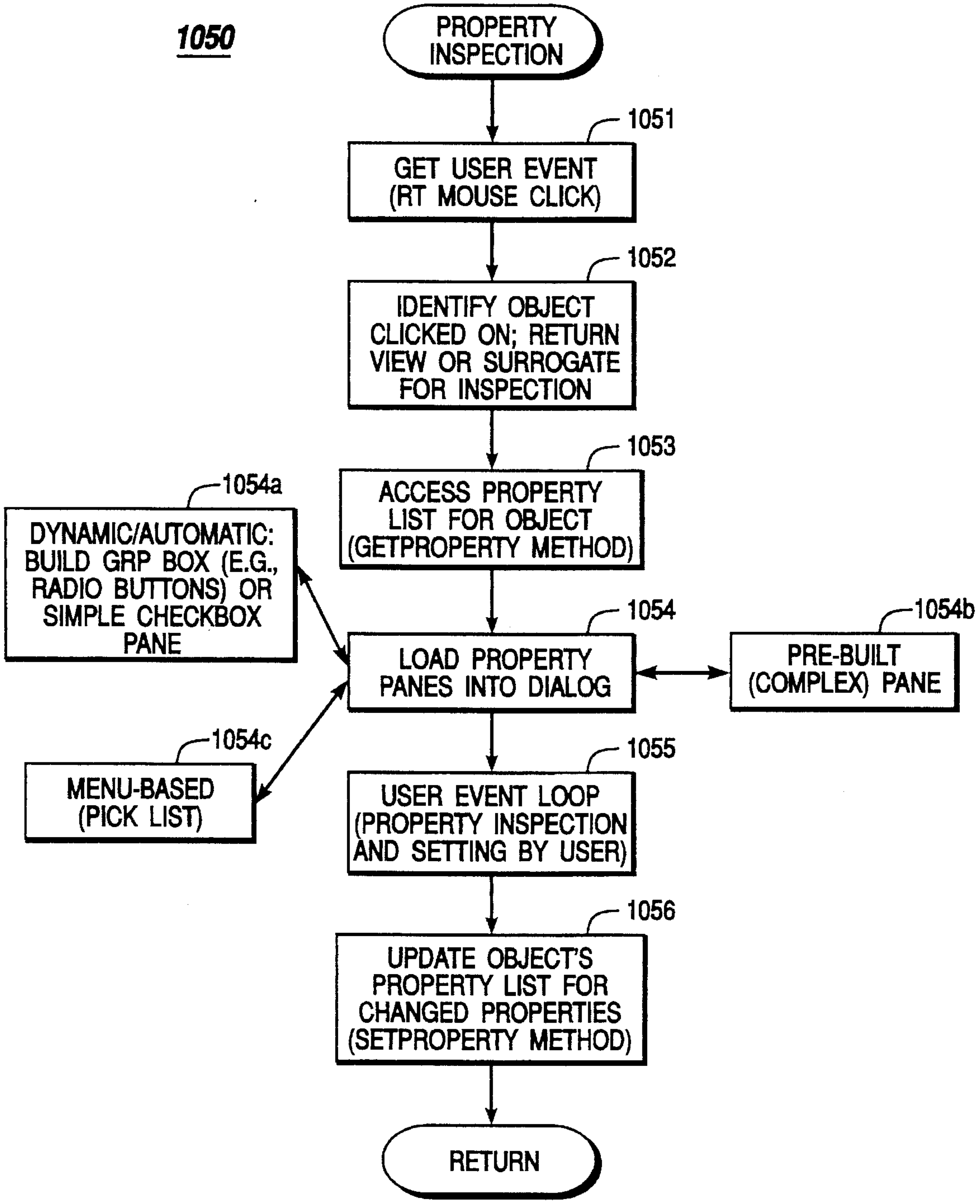
FIG. 10C is a flowchart illustrating a method for inspecting and setting properties of objects, in accordance with the present invention.

Referring now to FIGS. 10A–C, construction and operation of property inspection in accordance with the principles of the present invention will be described. As shown in FIG. 10A, user interface (UI) objects are constructed from a UI object class hierarchy 1000. As shown, class hierarchy 1000 includes as its base class an object class 1001. From object class 1001, a responder class 1002 is derived. As the child of class 1001, responder class 1002 inherits all properties of its parent and adds event handling capability. Both object class 1001 and responder class 1002 are abstract classes, i.e., objects are not instantiated from them directly. From responder class 1002, two child classes are derived: view class 1003 and window class 1004. From view class 1003, all screen objects (e.g., text, graphs, scrollbars, and the like) are created. From window class 1004, container objects are instantiated; in particular, window class 1004 provides container objects which hold the various view objects.

Associated with each class (and thus objects derived from each class) is a ClassInfo structure. ClassInfo, which is itself implemented as a separate class, contains information about a corresponding class and, thus, objects of that class. For example, it contains information about object type, name, number of properties, and the like. Of particular relevance to property inspection are two data members: a pointer to the parent and a property record pointer which points to an array of property records for an object of interest.

Referring now to FIG. 10B, the relationship between parent and child (and hence the importance of the pointer to the parent) is illustrated. In the system of the present invention, an object-oriented mechanism is employed whereby new objects may be created from existing objects (classes). As shown, for example, a child object 1030 may be derived from a parent object 1020. Also shown, each object has its own property record array or list. For example, the parent object 1020 has a property list 1025 describing its properties. Child object 1030, in turn, also has its own property list 1035; child object 1030 still inherits from parent object 1020, however. By means of the parent pointer, the child object 1030 also has direct access to its parent 1020 and, thus, the property list 1025 of the parent. In this manner, when an object is inspected, the system of the present invention may view back across the inheritance hierarchy to fetch all (ancestor) properties for the object, as needed.

The property record, on the other hand, describes an individual property for the object. The property record, which is implemented as a separate class, includes a name ID for the property and a pointer to the property object itself (which may be shared). For example, property record objects may be instantiated from the following exemplary C++ class definition:

```
class_EXPORT_PropRecord
{
public:
        Property *    pProp;       // pointer to SHARED (!) property object
        WORD          nameID;      // property name string ID
                                   // (PROPSTR.HPP, PROPSTR.CPP)
        WORD          flags;       // optional information about the property
                                   // ( HIDDEN, USE MENU, LINK ONLY, etc.)
        inline Property * getProp ( );
        inline LPSTR getName ( );
        inline PROPTYPE getType ( );
        inline WORD getNamesCnt ( );
        inline WORD getNameID ( );
        inline WORD getFlags ( );
};
```

The property object, in turn, includes a type ID for identifying the property and also includes a pointer to a dialog for the property. An property object may be instantiated from the following exemplary C++ class:

```
class _EXPORT_    Property
{
public:
        static DWORD dwPropErr;
        static char far conversionBuffer [MAXPROPSTR];
        PROPTYPE typeID;
        WORD namesCnt;
        LPSTR pDialog;
        Property ( WORD id );
        virtual BOOL stringToValue ( LPSTR, PROPTYPE pt = 0 );
        virtual BOOL valueToString ( LPSTR, PROPTYPE pt = 0 );
/*
Convert the passed binary value to string using the conversionBuffer
*/
        LPSTR convertToString ( LPSTR pS, PROPTYPE pt );
/*
Convert the string in conversionBuffer to binary value pointed by pS
*/
        BOOL convertToBinary ( LPSTR pS, PROPTYPE pt );
};
```

Exemplary property types may include:

```
prop_Undefined = 0,
prop_Text,
prop_Bool,
prop_Window,
prop_Color,
prop_Bitmap,
prop_List,
prop_Word,
prop_Int,
prop_Key,
prop_Double,
. . .
```

The pointer to the property dialog (LPSTR pDialog), on the other hand, indicates the appropriate dialog to be displayed to the user for the current property; the dialog displays the appropriate information (e.g., pane) for the property An additional example illustrates this point. When inspecting a block of cells, for example, StartInspect returns a current block object which is a surrogate object, i.e., it does not have a visible expression on the screen. Instead, it is a substitute object which assumes the characteristics necessary to allow inspection of the screen object of interest. In this manner, it functions as a surrogate for the object which the user observes on the screen. If desired, objects may also be blocked from inspection at this step (e.g., by setting flags); in which case, the method terminates. At the conclusion of step 1052, the object of interest, either actual or surrogate, is ready for inspection.

Next, the user interface for inspection is built by a DoUI method of the present invention. The method proceeds as follows. The first property record for the object is accessed in step 1053. Preferably, DoUI is a virtually defined method, with each object (class) designed to include method steps for accessing the property record according to that object's own particularities. The remaining property records for the object are also located (e.g., by traversing a list of records).

At step 1054, the dialog panes for each property are loaded (e.g., into memory 102, if not already present) for use by a compound dialog box. As previously described, the dialog associated with each property is accessible from the property record (by a pointer to the dialog). At this point, an empty property inspection window is displayed. Into the property inspection window, a corresponding pane for each property is loaded (substep **1054*b***), thus creating a display hierarchy. Using a getProperty method, each property is initially set to the attribute(s) contained in the retrieved property record; the getProperty method operates essentially the reverse of a setProperty method, which is described in detail hereinbelow. An associated screen button or label is provided for rapidly accessing a desired pane in the inspector window, in much the same which the user may then use for inspecting and setting attributes of that property.

Referring now to FIG. 10C, a method 1050 for property inspection, in accordance with the present invention, is illustrated; additional disclosure is provided for the inspection of an exemplary object: a spreadsheet cell. In step 1051, the user indicates that he or she desires property inspection for an object. In a preferred method of the invention, the user will right-mouse click on the object of interest (as set forth hereinabove). To inspect a spreadsheet cell, for example, the user would position the mouse cursor over the cell and click the right mouse button. In this instance, the notebook which contains that cell will receive (i.e., will be the recipient of) a right-mouse button down message. The event will be processed by routing the message to a RightMouseDown method.

In step 1052, the object which the user clicked on is identified by the RightMouseDown method. Specifically, the method invokes a RouteMouseEvent method which returns the current view object (i.e., the object which the user has clicked on). This is accomplished as follows. Every view object contains a StartInspect method which returns an actual object for inspection. The object which appears on the screen to the user (i.e., view object) is not necessarily the object which will be inspected. For example, it would be computationally too expensive to have each cell of a spreadsheet be its own object. Instead, the present invention embraces the notion of surrogate or imaginary objects which may be inspected (using the properties of the screen or view object selected). In most instances, the StartInspect method will return an object for inspection which is the same as the view object. In those instances where it is not feasible to inspect an object which the user perceives on a screen, however, the method returns a surrogate object whose properties assume the attributes of the screen object. fashion as one accesses pages in a notebook with tabs. In this manner, a property inspector is built from a dynamic list of properties (as opposed to a static list of properties which is determined beforehand), each of which may be rapidly accessed by the user.

While the property list loaded into an inspector window for each object is dynamically constructed, the panes supporting each property may be pre-built. For example, the pane supporting a color palette, since it is complex in design, will be built in advance.

However, the method of the present invention may dynamically build individual panes as well. Candidates for dynamic pane building include simple properties, especially those which may have only a Boolean or yes/no value. Referring back to FIG. 7B, for example, inspector 715 includes a snap-to-grid property. Instead of loading a preconstructed pane for this property, the method of the present invention dynamically constructs an appropriate pane (in this case, a simple check box), as shown in substep 1054*a*. An automatic list, on the other hand, is typically a simple group box (i.e., one having a plurality of radio buttons), which is preferably constructed dynamically, as shown by the inspector window 650 of FIG. 6H. In either case, the method may build appropriate inspector dialog components on-the-fly by simply examining a particular property and discerning its possible attributes. In a similar manner, "pick" lists of properties may be constructed and displayed, as shown in substep 1054*c*. A property pick list serves as an index to other property lists or other functions, as desired. By dynamically building inspectors for simpler properties, the method conserves system resources.

Construction of the inspector window is completed by inserting dialog controls (e.g., "OK" "CANCEL" and "HELP") for operating the dialog. In addition, an example window is displayed for indicating various changes to the properties of an object. This is accomplished by sending a message to the inspected object setting forth the current properties in the dialog; the inspected object returns an example or sample object which may then be displayed in the window. After changing a property, the dialog tab or button (e.g., tab 601*a* of FIG. 6A) corresponding to that property is updated (e.g., different font or screen color) for indicating that a change has been entered.

After constructing the property inspector dialog or window, at step 1055 the method enters a user event loop where the user inspects and sets various properties of the object by accessing the property (through the screen button or tab) and setting a new attribute. At the conclusion of the user event (e.g., by selecting "OK" or "CANCEL"), the user event is terminated.

At step 1056, the property list for the object being inspected is updated for any changes which occurred to the properties during the user event (of step 1055). This is accomplished by calling a setProperty method, which conceptually loops through each pane which has changed and updates the property list, accordingly. By way of illustration, the setProperty method may be defined as:

```
virtual BOOL setProperty( LPSTR lpPropStr, LPSTR lpValueStr,
    PROPTYPE pt = 0 );
```

The method receives the name of a property, either passed as a text string (lpPropStr) or as a handle (pt), and a value for that property, typically passed as a text string (lpValueStr).

Figure 10D:
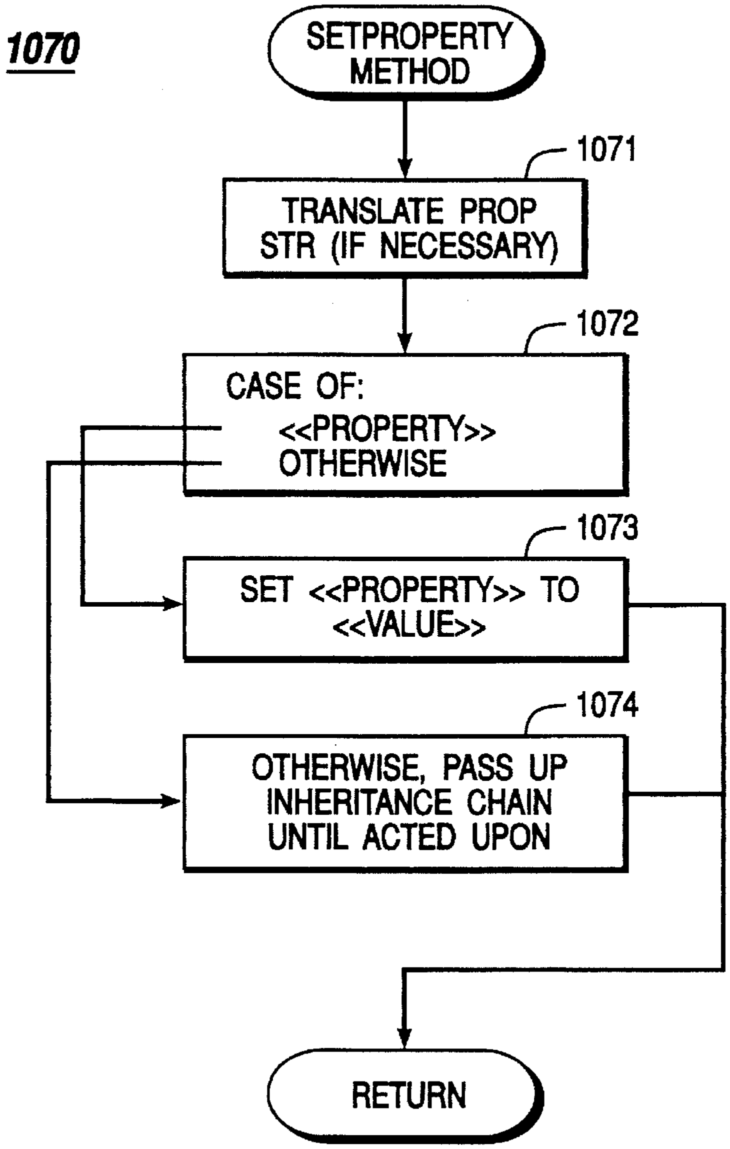
FIG. 10D is a flowchart illustrating a set property method of the present invention (substep from the method of FIG. 10C).

Referring now to FIG. 10D, the general steps of a setProperty method 1070 are illustrated. In step 1071, the property text string is translated; alternatively, the property is referenced directly by passing a handle (i.e., integer or word value). At steps 1072–1073, the property is updated for the property value passed (e.g., by a CASE statement construct). If the property is not acted upon, it may be passed up the object's inheritance chain for action by an ancestor object, at step 1074. In this fashion, the values collected from the various property panes are used by the method to set the properties within the object.

While the foregoing outlines the general steps or framework for setProperty, the method is in fact defined as a virtual method. Thus, each class of objects may assume responsibility for setting its own properties. For an Annotate object (i.e., screen objects found in Graph windows), for example, an exemplary setProperty method may be constructed as follows:

```
BOOL Annotate::setProperty ( LPSTR lpPropStr, LPSTR lpValueStr, PROPTYPE
pt )
{
        WORD w;
        if ((w = info.propIndex (lpPropStr, pt)) < annoEndProps) {
                if (info.ppProps [w].getType( ) > prop_Compound)
                        switch (w) {
                                case annoFrame:
                                        getFrame (GlobalFrameProp.x,
GlobalFrameProp.y,
                                                GlobalFrameProp.w,
GlobalFrameProp.h);
                                        break;
                        }
                if ((info.ppProps [w].getProp( ))—>stringToValue (lpValueStr,
pt)) {
                        BOOL f = TRUE;
                        switch (w) {
                                case annoFrame:
                                        setFrame (GlobalFrameProp.x,
GlobalFrameProp.y,
                                                GlobalFrameProp.w,
GlobalFrameProp.h);
                                        break;
                                case annoHidden:
                                        if (GlobalYesNoProp.index)
                                                hide (TRUE);
                                        else
                                                show (TRUE);
                                        break;
                                case annoShow:
                                        if (GlobalYesNoProp.index)
                                                show (TRUE);
                                        else
                                                hide (TRUE);
                                        break;
                                case annoId:
                                        if (pCW && pCW—>infoPtr( )—>objType ==
ot_Dialog)
                                                f = ((DialView
*)pCW—>getContentView( ))—>setIdx (this, GlobalWordProp.w);
                                        else
                                                idx = GlobalWordProp.w);
                                        break;
                                case annoAttach:
                                        flags.nochild = !GlobalYesNoProp.index;
                                        break;
                                case annoPosition:
                                        *(WORD *)&flags = (*(WORD *)&flags
                                                & ~(vfPOSITION | vfLEFTREL |
vfTOPREL | vfRIGHTREL | vfBOTTOMREL
                                                | vfTOPTYPE | vfRIGHTTYPE)) |
Global PositionProp.flags;
                                        flags.bottomType = flags.topType;
                                        flags.leftType = flags.rightType;
                                        break;
                        }
                        if (f)
                                callConnection (lpPropStr, lpValueStr, pt);
                        return f;
                }
                else
                        return FALSE;
        }
        else
                return Tracker::setProperty (lpPropStr, lpValueStr, pt);
}
```

As shown, the override method processes properties specific for Annotate (e.g., change frame, ID, position, and the like). In the event that a property is not identified, the property is passed up the inheritance chain for appropriate processing (by a parent's setProperty method). In this manner, an individual object (e.g., an Annotate object) in the system is designed to know how to get (getProperty) and set (setProperty) its own properties.

After the update of step 1056, the method 1050 concludes. At this point, the system is ready for another inspection. Alternatively, the user may undertake other activities, as desired.

Storage and retrieval of Multi-Dimensional Information

A. Preferred interface

According to the present invention, methods and interface are provided for loading, saving, and closing notebooks, and for loading and saving the workspace. In general, each system notebook is saved in its own file, along with any graphs, slide shows, or dialog boxes a user has created. In a similar fashion, workspace information may be retained.

Figure 11A:
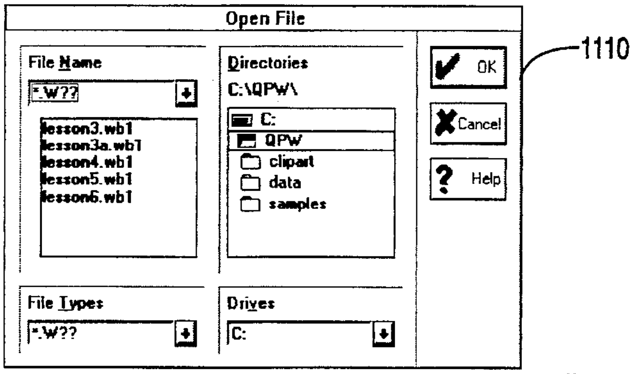

As shown in FIGS. 11A–D, commands which save or load files use a dialog box, such as the dialog box 1110 of FIG. 11A. When a user opens any file-handling dialog box for the first time in a session, for instance, files are displayed from the current directory. By default, the current directory is initially the "startup" directory, i.e., the directory from which a user would start the system. This is easily changed by the user, for instance, by inspecting and setting Startup properties.

If a user saves or loads a file in a directory other than the startup directory, the last-used directory becomes the default directory. The next time a user selects a command to save or load a file, the default directory initially displays in the dialog box. The last-used directory is preferably the default directory displayed until the user restarts the system, when the startup directory again displays.

To select a particular file, the user proceeds as follows. If the name of a desired file is already displayed, the user may simply "double-click" it. To display file names in other drives or directories, the user may invoke one of the following controls:

Directories: displays the startup directory below the directory or drive containing it and above its subdirectories. To change to a different directory, the user double-clicks it.

Drives: lets a user switch to another drive. He or she may choose the drive name desired.

File Types: controls the file names that are listed in the File name list box. Initially, the dialog box is set to display all files with any extension beginning with a default extension (e.g., .W), but a user can choose another popular file type from a pre-supplied list.

File Name: is where a user selects the file to be saved or loaded, either by typing it in an edit field or clicking it from the list below. One can also quickly choose files from a list of the files which have been used most recently with the current command.

The user can use wildcard characters (e.g., * and ?) in any part of the File Name edit field to limit the files displayed. For instance, *.PRN lists all files with the extension .PRN, and BUDGET9?.WB1 lists all notebooks that begin with BUDGET9 and have one character before the .WB1 extension.

"Saving" a notebook stores or "writes" it to mass storage 107 as a "disk file". A user can redisplay it by loading or "reading" the file from storage into a window. One can also load files created with other spreadsheet programs; the system translates them automatically. The following File menu commands open a window or load a file into a window:

New: creates a new, blank notebook window, overlaying existing windows (if needed).

Open: creates a new window and loads the file one specifies into it, overlaying existing windows (if needed).

Retrieve: loads a file into the active window, replacing any data currently in the window.

To create a new notebook window without closing the active notebook, the user invokes the File|New command. In response, the system opens a blank window (overlaying existing windows, if necessary). A default name, such as NOTEBK#.WB1, is given to the window (where # is the number of windows opened since starting a session). The user can change the name as desired (typically done when the file is saved).

Multiple windows may be opened at a time, with different notebooks in each. Each new window may overlay other open windows, as needed. An open window is reselected by selecting ("mouse clicking") any visible part of it, or by selecting it from the list at the bottom of the Window menu.

To work with or "open" another existing notebook without putting away the active notebook window, the user proceeds as follows. First, the user selects File|Open. Next, the user selects the file name desired (e.g., using the selection techniques described above). To open a file created with a different program, the file name extension is included when he or she opens it. If the file includes a password, a dialog box appears with space for entering it. The user types the password and chooses OK. If the password is incorrect, the system displays an error message and cancels the Open command.

When one starts the system, a blank notebook appears. However, a file may be automatically opened by specifying an autoload file. This feature lets a user immediately display the notebook he or she uses most often. An autoload file is a notebook specified with the Autoload File option of the Startup property (in the application property inspector). Any notebook with that name in the startup directory is opened automatically if no other is specified. The user can change this default to any file he or she likes.

Figure 11B:
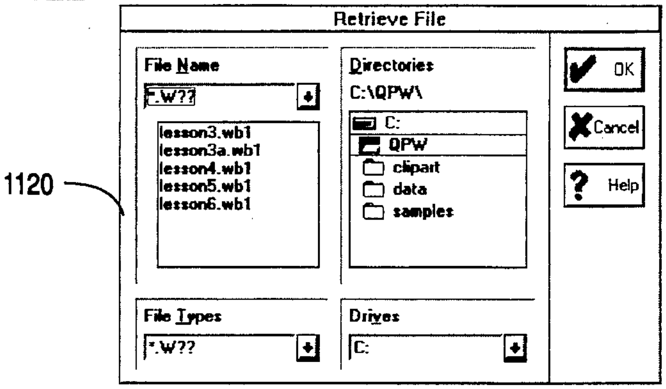
Figure 11C:
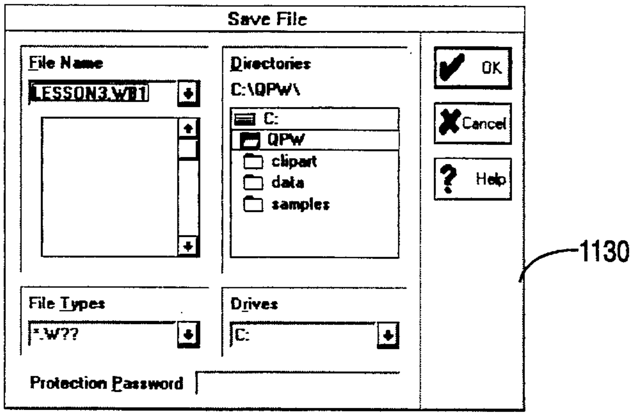

With reference to FIG. 11B, the operation of retrieving a file into a window is described. To load a notebook into the active window, the user invokes a File|Retrieve command Using the dialog 1120, the user may select a notebook to retrieve into the active window. When a notebook is retrieved, it replaces existing data in the window. Also, the window takes on the size and position it had when the user last saved the notebook. For example, if the window was in the left half of the desktop when the user last saved the notebook, the window in which he or she retrieves the notebook moves to the left half of the desktop. If the active window contains unsaved data, a dialog box appears asking if the user wants to lose his or her changes. The user may select No to go back and save changes, or Yes to continue.

For saving notebooks to disk, three commands are provided. First, Save saves the notebook to the name under which a user last saved it. If the notebook has never been saved, choosing Save opens a Save File dialog box 1130 of FIG. 11C (which is the same one used by Save As). Save As saves the notebook under a new name which the user specifies. Finally, Save All saves all open notebooks. If a user is using Save with a notebook for the first time, or if he or she uses Save As, the Save File dialog box appears. If the file name entered by the user already exists, the system warns the user. Upon completion of the command by the user, the system saves the notebook, storing the data along with all its properties. The system also saves any graphs, slide shows, and dialog boxes which the user has created.

The user may "close" a file, whereupon the system removes the corresponding notebook, all its associated graph and dialog windows, and all its views (created with Windows|New View) from the desktop To close files, first the user selects File|Close (for one file) or File|Close All (for all open files). Next, if a notebook has unsaved changes, a dialog box appears asking if the user wants to save his or her changes. To save the file, one should choose Yes; choosing No closes the file without saving it. The system closes the window, revealing any windows underneath. To close all open windows and exit the system at the same time, one chooses File|Exit To close a particular window (without closing related views), one invokes Close from the window's Control menu.

Figure 11D:
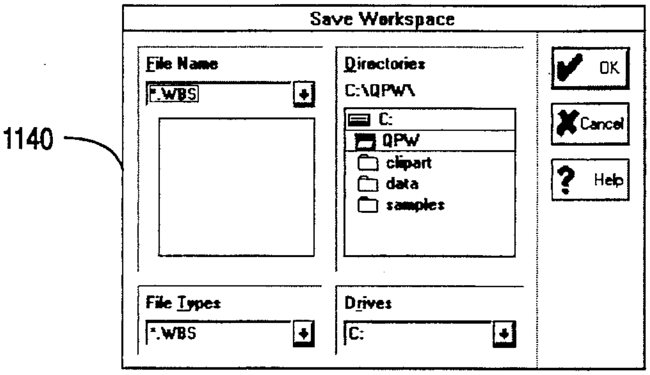

Referring now to FIG. 11D, management of the arrangement of windows onscreen or "workspaces" is described. The workspace consists of the image of the position and size of all notebook windows and the names of the files contained in each window. The positions of graph and dialog windows are typically not saved as part of a workspace. To save a workspace, the user selects a File|Workspace|Save command. Then the user enters the file name desired, using the above-described techniques. To retrieve a workspace, the user chooses the file he or she wants from the list, or enters a name.

The system overlays any existing windows with the windows stored in the workspace file, then retrieves the appropriate file for each. The system always retrieves the latest saved version of files when a user retrieves a workspace. If a user closes the windows that make up a workspace and later saves a file included in the workspace, the system retrieves the updated version of the file the next time the user chooses File|Workspace|Restore.

B. Internal operation

The following description will focus on presently preferred methods for storing and retrieving multidimensional information, including use of a preferred format for storing information files. Information is generally maintained by means of variable-length records, to be described below. However, the information may be represented in any suitable format as is known in the art (e.g., fixed-length records occupying "slots" of areas on the storage medium). Thus, those skilled in the art will appreciate that variations and other formats for representing stored information are possible for use in accordance with the present invention.

1. Records

As will be recalled from FIGS. 8A–F and accompanying discussion, notebooks are constructed from and maintained by data structures which reside in main memory 102 of computer system 100 (shown in FIG. 1A) during system operation. A corresponding "notebook file" for each notebook is maintained by the system on the mass storage 107. In a preferred embodiment, each notebook file exists as a separate disk (i.e., "physical") file, with each file supporting one or more matrices or spreads of information.

Notebook information is stored in each file as a plurality of variable-length binary records. In an exemplary embodiment, each record includes the general layout of a record header followed by a record body; this may be constructed, for example, from the following C language declaration:

```
typedef struct {
    WORD    rec_type;       /* record type */
    WORD    rec_len;        /* length of record body */
    / * followed by a variable length record body as
    char    rec_body [rec_len]
    */
} RecHdr;
```

As shown, the record header itself is a four-byte structure having a two-byte "record type" (rec_type) field and a two-byte "length of record body" (rec_len) field. The former uniquely identifies a particular variety or type of record, such as "Begin of file" record (rec_type=0), "password" record (rec_type=75), "Recalc. mode" record (rec_type=2), and the like; the latter ("length of record body") stores the number of bytes of data included in the record body (thus allowing variable-length records).

Record body stores the actual data for the information type. Its contents will vary according to record type. For instance, a record specifying the "recalculation mode" (i.e., manual, background, or automatic) for a notebook would include a record having a simple body as follows (shown in pseudocode).

```
Recalculation Mode Record:
    rec_type = RT_CalcMode = 2
    rec_len  = 1
    rec_body
        char cMode = (     Manual = 0,
                           Background = 1,
                           Automatic = 0xFF );
```

where the recalc mode is specified by a single byte. An exemplary record for storing a name (text string) of a particular spreadsheet page, on the other hand, would be:

```
Page Name Record:
    rec_type = RT_PageName = 204
    rec_len = size of name + 1
    rec_body
        char    name[];
```

where the record body comprises a character array for storing the page name. Information for the grouping of pages may be stored as:

```
Page Group Record:
    rec_type = RT_PageGroup = 227
    rec_len  = 2 + size of name + 1
    rec_body
        BYTE    cFirstPage;
        BYTE    cLastPage;
        char    name;
```

where the record body specifies the first and last pages of the group, as well as a name for the group. In this manner, only those specific information types relevant to a particular notebook need be present in the file; if a particular information type is not needed, its corresponding record is omitted from the file.

2. Preferred file format

Figure 12A:
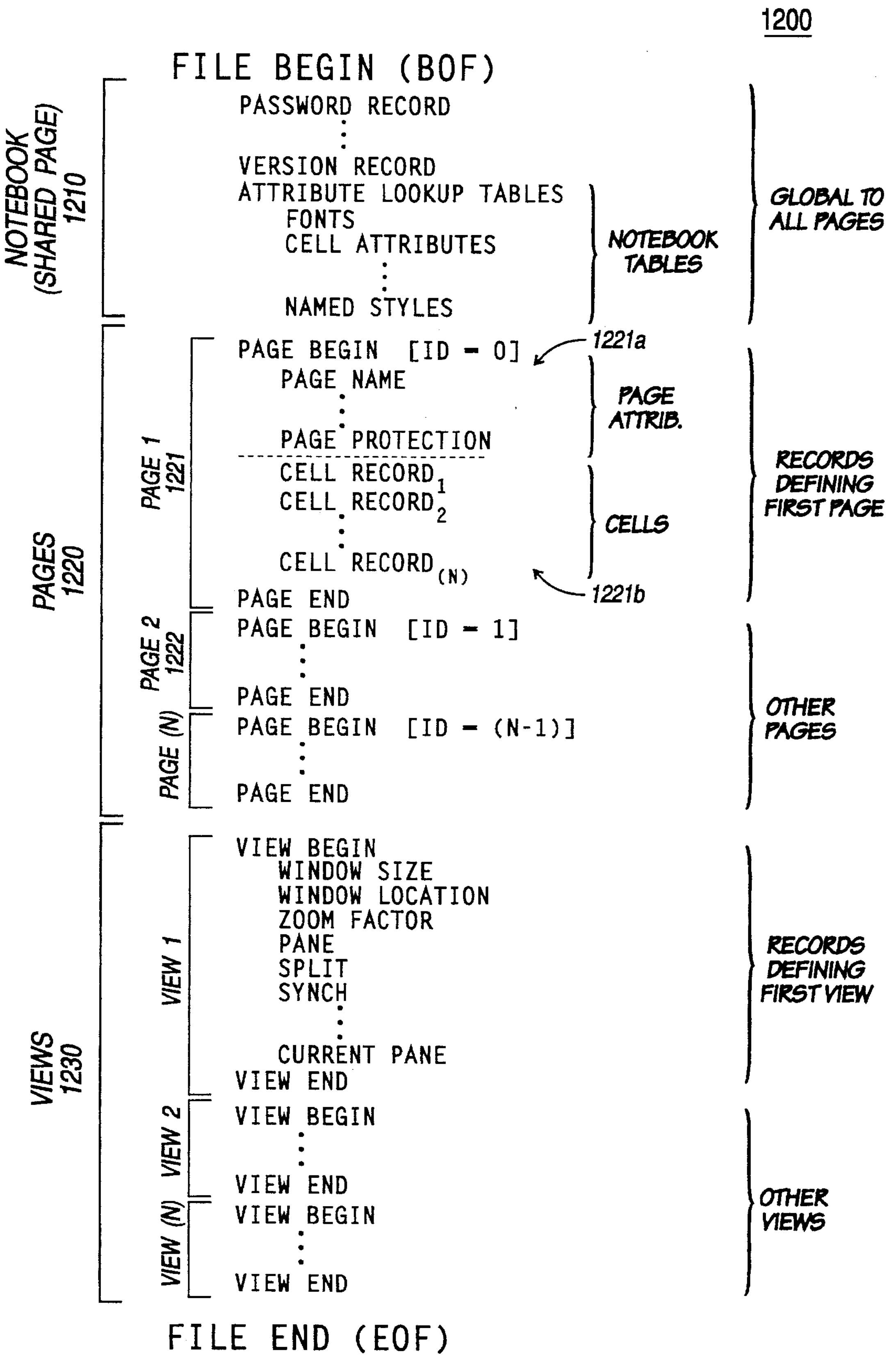
FIG. 12A is a diagram illustrating a preferred layout of data records for supporting a notebook spreadsheet.
Figure 12B:
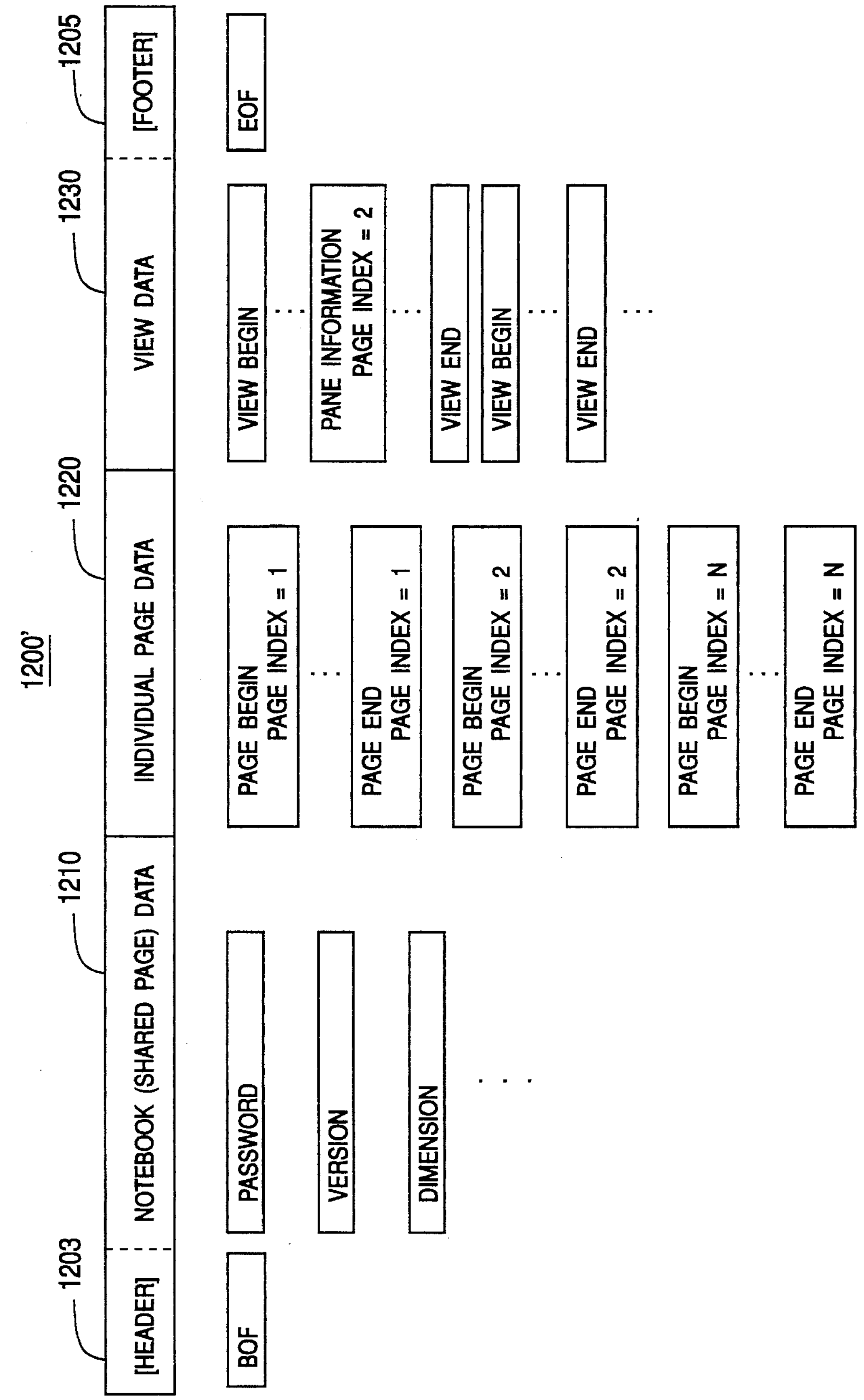
FIG. 12B is a block diagram of the layout from FIG. 12A.

Referring now to FIGS. 12A–B, a notebook file of the present invention includes a preferred layout or format 1200. Specifically, the various information records are preferably stored in and accessed from defined regions or segments. As shown in FIG. 12A, a file format 1200 of the present invention for reading and writing various information records from the storage device includes notebook or shared-page region 1210, pages region 1220, and view region 1230; the layout is also illustrated as a segmented-bar for in FIG. 12B. The actual bounds of the file itself are delimited by the Begin of file (BOF) record (shown above) and End of file (EOF) record. If desired, the BOF record may be accompanied by additional header 1203 or "housekeeping" information; similarly, the EOF record may include a checksum, end-of-file marker, or similar "footer" information 1205. Each file region will now be examined in turn.

a. Notebook (shared pages)

Notebook (shared page) region 1210, the first segment of file 1200, maintains general information for a notebook. For instance, the region stores password data (encrypted), version data (version number), recalculation mode, recalculation order, and the like. Since this information is applicable generally, it is "global" to the notebook (i.e., available to all notebook pages).

In addition to storing global parameters, the notebook region 1210 also stores "attribute tables" which specify various characteristics for a notebook. For instance, font information may be maintained within a font table for each notebook. The font table, which comprises a plurality of font records, each one describing an entry in the font table, may be constructed as:

```
Font Record:
        rec_type = RT_Font = 207
        rec_len  = 36
        rec_body
                WORD wPointSize;
                FontFlags wFlags;
                char sTypeface[32];
        typedef struct {
                unsigned bold           :   1;
                unsigned italic         :   1;
                unsigned underline      :   1;
                unsigned subscript      :   1;
                unsigned superscript    :   1;
                unsigned strikethrough  :   1;
                unsigned dblunderline   :   1;
                unsigned outline        :   1;
                unsigned shadow         :   1;
                unsigned unused         :   7;
        } FontFlags;
```

In this manner, information specific to a particular font need only be stored once. In operation, the font information is readily referenced through a font identifier or flag, which serves as a handle or index into the desired entry in the font table.

In a like manner, the notebook region 1210 stores cell attributes in a single table, thus simplifying storage of cell attributes which are shared among all cells and named styles within a notebook. Again, the table comprises a plurality of records, each describing an entry in the table:

```
Cell Attribute Record:
        rec_type = RT_Attribute = 206
        rec_len  = 8
        rec_body
                unsigned  numFormat    : 8;  // NumericFormat b
                unsigned  align        : 3;  // Alignment
                unsigned  unused       : 3;
                unsigned  dataType     : 2;  // (0,1,2)
                                             // = (general,label,date)
                unsigned  color1       : 4;  // color id of shading color1
                unsigned  color2       : 4;  // color id of shading color2
                unsigned  blend        : 3;  // pattern id of shading blend
                unsigned  deleted      : 1;  // 0 always
                unsigned  txtColor     : 4;  // color id of text
                BYTE      font;              // font id to the font table
                unsigned  left_line    : 2;  // LineType
                unsigned  top_line     : 2;  //    "
                unsigned  right_line   : 2;  //    "
                unsigned  bottom_line  : 2;  //    "
                unsigned  cProtect     : 1;  // (0,1)
                                             // = (protected,unprotected)
                unsigned  defNF        : 1;  // defined bit of num format
                unsigned  defAlign     : 1;  // defined bit of alignment
                unsigned  defShading   : 1;  // defined bit of shading
                unsigned  defFont      : 1;  // defined bit of font
                unsigned  defLine      : 1;  // defined bit of line-drawing
                unsigned  defProt      : 1;  // defined bit of protection
                unsigned  defTxtColor  : 1;  // defined bit of text color
                BYTE      style;             // style id to the style table
```

As shown, cell attributes include such characteristics as numeric format (e.g., date, fixed, scientific, currency, and the like), alignment, data type, text color, as well as font (which itself is an identifier to an entry in another table —the font table). Thus like the font table, the cell attribute table eliminates redundant storage by placing commonly shared information in globally-available tables.

b. Pages

The second region, Pages 1220, is the next data section in the file. The Pages region stores records relating to specific pages, that is, information localized to a single page. As shown in FIG. 12, Pages segment 1220 includes clusters or groupings of page records, each group being delimited by "page begin" and "page end" record members. Page record group 1221 stores a collection of records defining the first page of a notebook (e.g., the "Salads" page of notebook 500 from FIG. 5A), page group 1222 stores information defining the second page of a notebook, and so on.

The page record itself serves a dual purpose: (1) signaling the onset of a new page group and (2) identifying the specific page associated with the group. Such a record may be constructed, for example, as follows.

```
Begin of Page Record:
        rec_type = RT_PageBegin = 202;
        rec_len  = 1
        rec_body
                BYTE cPageIndex;
```

As shown, the onset of a new page group is signaled by the record type of PageBegin (rec_type=RT_PageBegin=202). The record body, on the other hand, stores a PageIndex—a unique value allowing each page represented within the pages segment 1220 to be readily identified. The first page, for instance, may store a page index having the numerical value of 0, the second storing 1, the third storing 2, and so forth.

Each group of page records (e.g., group 1221 for page 1) may, in turn, be divided into two subgroups: an "attribute" subgroup (e.g., subgroup 1221*a*) and a "cells" subgroup (e.g., subgroup 1221*b*). The former stores records describing general characteristics or attributes for a page; the latter stores the actual cell records themselves for the page. Each will be described in turn.

Attribute page records include information generally applicable to a page, for instance, "page name", "protection" "page attributes" "pane settings" and the like. An exemplary page record, such as for describing page protection (protecting the page from user editing), can be constructed as follows.

```
Protection Record:
    // enable/disable protection of a page
    rec_type = RT_Protection = 36
    rec_len  = 1
    rec_body
        BYTE cProtection = (0, 0xFF) = (Disable, Enable);
```

Other general page attributes (e.g., whether zeros are displayed) can be managed collectively within a single attribute record, as follows.

```
Page Attribute Record:
    rec_type = RT_PageAttrs = 209
    rec_len  = 38
    rec_body
        char     display_zeros;          // (0,1) = (no,yes)
        char     line_color;             // color index of line-drawings
        WORD     label_alignment;        // default label alignment
        WORD     number_alignment;       // default number alignment
        WORD     enable_conditional_color;    // (0,1) = (no,yes)
        double          lower_bound_for_conditional_color;
        double          upper_bound_for_conditional_color;
        char     color_below;      // color of numbers below lower bound
        char     color_normal;     // color of normal numbers
        char     color_above;      // color of numbers above upper bound
        char     color_err;        // color of ERR and NA
        char     unused[10];
```

Other exemplary records include row height, column width, hidden rows, hidden columns, and the like.

The "cells" subgroup, such as subgroup 1221*b* of FIG. 12A, stores the various cells for a given page. A cell record typically includes a location, an attribute, and a value. For instance, a "blank" (NULL) cell may be described as follows.

```
Blank Cell Record:
    rec_type = RT_BlankCell = 12
    rec_len  = 6
    rec_body
        BYTE       column;
        BYTE       page;
        WORD       row;
        unsigned   unused : 3;
        unsigned   attr_id : 13;          // attribute id
```

A cell storing an integer, on the other hand, is constructed as follows.

```
Integer Cell Record
    rec_type = RT_IntegerCell = 13
    rec_len  = 8
    rec_body
        BYTE       column;
        BYTE       page;
        WORD       row;
        unsigned   unused : 3;
        unsigned   attr_id : 13;          // attribute id
        int        integer;
```

Thus, as shown, location for the cell is stored by the column and row coordinates (the page may be deduced from the Page ID). Actual attributes for the cell are specified in the previously-described cell attribute table (stored in the shared-page region); the cell proper stores a terse attribute identifier (attr_id) referencing the appropriate table entry which describes this cell (and possibly others). Other cell records of interest include Label Cell record (label stored in char array), Floating-point Cell record (value stored as a double), Formula Cell record (formula stored in byte codes), and Formula String Value record (characters stored as text string).

c. Views

Figure 13A:
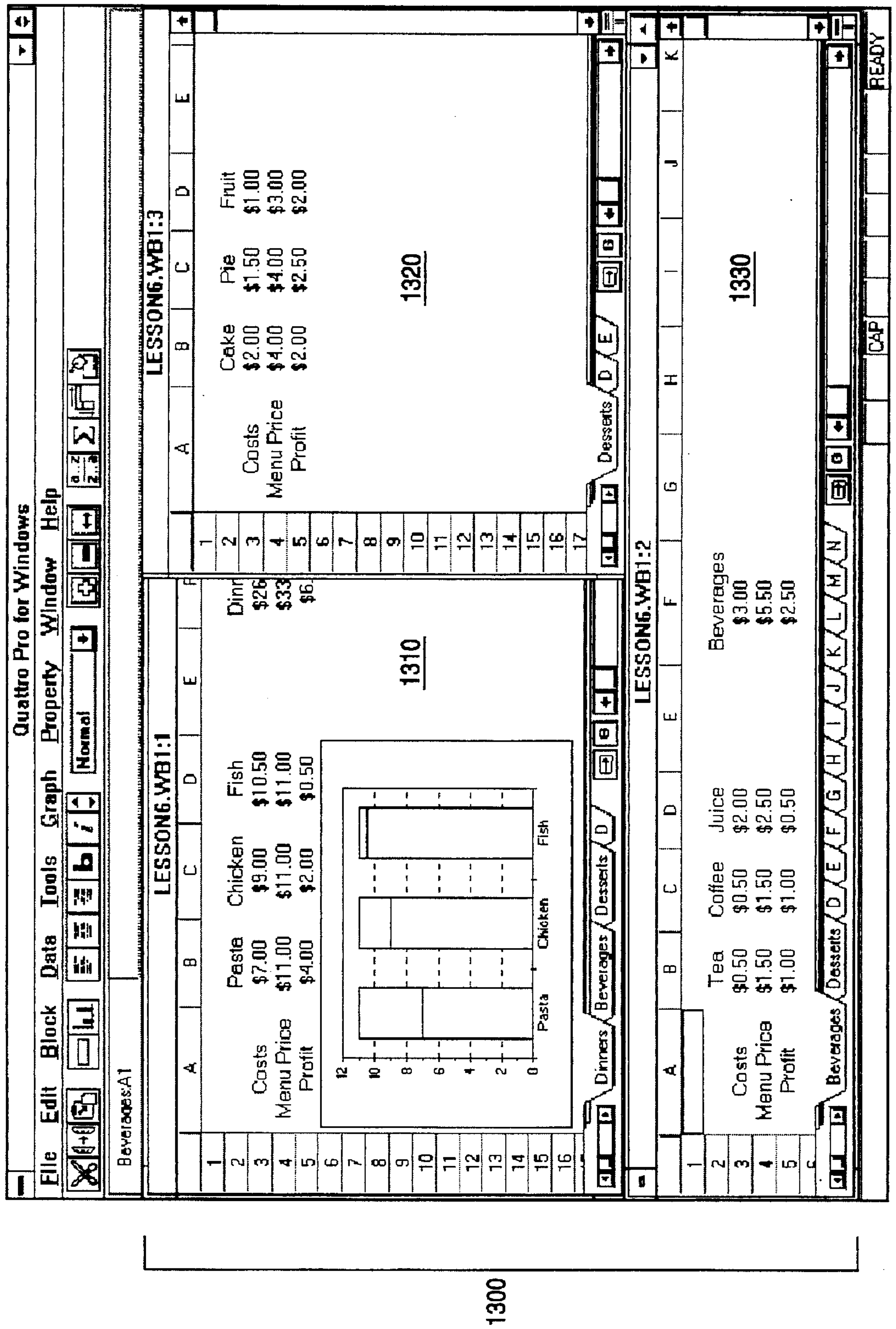
FIG. 13A is a bitmap screenshot illustrating multiple views of a single notebook.

Actual screen views (i.e., presentation to the user) of pages is managed by View region 1240, the third main segment. A view is a window on the display screen which presents a particular display or viewport of a single notebook to the user. In FIG. 13A, for example, a notebook 1300 is shown with three views 1310, 1320, 1330. Each view can look at a separate page or portion of the page within the same notebook or separate notebooks, or even multiple pages or portions of pages in the same or different notebooks. As shown, for instance, view 1310 displays the "Dinners" (first) page, view 1330 displays the "Beverages" (second) page, and view 1320 displays the "Desserts" (third) page, all from the same notebook (entitled "lesson 6" in the example shown).

Figure 13B:
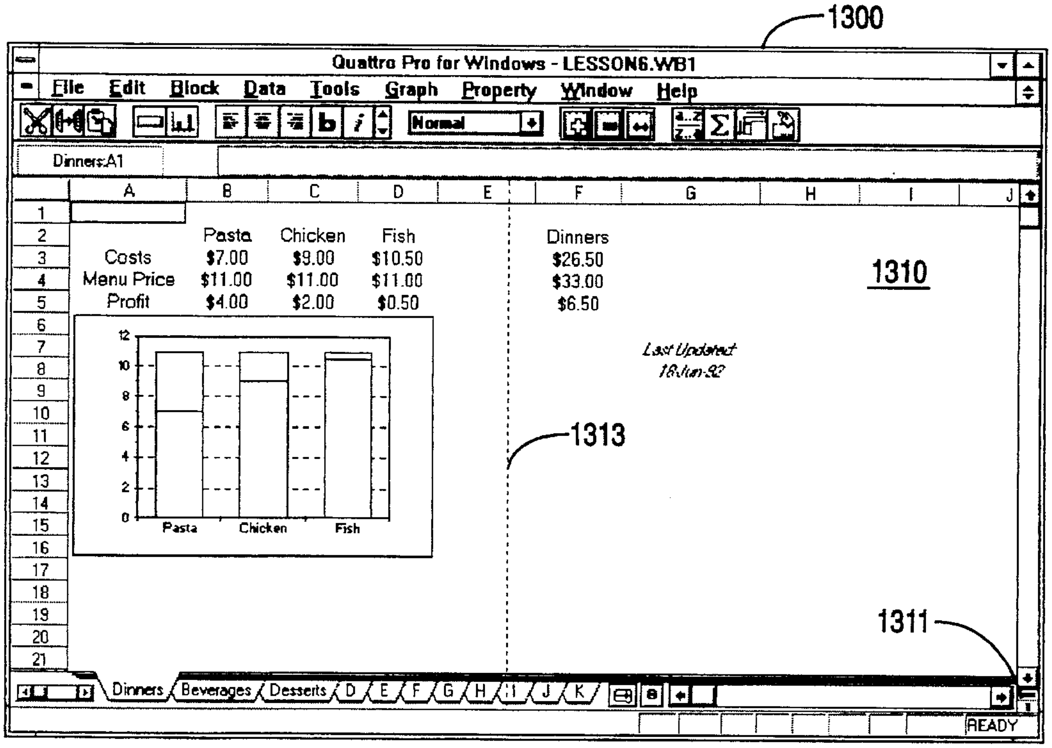
FIGS. 13B–C are bitmap screenshots illustrating the splitting of a single view into multiple, simultaneous views (panes).
Figure 13C:
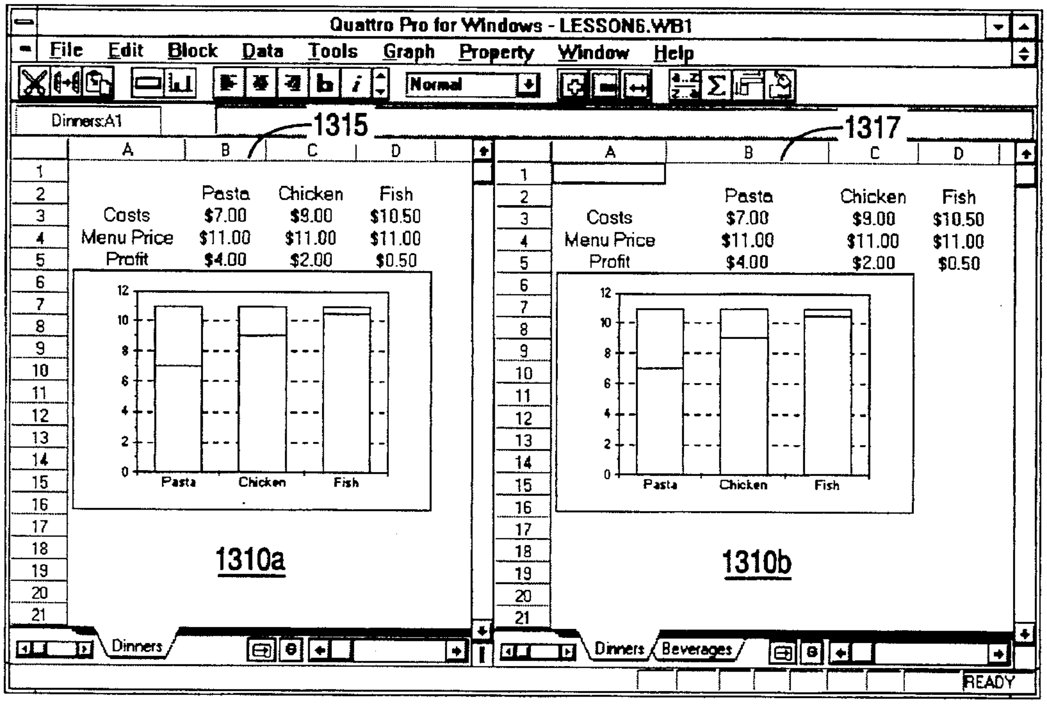

Each window or view may be further subdivided or split into "panes". The concept of window panes will be demonstrated with reference to FIG. 13B. As shown, view 1310 of notebook 1300 has been enlarged to occupy the full workspace. The view may be split into two vertical or two horizontal panes by use of a splitter tool 1311. In response to the user selecting the vertical portion (positioned on the lower half) of the tool and dragging it to vertical screen location 1313 (UI feedback provided by broken line), the system creates two vertically-split panes 1310*a*, 1310*b* as shown in FIG. 13C. In this manner, the pair of panes create two "subwindows" within the containing view or window, where each pane displays the same or different portion of a common page in the spreadsheet.

Although displaying an identical page, the panes need not have the same display attributes for a given page. As shown, for instance, Column B (1317) of pane 1310*b* is formatted wider than Column B (1315) of pane 1310*a* (i.e., the column width property is set to a larger value). Thus, panes provide virtual views of identical information, that is, a means of simultaneously viewing the same data with different display formats. Additional description of the general operation of windows and panes is described in Chapter 6, *Windows,* of Borland's Quattro Pro: *Getting Started.*

To manage multiple views, the system stores information describing the one or more views open for a notebook in Views region 1230. Views from other open notebooks (i.e., other entries in the notebook table) are stored in the view regions for those notebooks. In a manner similar to the storage of page information, Views 1230 includes one or more groups of records, each group relating to a specific view. As shown in FIG. 12, each group of records is delimited by "view begin" and "view end" record members. These delimiting records store indicia (e.g., view index) sufficient to allow identification of each view.

Within each pair of delimiters are the records actually describing the view for that group. For instance, a view has window properties of size:

```
Window Size Record:
        rec_type = RT_WinSize = 403
        rec_len = 6
        rec_body
                WORD height;
                WORD width;
                WORD state;      // (0,1,2,3) = (normal,maxized,icon,hidden)
```

and location:

```
Window Location Record:
        rec_type = RT_WinLoc = 404
        rec_len = 4
        rec_body
                WORD left;
                WORD top;
                // location of window's top-left corner in normal state
```

Other view information includes display settings (e.g., scroll bars visible), zoom factor, and the like.

Pane information, on the other hand, is managed by a pane record stored within the view group. An exemplary pane record may be constructed as follows.

```
Pane Information Record:
    // In an exemplary embodiment, there are at most 2 panes per page.
    // Each pane has it own record type.
    rec_type = RT_Pane1 = 407
    rec_type = RT_Pane2 = 408
    rec_len = 21
    rec_body
        char        page_index;
        WORD        flags;                  // flags defined below
        NBCELLLOC top_left_cell;            // cell at the top-left corner
        NBCELLLOC current_cell;             // currently selected cell
        WORD        title;          // (0,1,2,3) =
                                    // (none,horizontal,vertical,both)
        NBCELLLOC title_top_left_cell;      // cell at the top-left
                                            // in the title area
        WORD        nRows;  // number of rows
                            // in the horizontal title area
        WORD        nCols;  // number of cols in the vertical
                            // title area
    /* Flags are defined as
        bit 0 set if row heading is visible
        bit 1 set if col heading is visible
        bit 2 set if horizontal gridlines are visible
        bit 3 set if vertical gridlines are visible
        bit 4 set if map view
    */
```

As shown, pane information includes a page_index associating the pane with a particular page (referenced by its page index) to display. How the page is actually positioned within the view is described by the upper leftmost cell (relative to the view). Other attributes describing the display include the number of rows and number of columns displayed.

3. Processing records a. General

Referring now to FIG. 14A, the general method for processing records will be described. In response to a user request to open a notebook (i.e., load from mass storage), the system first creates a slot in the notebook table (previously-described table 805 of FIG. 8A). Next, the in-memory notebook and page data structures (e.g., 810, 815, 820, 825) are built by reading the various records from the corresponding disk file corresponding to the notebook.

As shown (step (2)), the system parses the various records as they are loaded from disk as follows. The record type or ID is read (from its location as the first two bytes). Based on the type identified, the record is passed to a specific record handler routine for the identified type. As shown in the figure, for example, the records may be filtered by record type, for example, as represented by the case statement pseudocode. The handler, which knows how to extract and interpret the information contained within the record body (whose length is specified by the record length field), is responsible for transferring the information from its corresponding record(s) into the notebook and page structures resident in system memory. of page N (the last page in the example). Thus, the rectangle that bounds all of the active cells in the notebook is defined by the difference of rows of the upper-left and lower-right cells plus 1 (Δrow+1) and the difference of columns of the upper-left and lower-right cells plus 1 (Δcolumn+1). For the example at hand, the former has a value of 3 rows, while the latter is 3 columns; this yields a 3×3 or 9 cell rectangle. A volume (3D block) bounding all cells may be readily determined by multiplying the rectangle by the number of active pages in the notebook. For instance, if the total number of active pages is 3, then the volume would be a 27 cell cubic block (i.e., 9 cells/page multiplied by 3 pages).

Figure 14D:
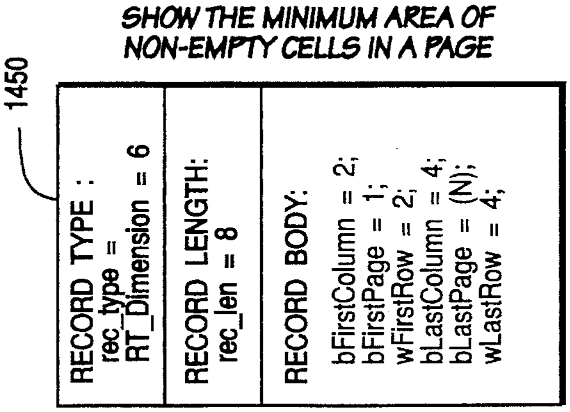
FIG. 14D is a block diagram illustrating an exemplary data record for maintaining dimension information (from FIGS. 14B–C).
Figure 14B:
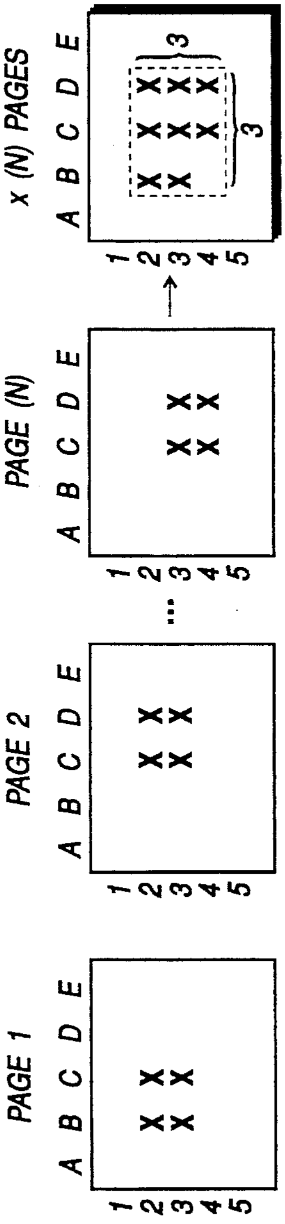
FIGS. 14B–C are diagrams illustrating a method of the present invention for determining a bounding block (dimension) which encompasses all active cells in a notebook.
Figure 14C:
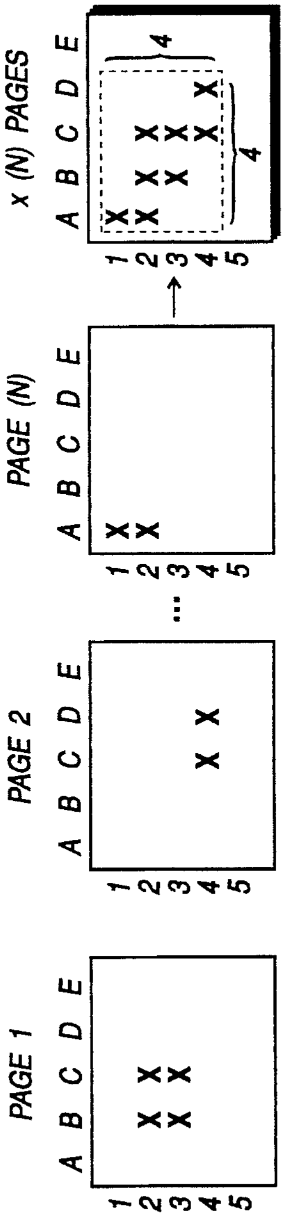

FIG. 14C illustrates another example. Here the upper-left cell of the active pages is A1 (from the last page); the lower-right cell is D4 (for the second page). The bounding volume for the notebook would be calculated as: 16 cells/page x (N)pages. Using this approach, a minimum dimension occupied by the cells may be readily determined; this information, in turn, may be employed to optimize memory usage, spreadsheet display, and the like.

In a preferred embodiment, the dimension information is stored in the file as a dimension record 1450 of FIG. 14D. As shown, dimension record 1450 has a record type value of RT_Dimension (6) that identifies the record as a dimension record. The record length is specified as 8 which indicates that there are 8 bytes of data in the record body. The record body shows the values of data that correspond with the example of FIG. 14B. Namely, the first column is a one-byte value 2 (representing the column "B"), the first page is a one-byte value 1, the first row is a two-byte value 2, the last column is a one-byte value 4, the last page is a one-byte value for (N) (the actual numeric value depending on how many N number of active pages are in the notebook), and the last row is a one-byte value 4. From this information, memory required for supporting a 3×3×(N)page block of cells may be determined. The record b. Processing of dimension records Referring now to FIGS. 14B–D, a specific example for processing records will be described. "Dimension" information is included in the shared page data segment of the stored file; it is used by the system of the present invention to determine an amount of main memory which must be allocated for maintaining a particular notebook at run time. It serves as an example of record processing specific to multi-dimensional systems. Moreover, it illustrates a technique for minimizing repeated memory allocation operations in such a system.

The "dimension" information record is processed as follows. In order to obtain an approximate upper bound of required memory, the entire collection of cells in all pages of the spreadsheet are treated as a single three-dimensional object, one defined by page, row, and column coordinates. From all the active pages, the uppermost and leftmost cell is identified along with the lowermost and rightmost cell. The rectangle defined by these two cells is multiplied by the number of pages and the resulting number is used to calculate memory requirements based on the amount of memory needed to represent cells, pages, and the like, as well as any attendant overhead.

FIG. 14B illustrates the determination of the dimension information value. The figure shows three pages— page 1, page 2, and page N—representing a sequence of active pages in a single notebook. As shown, page 1 of the spreadsheet includes an active (in use) cell at column B and row 2 (i.e., cell "B2"). Other active cells in page 1 are C2, B3 and C3. Similarly, page 2 has cells C2, D2, C3 and D3, while page N has cells C3, D3, C4 and D4. As only the page(s) in the notebook with active cells need be counted in this determination, N represents the number of active pages (i.e., pages having cells in use). The uppermost, leftmost cell (the "upper-left" cell) for the notebook, as determined from its active pages, is cell B2 of page 1; the lowermost, rightmost ("lower-right") cell for the notebook is cell D4 itself need only be updated when an active cell is created outside the bounding volume.

c. Storing information in compact form for records having default settings

Figure 15A:
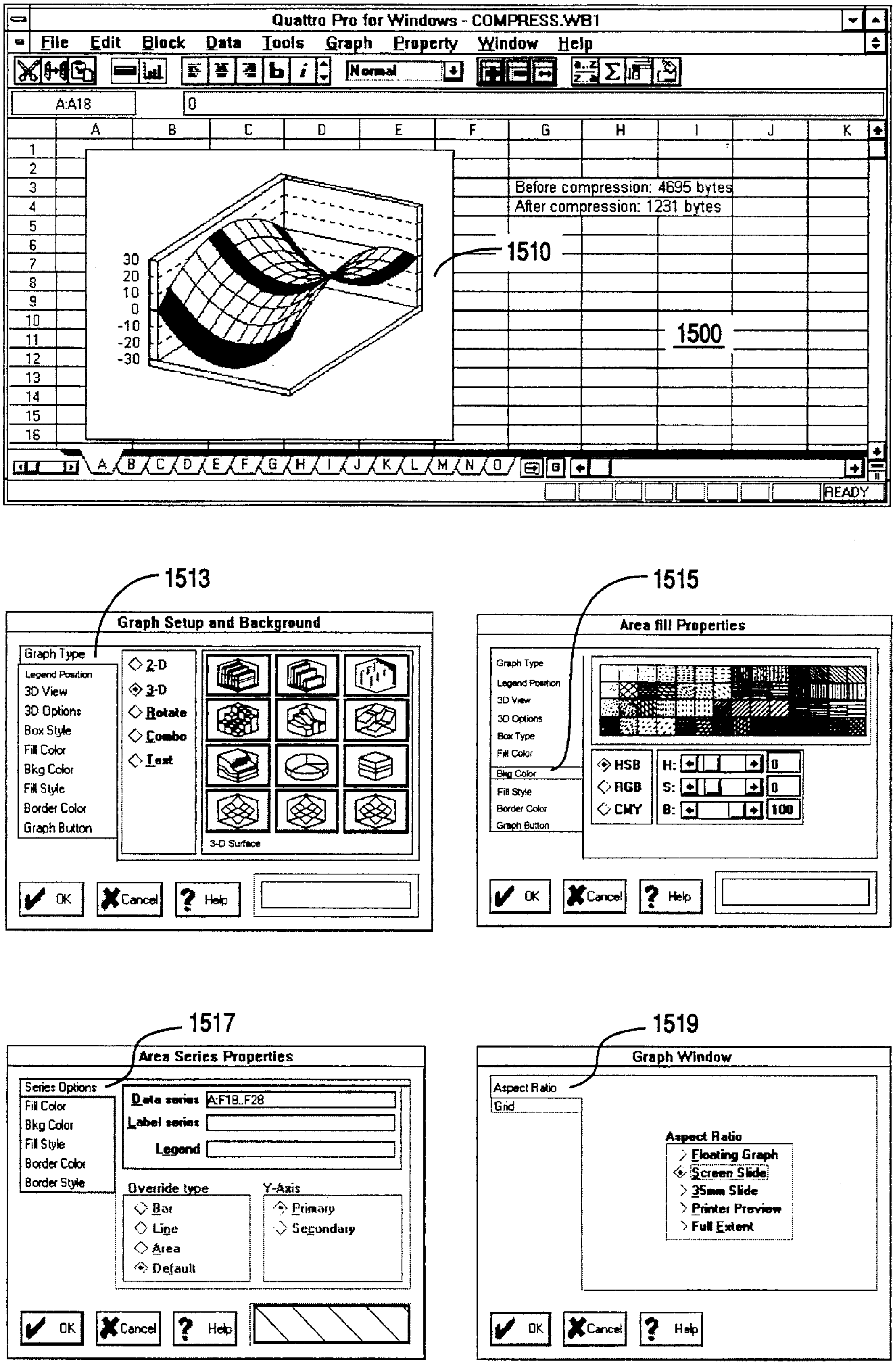
FIG. 15A is a series of bitmap screenshots illustrating the creation of a graph object, by selecting among a multitude of graph properties (attributes), some of which will remain unchanged from their default values.
Figure 15B:
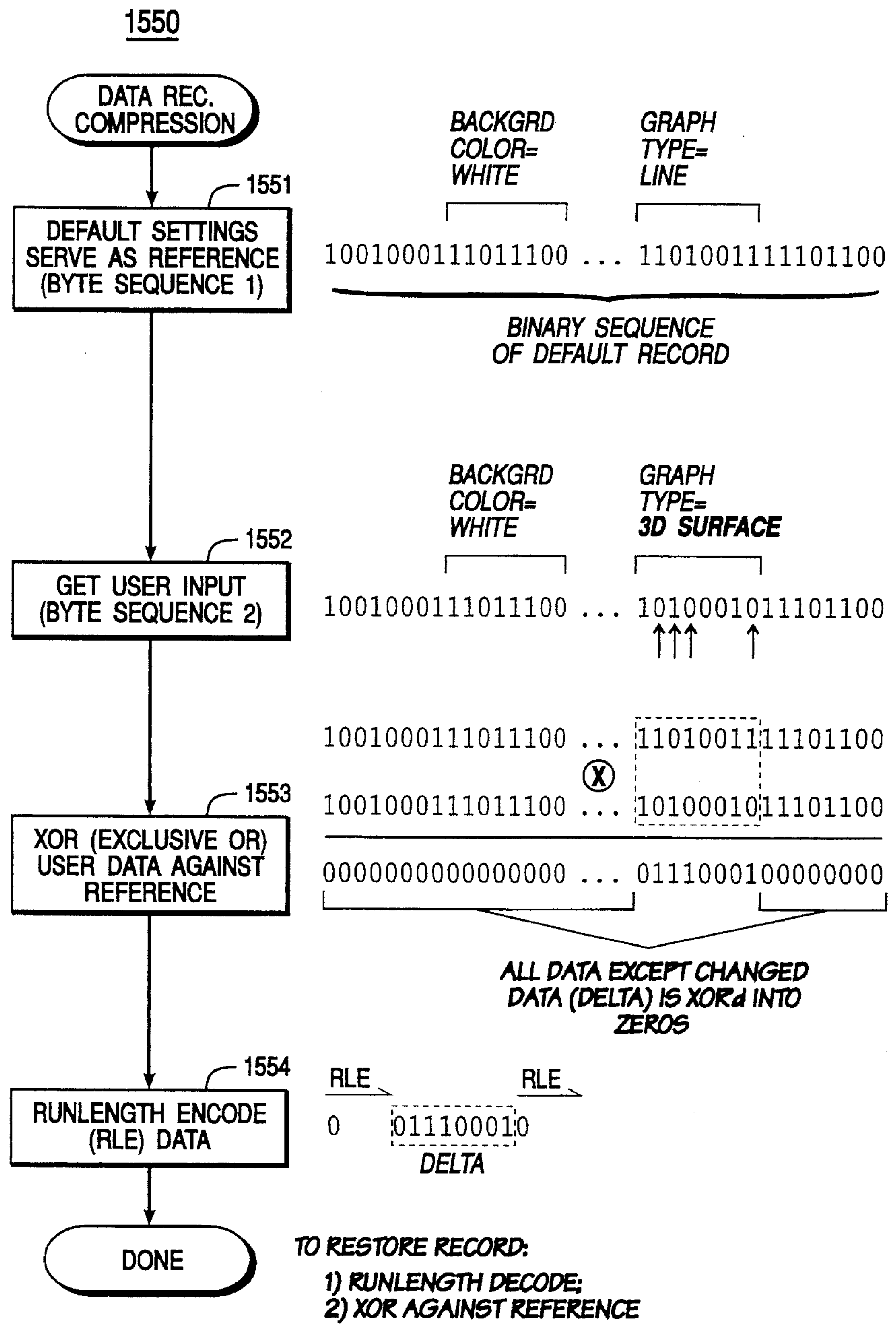
FIG. 15B is a flowchart illustrating a method of the present invention for compressing information, such as a data record storing graph information (e.g., of the graph in FIG. 15A).

According to the present invention, record body information may be stored in a compact form, that is, one requiring minimal storage space. Referring now to FIGS. 15A–B, a preferred method for compressing or compacting information into a record will be described. The following description will focus on the storage of the information for graphic objects (e.g., charts and graphs), as these objects, with their many attributes, have rather pronounced storage requirements. Those skilled in the art will appreciate that the method of the present invention for compressing and decompressing information may be readily applied to a variety of similar storage-intensive applications. Moreover, there is no requirement that compact information be stored in record format; any desired access method may be employed for delimited units of information.

FIG. 15A shows a notebook page 1500 which includes a graph object 1510. A graph has numerous parameters which must be managed. As shown by the various attribute dialogs, for instance, a graph may include a graph type 1513, a background color 1515, a defined data series (range of cells) 1517, and an aspect ratio 1519, just to name a few. These parameters, in turn, may include various subtypes. Graph type 1513, for instance, may be one of a 2D, 3D, rotated, combo, or text graph type. The subtypes themselves may, in turn, have still further subtypes. For a 2D graph type, for example, one may select among bar, variance, stack bar, high/low, line, XY, area, column, or pie graphs. All told, there is a substantial amount of information necessary to completely describe a particular graph.

The present invention recognizes that, despite requiring such numerous attributes and parameters for its description, a graph can actually be described with a terse data record by compressing data for those instances where default values potentially comprise a significant portion of the information to be managed. In particular, the present invention recognizes that many of the parameters for a graph will be unchanged from those provided as defaults by the system. For instance, a graph may have a default background color of white and a default graph type of line graph; often the user will accept (i.e., not change) many such default values. Since one cannot determine beforehand exactly which parameters will not be changed, however, a system cannot merely assume (i.e., not store) certain preset parameters. Another solution is needed.

The present invention contains a novel technique which exploits the observation that the changes from default settings, although not known beforehand, will typically be relatively few (when compared to the data record as a whole). Referring now to FIG. 15B, this method is described. In step 1551, the default settings (e.g., for a graph) are stored as a reference (typically as a specific sequence of bytes in a data record) for comparison against user changes; alternatively (particularly in those instances where a sequence of similar data records are to be stored), the last-stored record (or selected one thereof) may serve as the reference (thereby establishing a chain of incremental-change records). At step 1552, the system receives input from the user, for example, selecting graph type, setting background and foreground colors, setting titles, and the like. This information is collected into a temporary data record which has a layout comparable with the aforementioned reference string.

At step 1553, the temporary user data is XOR (Exclusive-OR bitwise operation) against the reference byte string to yield a resultant byte string. As is known in the art, the user data operand may be readily restored by "reXORing" i.e., XORing the reference against the resultant. Moreover, when a value is XOR'd against itself, the result is the numeric value of zero. In this manner, that information from the user data which does not vary from the default settings will be XOR'd into zeroes (as shown in the figure). Next, at step 1554, a compression operation optimized for long runs of zeroes, such as Runlength Encoding (RLE), may be applied. This generates a terse data record—one which effectively only stores the incremental changes (deltas) of the user. To restore the record to its full (uncompressed) form, one need only perform a Runlength decoding, followed by XORing the decoded byte string against the reference byte string.

In this manner, the data compression method 1550 operates advantageously on any collection of information where it is desirable to store incremental changes (i.e., changes which differ from default values). In compression of the data record for the graph object 1510 of FIG. 15A with the technique, for instance, a compression ratio approaching 4:1 (4695 bytes uncompressed, 1231 bytes compressed) has been realized. When more default settings are selected by the user, better compression may be achieved, and vice versa. If desired, the technique may be augmented with additional or more complex compression/decompression methodologies (e.g., LZW). For those embodiments operative in an interactive environment, however, it is preferable to employ computationally frugal compression/decompression steps (e.g., RLE), thereby minimizing any penalty to system performance.

Attached hereto is a microfiche Appendix A containing source code listings, providing a description of the notebook structure (class) of the invention, suitable for use in a general purpose digital computer system, such as an IBM-compatible personal computer; a suitable compiler for compiling and linking the code is available from Borland International. Also attached hereto is a microfiche Appendix B containing commented listings illustrating an exemplary implementation of the file format of the present invention. The listings illustrate preferred construction of records for multi-dimensional information processing, storage, and retrieval, including a detailed description of other information types or records and data structures suitable for describing information types (of FIG. 12A). Also included are abbreviated descriptions of the records in the file and other exemplary information types such as "macrolibrary" "font information" "print information" and the like. A general description of the features and operation of the spreadsheet application module 152 may be found in Quattro® Pro for Windows (*Getting Started, User's Guide* and *Building Spreadsheet Applications*), available from Borland International.

While the invention is described in some detail with specific reference to a single preferred embodiment and certain alternatives, there is no intent to limit the invention to that particular embodiment or those specific alternatives. For instance, the above discussion shows that the file format of the present invention stores a representation of a spreadsheet in a storage medium so that shared page data precedes individual page data which precedes view data. Further, each of these data segments includes any number of various types of information which may be included, for the most part, in an arbitrary order within the separate segments. Moreover, the present invention may be advantageously implemented in a variety of UI platforms other than Windows, including Macintosh, X-Windows, Motif, NextStep, OS/2, and the like. Thus, the true scope of the present invention is not limited to any one of the foregoing exemplary embodiments but is instead defined by the following claims.

What is claimed is:

1. In an electronic spreadsheet system, the system including a processor for manipulating a multi-dimensional spread of information, and including a memory for representing the spread of information as an at least three-dimensional matrix of information cells, an improved method for allocating storage for the spread in the memory, the improvement comprising:

(a) arranging said at least three-dimensional matrix of information as a plurality of two-dimensional spreads;

(b) for each said two-dimensional spread having cells currently in use, said cells currently in use being referred to as active cells, determining a rectangle that encompasses the active cells for the spread;

(c) from all such rectangles determined in step (b), selecting a bounding rectangle that encompasses all such rectangles;

(d) determining a bounding block encompassing all active cells of the at least three-dimensional matrix by multiplying the number of cells in the bounding rectangle by a count of all two-dimensional spreads which have active cells; and (e) utilizing information about the bounding block for allocating storage in the memory.

2. The method of claim 1, further comprising the step:

(f) displaying at least a portion of at least one two-dimensional spread on a screen device as a page member of the multi-dimensional spread of information.

3. The method of claim 1, wherein said step (e) comprises storing information sufficient for describing the determined bounding block as a dimension record on a storage device.

4. The method of claim 3, further comprising the step:

(f) if a new cell is used outside the bounding block, updating the dimension record with a new bounding block which encompasses the new cell.

5. The method of claim 1, wherein said step (b) of determining a rectangle includes:

identifying left-uppermost and right-bottommost cells from the active cells for a given spread of cells; and defining a rectangle which includes the identified left-uppermost and right-bottommost cells for the given spread.

6. The method of claim 5, wherein the two identified cells are each characterized by row and column coordinates, and wherein defining a rectangle includes determining the difference of rows of the two cell plus the value of one (Δrow+1) and determining the difference of columns of the two cell plus the value of one (Δcolumn+1), wherein the rectangle includes an row/column area of (Δrow+1) multiplied by (Δcolumn+1).

7. The method of claim 6, wherein the bounding block has a volume of (Δrow+1) multiplied by (Δcolumn+1) further multiplied by the count of all said at least one two-dimensional spread which have cells currently in use.

8. The method of claim 1, wherein in step (b) determining a rectangle includes:

identifying right-uppermost and left-bottommost cells from the active cells for a given spread of cells; and defining a rectangle which includes the identified right-uppermost and left-bottommost cells for the given spread.

9. A multi-dimensional information processing system comprising:

a computer having a processor and a memory;

means for representing a multi-dimensional matrix of information to a user as a plurality of two-dimensional pages;

means for displaying desired views of selected ones of the pages on a screen device, including means for displaying to a user multiple, simultaneous views of identical portions of the multi-dimensional matric of information;

means for representing in the memory information structures that describe the multi-dimensional matrix; and means for storing data records on a persistent storage device, the data records containing sufficient information to permit reconstruction of the memory information structures when read from the storage device;

the data records including a plurality of data records containing page information grouped into a page region and further including a number of data records containing view information grouped into a view region on the storage device; and a data record for each one of the simultaneous views including user-settable display attributes which operate independent of other views, thereby providing the user with multiple, virtual views of underlying identical information.

10. The system of claim 9, wherein data records of the view region which contain information for simultaneous views of identical information include pane records, each of the pane records storing a page index indicating a selected one of the two-dimensional pages for display and further storing the number of rows and columns for displaying the selected page.

11. The system of claim 9, wherein said information structures include:

a notebook table for referencing a plurality of notebook information structures, each said notebook information structure describing a single multi-dimensional matrix;

a page table for referencing a plurality of page information structures, each said page information structure describing a single two-dimensional page, wherein each said notebook information structure references one page table; and a sheet table for referencing a plurality of cell information structures, each said cell information structure describing a single information cell, wherein each said page table information structure references one sheet table.

12. The system of claim 9, wherein a notebook information structure in memory has associated notebook data records stored on a persistent storage device, the notebook data records being grouped into a region apart from said page and view regions.

13. The system of claim 9, wherein the page region includes a plurality of page groups each page group having a plurality of page data records for describing one of the two-dimensional pages.

14. The system of claim 13, wherein the plurality of page data records for each page group includes delimiter records for marking a beginning and an end of the group, the delimiter records including an identifier which is unique for the group.

15. The system of claim 13, wherein each page includes information cells for representing data at a discrete location of the page, and wherein the plurality of page data records for a page is divided into first and second subgroups, the first subgroup for storing information shared among information cells of the page, the second subgroup for storing information specific to selected ones of the information cells of the page.

16. A multi-dimensional information processing system comprising:

a computer having a processor and a memory;

means for representing a multi-dimensional matrix of information to a user as a plurality of two-dimensional pages;

means for displaying desired views of selected ones of the pages on a screen device;

means for representing in the memory information structures that describe the multi-dimensional matrix; and means for storing data records on a persistent storage device, the data records containing sufficient information to permit reconstruction of the memory information structures when read from the storage device;

wherein said information structures in the memory include a notebook information structure describing a single multi-dimensional matrix and including a page table entry, a page table, referenced by said page table entry in said notebook information structure, said page table including a plurality of page entries, a plurality of page information structures, each being referenced by a respective page entry in said page table and describing a single two-dimensional page, each page information structure including a sheet table entry, a plurality of sheet tables, each being referenced by a respective sheet table entry in a respective page information structure, each sheet table having a plurality of entries, and a plurality of cell information structures, each referenced directly or indirectly by one of said entries in said sheet table, each said cell information structure describing a single information cell; and wherein said data records corresponding to a given notebook information structure in the memory include a page region having a plurality of page groups, each page group having a plurality of page data records for describing one of the two-dimensional pages, the plurality of page data records for a page being divided into first and second subgroups, the first subgroup for storing information shared among information cells of the page, the second subgroup for storing information specific to selected ones of the information cells of the page, and a notebook region, separate from said page region, having a plurality of notebook data records shared among the two-dimensional pages.

17. The system of claim 16, wherein the plurality of page data records for each page group includes delimiter records for marking a beginning and an end of the group, the delimiter records including an identifier which is unique for the group.

18. The system of claim 16, wherein said data records corresponding to a given notebook further include a view region, separate from said page region and said notebook region, including a number of data records containing view information grouped into a view region.

19. The system of claim 16, wherein said means for displaying desired views of selected ones of the pages on a screen device includes means for displaying to a user multiple, simultaneous views of identical portions of the multi-dimensional matrix of information.

20. The system of claim 19, wherein a data record for each one of the simultaneous views includes user-settable display attributes which operate independent of other views, thereby providing the user with multiple, virtual views of underlying identical information.

21. The system of claim 20, wherein data records of the view region which contain information for simultaneous views of identical information include pane records, each of the pane records storing a page index indicating a selected one of the two-dimensional pages for display and further storing the number of rows and columns for displaying the selected page.

* * * * *